United States Patent
Sakai et al.

(10) Patent No.: US 9,684,204 B2
(45) Date of Patent: Jun. 20, 2017

(54) MIRROR DISPLAY, HALF MIRROR PLATE, AND ELECTRONIC DEVICE

(71) Applicant: Sharp Kabushiki Kaisha, Osaka-shi, Osaka (JP)

(72) Inventors: Akira Sakai, Osaka (JP); Takayuki Nishiyama, Osaka (JP); Masahiro Hasegawa, Osaka (JP); Hidefumi Yoshida, Osaka (JP); Shigeaki Mizushima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/761,055

(22) PCT Filed: Jan. 15, 2014

(86) PCT No.: PCT/JP2014/050576
§ 371 (c)(1),
(2) Date: Jul. 15, 2015

(87) PCT Pub. No.: WO2014/112525
PCT Pub. Date: Jul. 24, 2014

(65) Prior Publication Data
US 2016/0026039 A1    Jan. 28, 2016

(30) Foreign Application Priority Data

Jan. 16, 2013  (JP) ................................. 2013-005719
May 24, 2013  (JP) ................................. 2013-110300

(51) Int. Cl.
*G02F 1/1335* (2006.01)
*G02F 1/1333* (2006.01)
(Continued)

(52) U.S. Cl.
CPC .. *G02F 1/133555* (2013.01); *G02F 1/133308* (2013.01); *G06F 3/1446* (2013.01);
(Continued)

(58) Field of Classification Search
CPC ......... G02F 1/133536; G02F 1/133555; G02F 1/133308; G02F 1/13471;
(Continued)

(56) References Cited

U.S. PATENT DOCUMENTS 5,889,570 A    3/1999  Mitsui et al.
6,166,791 A   12/2000  Mitsui et al.
(Continued)

FOREIGN PATENT DOCUMENTS

CN    1886679 A    12/2006
CN  101844544 A    9/2010
(Continued)

OTHER PUBLICATIONS

Official Communication issued in International Patent Application No. PCT/JP2014/050576, mailed on Mar. 11, 2014.

*Primary Examiner* — Amare Mengistu
*Assistant Examiner* — Jennifer Zubajlo
(74) *Attorney, Agent, or Firm* — Keating & Bennett, LLP

(57) ABSTRACT

The present invention provides a mirror display which prevents the boundary line between a frame region and a display region from being observed in a mirror mode and which thus has improved design quality. The mirror display of the present invention includes a half mirror plate including a half mirror layer, and a display device disposed behind the half mirror plate, the display device including a display panel and a frame component that supports a peripheral portion of the display panel, and the mirror display including a reflectance adjuster that makes equal the reflectance in a display region where the half mirror layer and the display (Continued)

panel face each other and the reflectance in a frame region where the half mirror layer and the frame component face each other.

20 Claims, 34 Drawing Sheets

(51) Int. Cl.
*G06F 3/14* (2006.01)
*G02F 1/1347* (2006.01)

(52) U.S. Cl.
CPC .... *G02F 1/13471* (2013.01); *G02F 1/133536* (2013.01); *G02F 2001/133331* (2013.01); *G02F 2001/133388* (2013.01); *G02F 2001/133557* (2013.01); *G02F 2001/133601* (2013.01); *G02F 2201/08* (2013.01); *G02F 2203/09* (2013.01)

(58) Field of Classification Search
CPC ........ G02F 2001/133557; G02F 2001/133388; G02F 2001/133601; G02F 2001/133331; G02F 2201/08; G02F 2201/09; G06F 3/1446

See application file for complete search history.

(56) References Cited

U.S. PATENT DOCUMENTS

| | | |
|---|---|---|
| 2004/0051827 A1 | 3/2004 | Hinata et al. |
| 2004/0100598 A1* | 5/2004 | Adachi ............ G02F 1/133536 349/113 |
| 2004/0105053 A1 | 6/2004 | Ozeki et al. |
| 2006/0164725 A1 | 7/2006 | Horsten et al. |
| 2007/0064321 A1 | 3/2007 | Hikmet et al. |
| 2007/0183037 A1* | 8/2007 | De Boer .................. A47G 1/02 359/485.02 |
| 2008/0285128 A1* | 11/2008 | Nieuwkerk .............. A47G 1/02 359/485.07 |
| 2009/0002575 A1 | 1/2009 | Yamada et al. |
| 2009/0244740 A1* | 10/2009 | Takayanagi ............... B60R 1/00 359/839 |
| 2010/0214662 A1 | 8/2010 | Takayanagi et al. |
| 2010/0238105 A1* | 9/2010 | Matsushima ........ G09G 3/3648 345/102 |
| 2010/0245701 A1 | 9/2010 | Sato et al. |

FOREIGN PATENT DOCUMENTS

| | | |
|---|---|---|
| JP | 7-267002 A | 10/1995 |
| JP | 9-166780 A | 6/1997 |
| JP | 9-318969 A | 12/1997 |
| JP | 11-015392 A | 1/1999 |
| JP | 2000-196718 A | 7/2000 |
| JP | 2000196718 A * | 7/2000 |
| JP | 2001-318374 A | 11/2001 |
| JP | 2002-67806 A | 3/2002 |
| JP | 2003-241175 A | 8/2003 |
| JP | 2003-302909 A | 10/2003 |
| JP | 2004-085590 A | 3/2004 |
| JP | 2004-125885 A | 4/2004 |
| JP | 2004-184980 A | 7/2004 |
| JP | 2005-37534 A | 2/2005 |
| JP | 2006-50203 A | 2/2006 |
| JP | 2006-522945 A | 10/2006 |
| JP | 2007-517568 A | 7/2007 |
| JP | 2009-8881 A | 1/2009 |
| JP | 2009-241733 A | 10/2009 |
| JP | 2010-105419 A | 5/2010 |
| JP | 2010-195205 A | 9/2010 |
| JP | 2010-217705 A | 9/2010 |
| JP | 2011-71973 A | 4/2011 |
| JP | 2012-208244 A | 10/2012 |

* cited by examiner

MIRROR DISPLAY, HALF MIRROR PLATE, AND ELECTRONIC DEVICE

TECHNICAL FIELD

The present invention relates to a mirror display, a half mirror plate, and an electronic device. The present invention specifically relates to a mirror display that can be driven in both a mirror mode in which the display serves as a mirror and a display mode in which the display shows an image, a half mirror plate to be used in the mirror display, and an electronic device including the mirror display.

BACKGROUND ART

FIG. 39 is an explanatory view showing the display states in the power-on state and in the power-off state of a common conventional display device. As shown in FIG. 39, a display device 101 in the power-on state shows an image in a display region A. A region (frame region B) called a frame or a bezel in the periphery of the display region A does not contribute to image display. In contrast, a display device 102 in the power-off state shows no image in the display region A, and the frame region B still does not contribute to image display.

Such common conventional display devices show only a black or gray screen when they show no image (for example, when they are in the power-off state), so that the devices are useless for users. On the contrary, large-size, difficult-to-move display devices (e.g., digital signage and television receivers) can be mere obstructions for users when they are in the non-display state because they occupy the same space either in the non-display state or in the display state. In other words, such common conventional display devices have their own value only when they are in the display state.

In order to solve this disadvantage, a mirror display is proposed which includes a half mirror plate in front of a display device so that it can serve as a mirror when the display is in the non-display state (for example, see Patent Literature documents 1 to 4). Such a mirror display can serve not only as a display, which is the original purpose, but also as a mirror. Specifically, when display light is emitted from the display device, the mirror display shows an image owing to the display light in a region where the display light is emitted from the display device. When no display light is emitted from the display device, on the other hand, the mirror display reflects the outside light and serves as a mirror in a region where the display light is not emitted from the display device.

If a mirror region which serves as a mirror surface in a mirror mode of such a mirror display partially includes a frame region, the mirror region in the mirror mode can have a larger area than a display region in a display mode. Thus, the frame region can effectively be used to improve the utility as a mirror. Further, mirror displays whose frame region can also serve as a mirror may have better design quality in the display mode.

CITATION LIST

Patent Literature

Patent Literature 1: JP 2003-241175 A
Patent Literature 2: JP H11-15392 A
Patent Literature 3: JP 2004-085590 A
Patent Literature 4: JP 2004-125885 A

SUMMARY OF INVENTION

Technical Problem

However, the structure in which a mirror region is larger than a display region may cause poor design quality in that the boundary line between a frame region and the display region is easily observed in a mirror mode. Thus, there is still room for improvement.

The present invention is devised in consideration of the above situation, and it aims to provide a mirror display which prevents the boundary line between a frame region and a display region from being observed in a mirror mode and which thus has improved design quality, a half mirror plate to be used in the mirror display, and an electronic device including the mirror display.

Solution to Problem

The present inventors have performed studies on mirror displays, and then focused on the fact that they can improve the design quality of the mirror displays by preventing the boundary line between a frame region and a display region from being observed in a mirror mode, and thus can apply the mirror displays to various uses.

Then, the present inventors have performed various studies on methods of preventing the boundary line between a frame region and a display region from being observed in a mirror mode, and arrived at the method of disposing a reflectance adjuster. As a result, the present inventors have arrived at the solution of the above problems, completing the present invention.

Specifically, one aspect of the present invention is a mirror display including a half mirror plate including a half mirror layer, and a display device disposed behind the half mirror plate, the display device including a display panel and a frame component that supports a peripheral portion of the display panel, and the mirror display including a reflectance adjuster that makes equal the reflectance in a display region where the half mirror layer and the display panel face each other and the reflectance in a frame region where the half mirror layer and the frame component face each other. The reflectance adjuster only needs to make equal the reflectance in the display region and the reflectance in the frame region to the extent that the boundary line between the frame region and the display region is not observed. Specifically, the reflectance adjuster preferably makes the difference between the reflectance in the display region and the reflectance in the frame region be 3% or lower, and more preferably 1% or lower. The phrase "a component A and a component B face each other" herein includes not only the cases where no component exists between the component A and the component B (for example, the cases where the component A and the component B are in contact with each other, the cases where an air layer alone exists between the component A and the component B) but also the cases where another component exists between the component A and the component B. For example, the phrase "a display panel (or a frame component) and a half mirror layer face each other" includes the cases where the display panel (or the frame component), an anti-reflection film, a glass plate, and the half mirror layer are disposed in the order set forth.

Another aspect of the present invention is a half mirror plate including a half mirror layer, and a reflectance adjuster that adjusts the reflectance in a display region that is configured to face a display panel and the reflectance in a frame region that is configured to face a frame component.

Still another aspect of the present invention is an electronic device including the above mirror display.

Advantageous Effects of Invention

Since the mirror display, the half mirror plate, and the electronic device of the present invention include a reflectance adjuster, they can prevent the boundary line between the frame region and the display region from being observed in a mirror mode, improving the design quality thereof.

DESCRIPTION OF EMBODIMENTS

Figure 1:
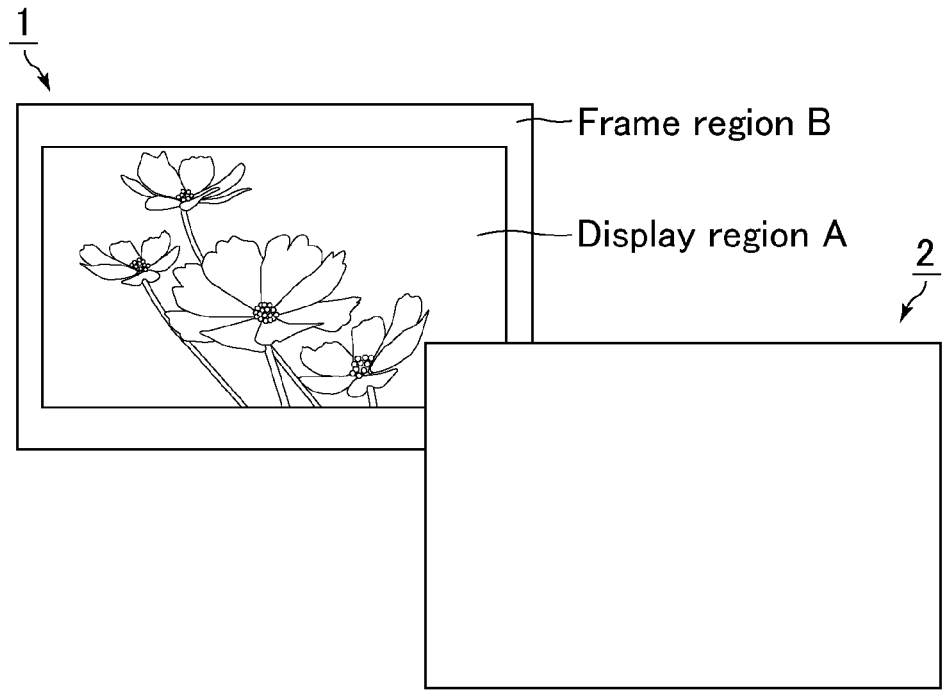
FIG. 1 is an explanatory view showing the screens of a mirror display of Example 1 in a display mode and in a mirror mode.

The present invention will be described in detail below by way of, but not limited to, the following examples referring to the drawings. For example, the structures of the respective examples may be employed in appropriate combination or may be modified as long as the combination or the modification is not beyond the spirit of the present invention.

EXAMPLE 1

Example 1 relates to a mirror display including a liquid crystal display device, a reflective polarizing plate serving as the half mirror layer, and a black tape serving as the reflectance adjuster. The term "half mirror layer" herein means a translucent layer that has reflectivity against incident light and that preferably has a reflectance against the natural light of 40% or higher, and more preferably 50% or higher. The term "reflectance" herein means a "luminous reflectance" unless otherwise mentioned. The half mirror layer may absorb part of the incident light.

FIG. 1 is an explanatory view showing the screens of a mirror display of Example 1 in a display mode and in a mirror mode. As shown in FIG. 1, in a mirror display 1 in the display mode, a display region A shows an image and a frame region B serves as a mirror. In contrast, in a mirror display 2 in the mirror mode, the display region A and the frame region B together form a single mirror surface, so that the whole surface of the mirror display serves as a mirror. The black tape adjusts the reflectance in the frame region so as to prevent the boundary line between the frame region and the display region from being observed. This allows the mirror display to serve as a mirror without any uncomfortable feeling. The display mode and the mirror mode may be driven at the same time so that an area that does not show an image in the display region A may be used as a mirror.

Figure 2:
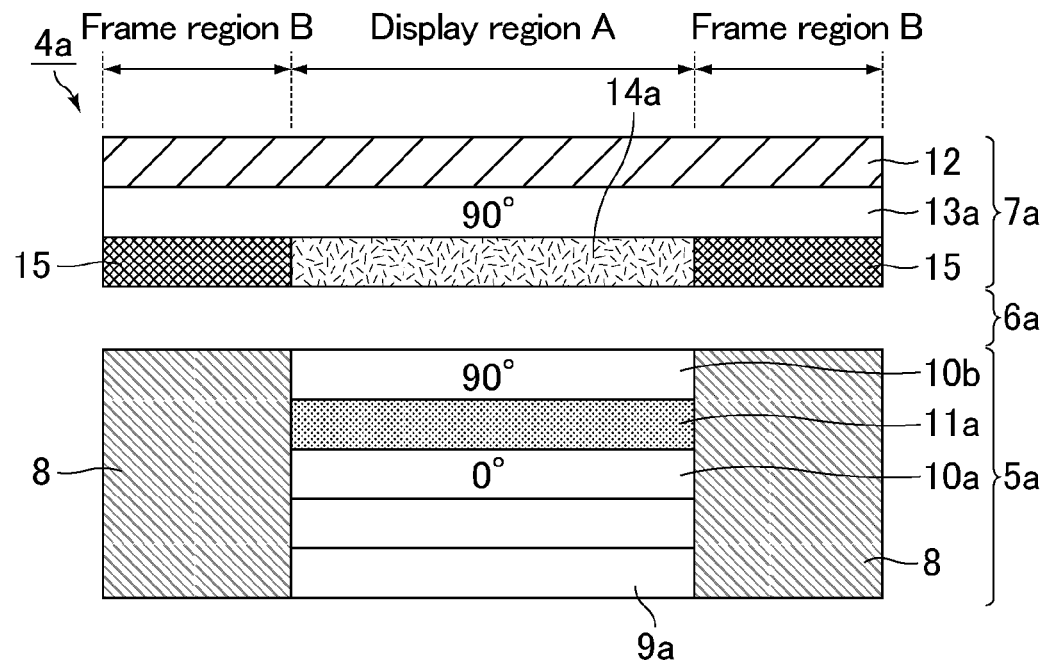
FIG. 2 is a schematic cross-sectional view showing the structure of the mirror display of Example 1.

FIG. 2 is a schematic cross-sectional view showing the structure of the mirror display of Example 1. As shown in FIG. 2, a mirror display 4a of Example 1 includes a liquid crystal display device 5a, an air layer 6a, and a half mirror plate 7a in the order set forth from the back side to the viewer side. The liquid crystal display device 5a and the half mirror plate 7a were fixed by fitting the upper and lower edges of the half mirror plate 7a to a pair of aluminum rails which are attached to the upper and lower edges of the liquid crystal display device 5a so as to form a frame-like structure. The air layer 6a is the space formed in a slight gap between the liquid crystal display device 5a and the half mirror plate 7a.

The liquid crystal display device 5a used was a liquid crystal television (trade name: LC-20F5, manufactured by Sharp Corp.) including a backlight 9a, two absorptive polarizing plates 10a and 10b disposed in a crossed-Nicols state, a liquid crystal panel 11a, and a bezel 8. The transmission axis of the back-side absorptive polarizing plate 10a was at an azimuth angle of 0° and the transmission axis of the viewer-side absorptive polarizing plate 10b was at an azimuth angle of 90°, provided that the degree of azimuth angle is defined to increase in positive (+) in the counterclockwise direction starting from the long side of the liquid crystal display device 5a. The azimuth angles of the axes are described on the basis of the above definition hereinbelow.

The viewer-side absorptive polarizing plate 10b underwent no anti-reflection treatment but underwent an anti-glare (AG) treatment with a haze of 3.0% on the surface thereof. The display mode of the liquid crystal panel 11a was UV$^2$A. The bezel 8 was made of a black plastic resin.

The absorptive polarizing plate 10b disposed on the viewer side of the liquid crystal display device 5a may be eliminated and the effects thereof may alternatively be achieved by a reflective polarizing plate 13a which serves as a half mirror layer disposed in the half mirror plate 7a. Still, reflective polarizing plates usually have a lower degree of polarization than absorptive polarizing plates. Thus, elimination of the absorptive polarizing plate 10b decreases the contrast of the mirror display in the display mode. On the contrary, if the reflective polarizing plate 13a has a sufficient degree of polarization, the absorptive polarizing plate 10b disposed on the viewer side of the liquid crystal display device 5a can be eliminated. In order to eliminate the absorptive polarizing plate 10b, the degree of polarization of the reflective polarizing plate 13a is preferably 90% or higher (the contrast ratio is 10 or higher), and the degree of polarization is more preferably 99% or higher (the contrast ratio is 100 or higher).

The half mirror plate 7a included a 2.5-mm-thick glass plate 12 and a reflective polarizing plate 13a stacked thereon with acrylic pressure-sensitive adhesive (not shown). Then, an anti-reflection film 14a was stacked on a region overlapping the display region of the liquid crystal panel 11a (the display region A of the mirror display 4a) with acrylic pressure-sensitive adhesive (not shown), and a black tape 15 was attached to the remaining region (the frame region B of the mirror display 4a). In order to allow the half mirror plate 7a to sufficiently serve as a mirror, no anti-reflection film was disposed on the viewing side of the glass plate 12. The thickness of the glass plate 12 is not limited to 2.5 mm as mentioned above, and may be thinner or thicker than this value. The glass plate 12 may be replaced by a transparent plate made of acrylic resin, for example.

The reflective polarizing plate 13a may be a multilayer reflective polarizing plate, a nanowire-grid polarizing plate, or a reflective polarizing plate utilizing the selective reflection of cholesteric liquid crystal, for example. Examples of the multilayer reflective polarizing plate include a reflective polarizing plate (trade name: DBEF) available from Sumitomo 3M Ltd. Examples of the nanowire-grid polarizing plate include those disclosed in JP 2006-201782 A and JP 2005-195824 A. Examples of the reflective polarizing plate utilizing the selective reflection of cholesteric liquid crystal include a reflective polarizing plate (trade name: PCF) available from Nitto Denko Corp. The present example used an inexpensive multilayer reflective polarizing plate (trade name: DBEF) of Sumitomo 3M Ltd., which shows mass-production results of large-area polarizing plates. The reflective polarizing plate 13a was disposed such that the transmission axis was at an azimuth angle of 90°.

The anti-reflection film 14a may be a moth-eye-structured film, an anti-reflection (AR) film, or a low-reflection (LR) film, for example. Examples of the moth-eye-structured film include those disclosed in the examples of WO 2006/059686. The AR film and the LR film are each a multilayer film including a base film and alternating layers of a high-refractive-index film and a low-refractive-index film stacked on the base film. They are designed such that the light components reflected on the respective interfaces of the films negate each other due to the interference of light. The base film may be made of triacetyl cellulose (TAC), polyethylene terephthalate (PET), or the like. The AR film has a stacked structure of vacuum-evaporated or sputtered inorganic films, and usually has a reflectance of 0.1 to 1%. The LR film has a wet-coated organic film structure, and usually has a reflectance of 0.3 to 2.5%. An anti-reflection film having a reflectance of 2% or lower is preferred. In order to achieve a high anti-reflection effect, the present example used a moth-eye-structured film with a reflectance of 0.3%.

The black tape 15 used was a vinyl tape (trade name: VINI-TAPE®) available from DENKI KAGAKU KOGYO K.K. The main base of the vinyl tape was made of a polyvinyl chloride-based material, and the pressure-sensitive adhesive thereof was made of a rubbery material. The refractive index of each material was assumed to be about 1.5, which was substantially the same as the refractive index of various materials for liquid crystal displays, such as glass and polarizing plates. Thus, reflection hardly occurs on the interface between the reflective polarizing plate 13a and the black tape 15, and the light passing through the reflective polarizing plate 13a in the frame region B is absorbed by the black tape 15.

In FIG. 2, the black tape 15 is disposed such that the edges of the black tape 15 are in contact with the edges of the anti-reflection film 14a without overlapping the anti-reflection film 14a. Still, the black tape 15 may be disposed so as to cover an edge of the anti-reflection film 14a. The same applies to the following examples.

In place of attaching the black tape 15, a black coating may be applied.

The mirror display 4a of the present example can be driven in both the display mode and the mirror mode based on the following principles.

In the display mode, the liquid crystal panel 11a shows an image and a viewer observes the image on the liquid crystal panel 11a through the half mirror plate 7a. The light emitted from the liquid crystal display device 5a is linearly polarized light vibrating in an azimuth angle of 90°, while the transmission axis of the reflective polarizing plate 13a of the half mirror plate 7a is at an azimuth angle of 90°. Thus, the light can passes through the reflective polarizing plate 13a with hardly any loss. As a result, the mirror display 4a of the present example can show an image with a high luminance even though it includes the half mirror plate 7a.

On the other hand, in the mirror mode, the liquid crystal panel 11a shows no image and a viewer observes only the outside light reflected on the surface of the half mirror plate 7a. Specifically, most of the linearly polarized light components vibrating in an azimuth angle of 0° among the light components incident on the half mirror plate 7a from the viewer side are reflected on the reflective polarizing plate 13a whose transmission axis is at an azimuth angle of 90°, in other words, whose reflection axis is at an azimuth angle of 0°. As a result, the mirror display 4a of the present example serves as a mirror when the liquid crystal panel 11a shows no image.

Further, the linearly polarized light components vibrating in an azimuth angle of 90° among the outside light components incident on the half mirror plate 7a from the viewer side pass through the reflective polarizing plate 13a whose transmission axis is at an azimuth angle of 90°. In the frame region B where the bezel 8 is disposed, the light transmitted through the reflective polarizing plate 13a is absorbed by the black tape 15 attached to the back side (from the viewpoint of a viewer) of the half mirror plate 7a. In contrast, in the display region A where the liquid crystal panel 11a is disposed, the light passing through the reflective polarizing plate 13a is hardly reflected on the interface with the air layer 6a and is incident on the air layer 6a by the effect of the anti-reflection film 14a attached to the back side (from the viewpoint of a viewer) of the half mirror plate 7a. Then, part of the light is reflected on the interface between the air layer 6a and the viewer-side absorptive polarizing plate 10b of the liquid crystal display device 5a, whereas the remaining light is absorbed by the absorptive polarizing plates 10a and 10b, a color filter (not shown), and other components of the liquid crystal display device 5a. Thereby, the display region A and the frame region B have substantially the same reflectance, preventing the boundary line between the display region A and the frame region B from being observed.

For the azimuth angle (90°) of the transmission axis of the reflective polarizing plate 13a, the azimuth angle) (0°) of the transmission axis of the back-side absorptive polarizing plate 10a, and the azimuth angle (90°) of the transmission axis of the viewer-side absorptive polarizing plate 10b, the relationship among these azimuth angles is important and a shift of the azimuth angle from the set angle deteriorates the display quality. Still, a shift of the azimuth angle by about 3°, for example, may be accepted in practice.

EXAMPLE 2

Figure 3:
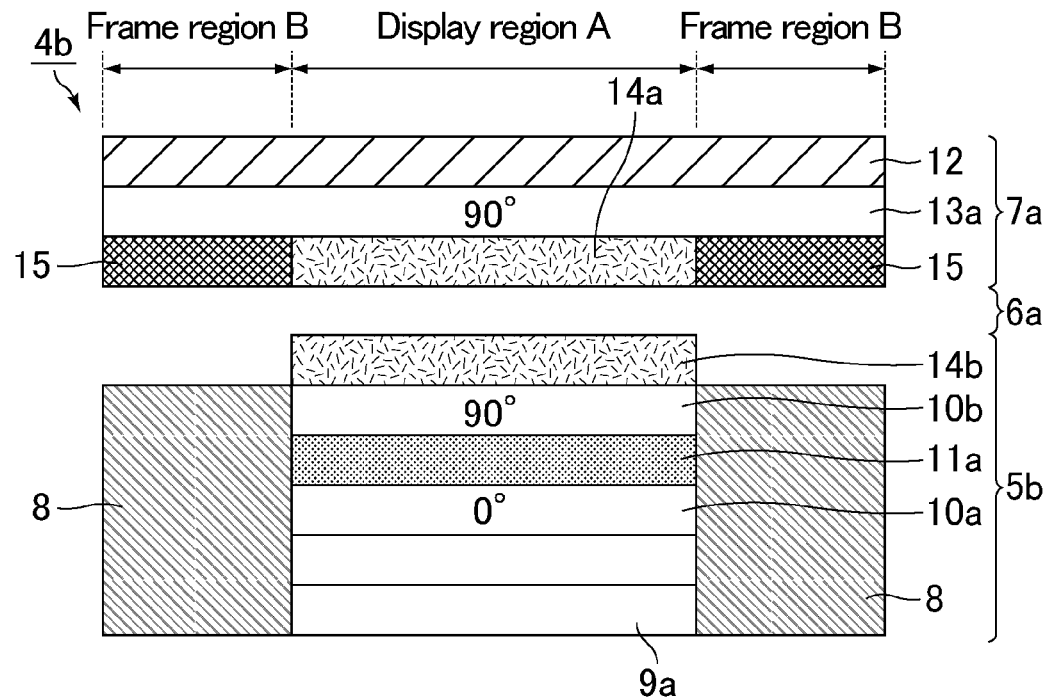
FIG. 3 is a schematic cross-sectional view showing the structure of a mirror display of Example 2.

Example 2 relates to a mirror display including a liquid crystal display device, a reflective polarizing plate serving as the half mirror layer, and a black tape serving as the reflectance adjuster. The difference from Example 1 is that an anti-reflection film is provided for the liquid crystal display device. FIG. 3 is a schematic cross-sectional view showing the structure of a mirror display of Example 2. As shown in FIG. 3, an anti-reflection film 14b was stacked on the position closer to a viewer than the viewer-side absorptive polarizing plate 10b of a liquid crystal display device 5b with acrylic pressure-sensitive adhesive (not shown).

The driving principles in the display mode and in the mirror mode are substantially the same as those in Example 1, so that the explanation of the same respects is omitted here. With respect to a mirror display 4b of Example 2, the light passing through the reflective polarizing plate 13a in the display region A is hardly reflected on the interface with the air layer 6a and is incident on the liquid crystal display device 5b by the effect of the anti-reflection film 14b disposed on the viewer side of the liquid crystal display device 5b. Then, the incident light is absorbed by the absorptive polarizing plates 10a and 10b, a color filter (not shown), and other components of the liquid crystal display device 5b. In Example 2, the display region A and the frame region B also have substantially the same reflectance, preventing the boundary line between the display region A and the frame region B from being observed.

EXAMPLE 3

Figure 4:
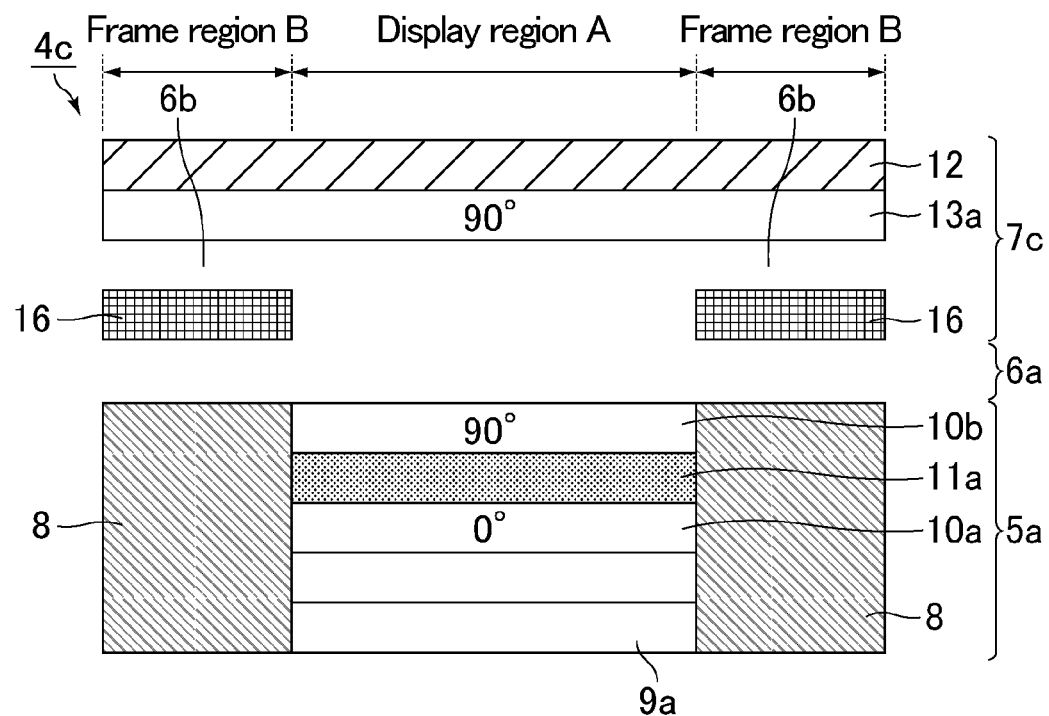
FIG. 4 is a schematic cross-sectional view showing the structure of a mirror display of Example 3.

Example 3 relates to a mirror display including a liquid crystal display device, a reflective polarizing plate serving as the half mirror layer, and black paper serving as the reflectance adjuster. The difference from Example 1 is that the black tape, which is attached to the reflective polarizing plate and serves as the reflectance adjuster, is replaced by the black paper disposed apart from the reflective polarizing plate and that no anti-reflection film is disposed on the back side of the half mirror plate. FIG. 4 is a schematic cross-sectional view showing the structure of a mirror display of Example 3. As shown in FIG. 4, black paper 16 is disposed in a region (frame region B) that does not overlap the display region of the liquid crystal display device 5a with an air layer 6b interposed therebetween. The black paper 16 constitutes part of a half mirror plate 7c.

The driving principles in the display mode and in the mirror mode are substantially the same as those in Example 1, so that the explanation of the same respects is omitted here. With respect to a mirror display 4c of Example 3, the light passing through the reflective polarizing plate 13a is incident on the air layers 6a and 6b in both the display region A and the frame region B, so that an interface reflection occurs. Part of the light components traveling in the display region A among the light components which are not reflected on the interface and which are incident on the air layers 6a and 6b is reflected on the interface between the air layer 6a and the viewer-side absorptive polarizing plate 10b of the liquid crystal display device 5a. In contrast, the remaining light components are absorbed by the absorptive polarizing plates 10a and 10b, a color filter (not shown), and other components of the liquid crystal display device 5a. Also, part of the light traveling in the frame region B is reflected on the black paper 16, and the remaining light is absorbed by the black paper 16. Thereby, the display region A and the frame region B have substantially the same reflectance, preventing the boundary line between the display region A and the frame region B from being observed.

In the present example, the black paper 16 is disposed with the air layer 6b interposed therebetween. Thus, light is reflected on the interface between the reflective polarizing plate 13a and the air layer 6b and on the interface between the air layer 6b and the black paper 16. As a result, the reflectance in the frame region B is higher than in the case of disposing a light-absorbing component in direct contact with the reflective polarizing plate 13a. Since the reflectance in the frame region B is high in the present example, the reflectances in the display region A and in the frame region B can be equal even without disposing the anti-reflection film 14a on the interface between the reflective polarizing plate 13a and the air layer 6a as in Example 1. Therefore, the present example is suitable for the cases where the performance as a mirror is important and the display region A is allowed to have a higher reflectance.

EXAMPLE 4

Figure 5:
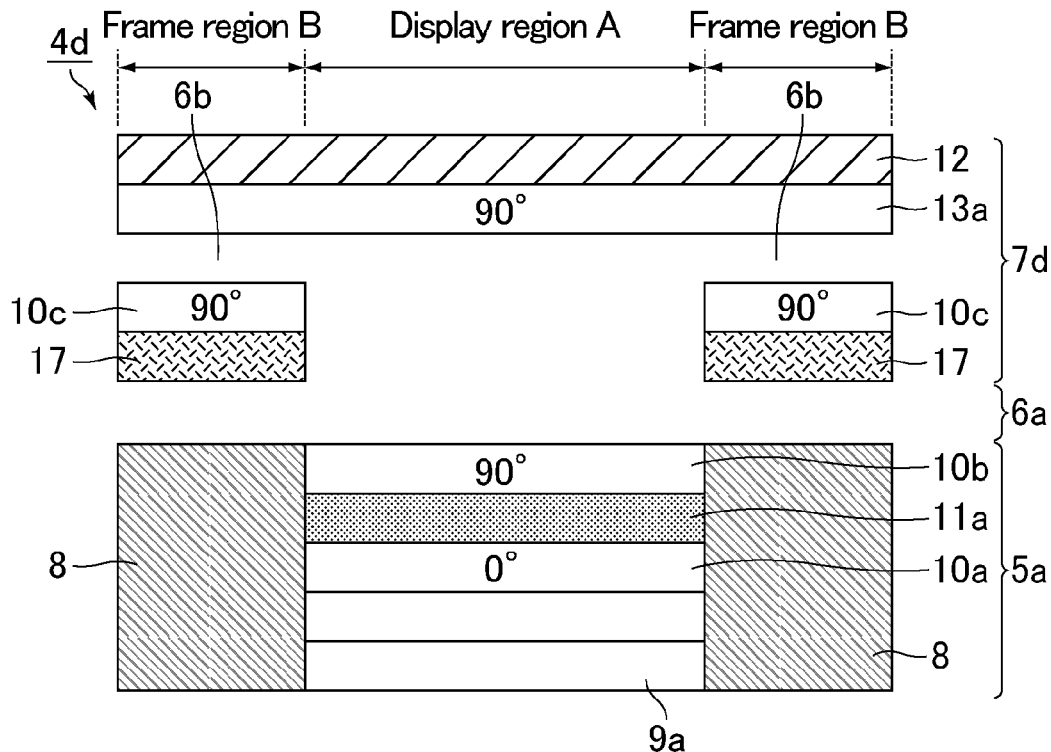
FIG. 5 is a schematic cross-sectional view showing the structure of a mirror display of Example 4.

Example 4 relates to a mirror display including a liquid crystal display device, a reflective polarizing plate serving as the half mirror layer, and a black acrylic plate and an absorptive polarizing plate serving as the reflectance adjusters. The difference from Example 1 is that the black tape, which is attached to the reflective polarizing plate and serves as the reflectance adjuster, is replaced by a combination of the black acrylic plate and the absorptive polarizing plate disposed apart from the reflective polarizing plate, and that no anti-reflection film is disposed on the back side of the half mirror plate. FIG. 5 is a schematic cross-sectional view showing the structure of a mirror display of Example 4. As shown in FIG. 5, the bezel 8 of the liquid crystal display device 5a, a black acrylic plate 17, an absorptive polarizing plate 10c, the air layer 6b, a reflective polarizing plate 13a, and the glass plate 12 were disposed in the order set forth from the back side to the viewer side in a region (frame region B) that does not overlap the display region of the liquid crystal display device 5a. The black acrylic plate 17 and the absorptive polarizing plate 10c constitute part of a half mirror plate 7d. Similar to the absorptive polarizing plate 10b disposed on the viewer side of the liquid crystal display device 5a, the absorptive polarizing plate 10c underwent an AG treatment with a haze of 3.0%, and was attached to the black acrylic plate 17 with acrylic pressure-sensitive adhesive (not shown) such that the transmission axis thereof is at an azimuth angle of 90°.

In the present example, the absorptive polarizing plate 10c was attached to the black acrylic plate 17. Still, the same effects can be achieved by eliminating the black acrylic plate 17 and directly attaching the absorptive polarizing plate 10c to the bezel 8 (made of black plastic resin) of the liquid crystal display device 5a.

The driving principles in the display mode and in the mirror mode are substantially the same as those in Example 1, so that the explanation of the same respects is omitted here. With respect to a mirror display 4d of Example 4, the light passing through the reflective polarizing plate 13a is incident on the air layers 6a and 6b in both the display region A and the frame region B, so that an interface reflection occurs. Part of the light components traveling in the display region A among the light components which are not reflected on the interface and which are incident on the air layers 6a and 6b is reflected on the interface between the air layer 6a and the viewer-side absorptive polarizing plate 10b of the liquid crystal display device 5a, and the remaining light components are absorbed by the absorptive polarizing plates 10a and 10b, a color filter (not shown), and other components of the liquid crystal display device 5a. Part of the light traveling in the frame region B is reflected on the absorptive polarizing plate 10c and the remaining light is absorbed thereby. As a result, the display region A and the frame region B have substantially the same reflectance, preventing the boundary line between the display region A and the frame region B from being observed.

Since the black paper 16 is replaced by the absorptive polarizing plate 10c undergone an AG treatment in the present example, the difference not only in reflectance but also in texture of the mirror surface between the display region A and the frame region B is minimized in comparison with Example 3. Thus, the present example provides an effect of much more preventing the boundary line between the display region A and the frame region B from being observed.

EXAMPLE 5

Figure 6:
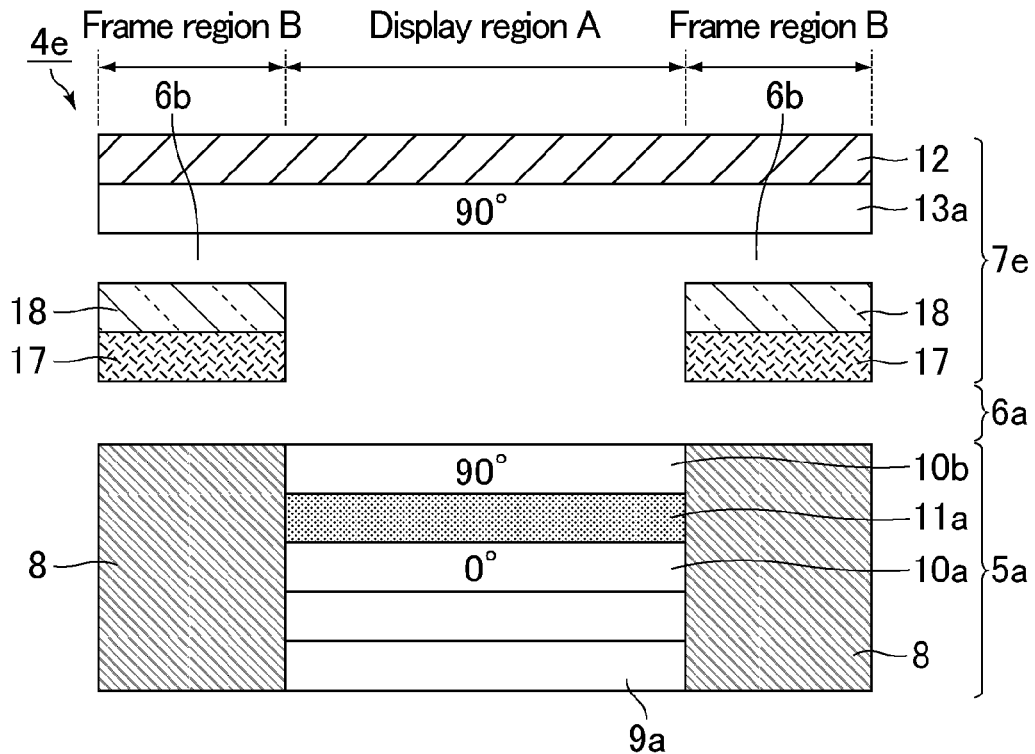
FIG. 6 is a schematic cross-sectional view showing the structure of a mirror display of Example 5.

Example 5 relates to a mirror display including a liquid crystal display device, a reflective polarizing plate serving as the half mirror layer, and a black acrylic plate and an AG film serving as the reflectance adjusters. The difference from Example 4 is that the combination of the black acrylic plate and the absorptive polarizing plate as the reflectance adjusters disposed apart from the reflective polarizing plate is replaced by a combination of the black acrylic plate and the AG film disposed apart from the reflective polarizing plate. FIG. 6 is a schematic cross-sectional view showing the structure of a mirror display of Example 5. As shown in FIG. 6, the bezel 8 of the liquid crystal display device 5a, the black acrylic plate 17, an AG film 18, the air layer 6b, the reflective polarizing plate 13a, and the glass plate 12 were disposed in the order set forth from the back side to the viewer side in a region (frame region B) that does not overlap the display region of the liquid crystal display device 5a. The black acrylic plate 17 and the AG film 18 constitute part of a half mirror plate 7e. The AG film 18 includes a TAC film whose surface underwent an AG treatment with a haze of 3.0%, and it was attached to the black acrylic plate 17 with acrylic pressure-sensitive adhesive (not shown).

Also with respect to a mirror display 4e of the present example, the difference not only in reflectance but also in texture of the mirror surface between the display region A and the frame region B is minimized. Thus, the present example provides an effect of much more preventing the boundary line between the display region A and the frame region B from being observed.

EXAMPLE 6

Figure 7:
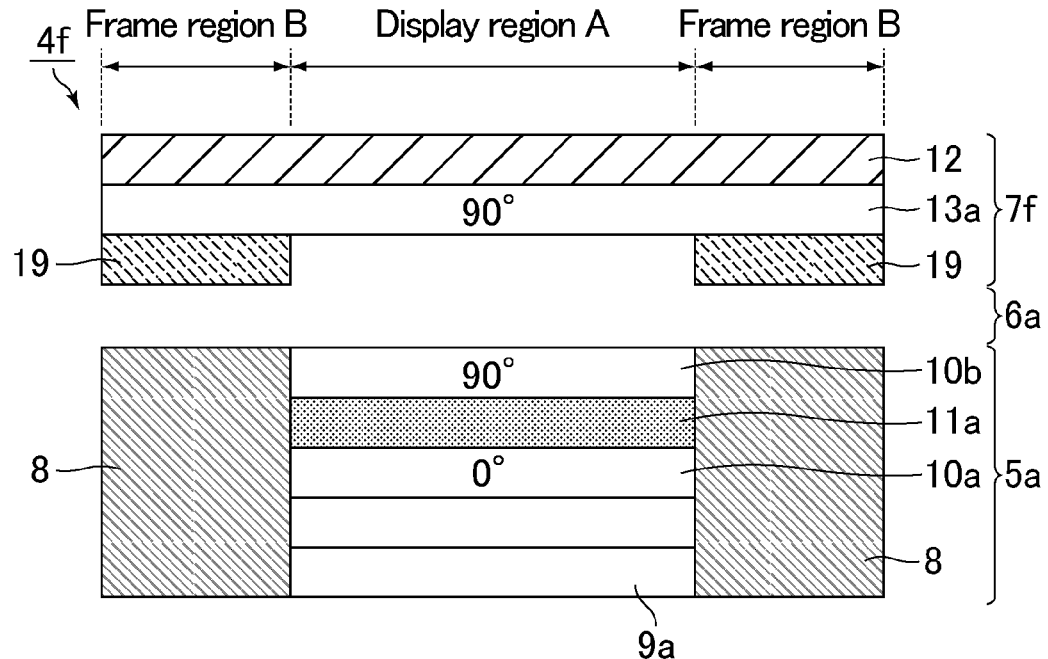
FIG. 7 is a schematic cross-sectional view showing the structure of a mirror display of Example 6.

Example 6 relates to a mirror display including a liquid crystal display device, a reflective polarizing plate serving as the half mirror layer, and a gray tape serving as the reflectance adjuster. The difference from Example 3 is that the black paper disposed apart from the reflective polarizing plate is replaced by the gray tape attached to the reflective polarizing plate. FIG. 7 is a schematic cross-sectional view showing the structure of a mirror display of Example 6. As shown in FIG. 7, a gray tape 19 was attached to the reflective polarizing plate 13a in a region (frame region B) that does not overlap the display region of the liquid crystal display device 5a.

The gray tape 19 used was a vinyl tape (trade name: VINI-TAPE®) available from DENKI KAGAKU KOGYO K.K. The main base of the vinyl tape was made of a polyvinyl chloride-based material and the pressure-sensitive adhesive was made of a rubbery material. The refractive index of each material was assumed to be about 1.5, which was substantially the same as the refractive index of various materials for liquid crystal displays, such as glass and polarizing plates.

The driving principles in the display mode and in the mirror mode are substantially the same as those in Example 3, so that the explanation of the same respects is omitted here. With respect to a mirror display 4f of Example 6, a slight part of the light passing through the reflective polarizing plate 13a is reflected on the base of the gray tape 19 attached to the back side (from the viewpoint of a viewer) of a half mirror plate 7f and the remaining light is absorbed thereby in a frame region B where the bezel 8 is disposed. In contrast, in the display region A where no gray tape 19 is attached, the light passing through the reflective polarizing plate 13a is incident on the air layer 6a. Thus, part of the light is reflected on the interface between the reflective polarizing plate 13a and the air layer 6a, and the remaining light is incident on the surface of the viewer-side absorptive polarizing plate 10b of the liquid crystal display device 5a. Also, part of the light is reflected on the interface between the air layer 6a and the viewer-side absorptive polarizing plate 10b, and the remaining light is absorbed by the absorptive polarizing plates 10a and 10b, a color filter (not shown), and other components of the liquid crystal display device 5a. The base of the gray tape 19 had a color that allows the display region A and the frame region B to have substantially the same reflectance, preventing the boundary line between the display region A and the frame region B from being observed.

The gray tape 19 of the present example has a higher reflectance than the black tape 15 of Example 1. Thus, in the present example, the reflectance in the frame region B is so high that, unlike Example 1, the reflectances in the display region A and in the frame region B can be equal even without disposing the anti-reflection film 14a on the interface between the reflective polarizing plate 13a and the air layer 6a. Therefore, the structure of the present example is suitable for the cases where the performance as a mirror is important and the display region A is allowed to have a higher reflectance.

EXAMPLE 7

Figure 8:
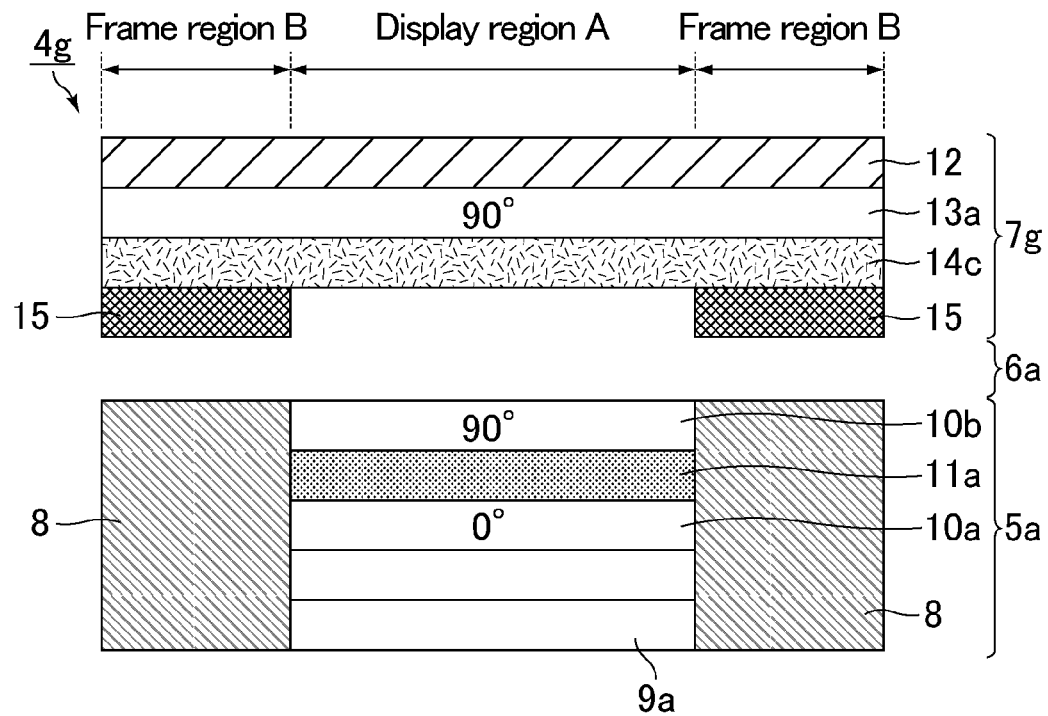
FIG. 8 is a schematic cross-sectional view showing the structure of a mirror display of Example 7.

Example 7 relates to a mirror display including a liquid crystal display device, a reflective polarizing plate serving as the half mirror layer, and a black tape serving as the reflectance adjuster. The difference from Example 1 is that the anti-reflection film of the half mirror plate is formed not only in the display region but also in the frame region. FIG. 8 is a schematic cross-sectional view showing the structure of a mirror display of Example 7. As shown in FIG. 8, a half mirror plate 7g included the 2.5-mm-thick glass plate 12, the reflective polarizing plate 13a stacked thereon with acrylic pressure-sensitive adhesive (not shown), an anti-reflection film 14c stacked on the reflective polarizing plate with acrylic pressure-sensitive adhesive (not shown), and the black tape 15 attached on the anti-reflection film in a region (frame region B) that does not overlap the display region A of the liquid crystal display device 5a.

The driving principles in the display mode and in the mirror mode are substantially the same as those in Example 1, so that the explanation of the same respects is omitted here. In a mirror display 4g of Example 7, the light passing through the reflective polarizing plate 13a is absorbed by the black tape 15 in the frame region B where the black tape 15 is attached. In contrast, in the display region A, the light is hardly reflected on the interface with the air layer 6a by the effects of the anti-reflection film 14c and is incident on the air layer 6a. Then, part of the incident light is reflected on the interface between the air layer 6a and the viewer-side absorptive polarizing plate 10b of the liquid crystal display device 5a, and the remaining light is absorbed by the absorptive polarizing plates 10a and 10b, a color filter (not shown), and other components of the liquid crystal display device 5a. Also in Example 7, the display region A and the frame region B have substantially the same reflectance, preventing the boundary line between the display region A and the frame region B from being observed.

In the present example, the black tape 15 is disposed so as to overlap the anti-reflection film 14c. Thus, the present example can eliminate the patterning of the anti-reflection film 14c. This makes it easier to produce the half mirror plate 7g of the present example than to produce the half mirror plate of Example 1 wherein the anti-reflection film 14a is disposed only in the display region A.

EXAMPLE 8

Figure 9:
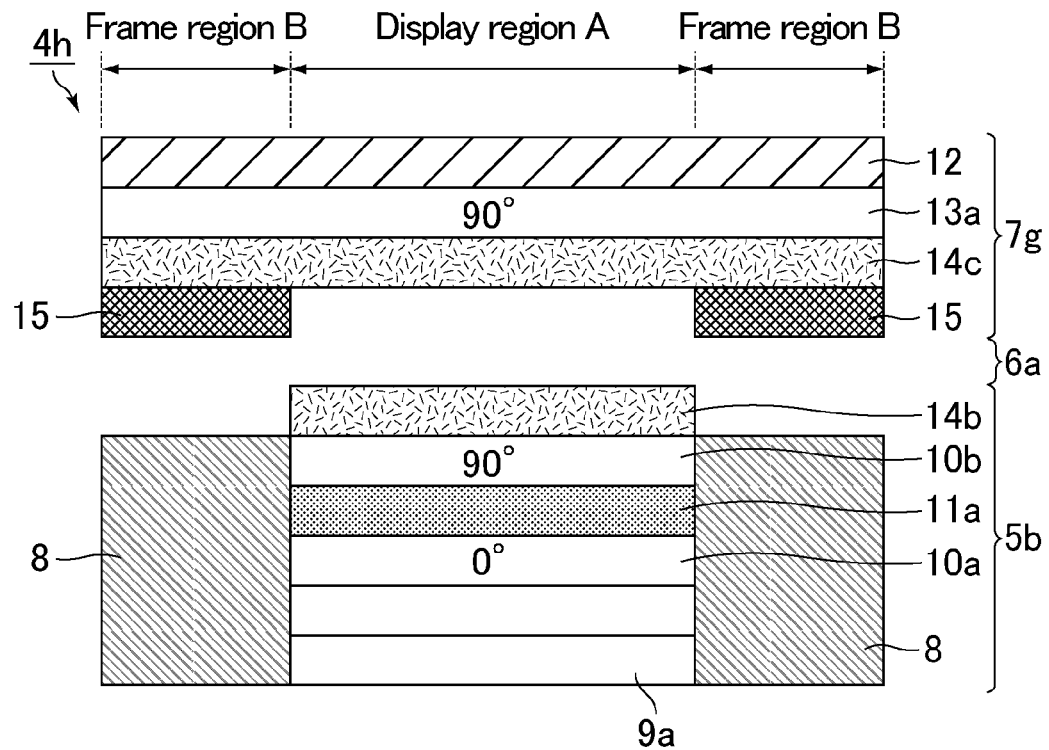
FIG. 9 is a schematic cross-sectional view showing the structure of a mirror display of Example 8.

Example 8 relates to a mirror display including a liquid crystal display device, a reflective polarizing plate serving as the half mirror layer, and a black tape serving as the reflectance adjuster. The difference from Example 7 is that the anti-reflection film is added to the liquid crystal display device. FIG. 9 is a schematic cross-sectional view showing the structure of a mirror display of Example 8. As shown in FIG. 9, the anti-reflection film 14b was stacked on the position closer to a viewer than the viewer-side absorptive polarizing plate 10b of the liquid crystal display device 5b with acrylic pressure-sensitive adhesive (not shown).

The driving principles in the display mode and in the mirror mode are substantially the same as those in Example 7, so that the explanation of the same respects is omitted here. In a mirror display 4h of Example 8, the light passing through the reflective polarizing plate 13a is hardly reflected on the interface with the air layer 6a by the effects of the anti-reflection film 14b disposed on the viewer side of the liquid crystal display device 5b and are incident on the liquid crystal display device 5b in the display region A. Then, the incident light is absorbed by the absorptive polarizing plates 10a and 10b, a color filter (not shown), and other components of the liquid crystal display device 5b. Also in Example 8, the display region A and the frame region B have substantially the same reflectance, preventing the boundary line between the display region A and the frame region B from being observed.

EXAMPLE 9

Figure 10:
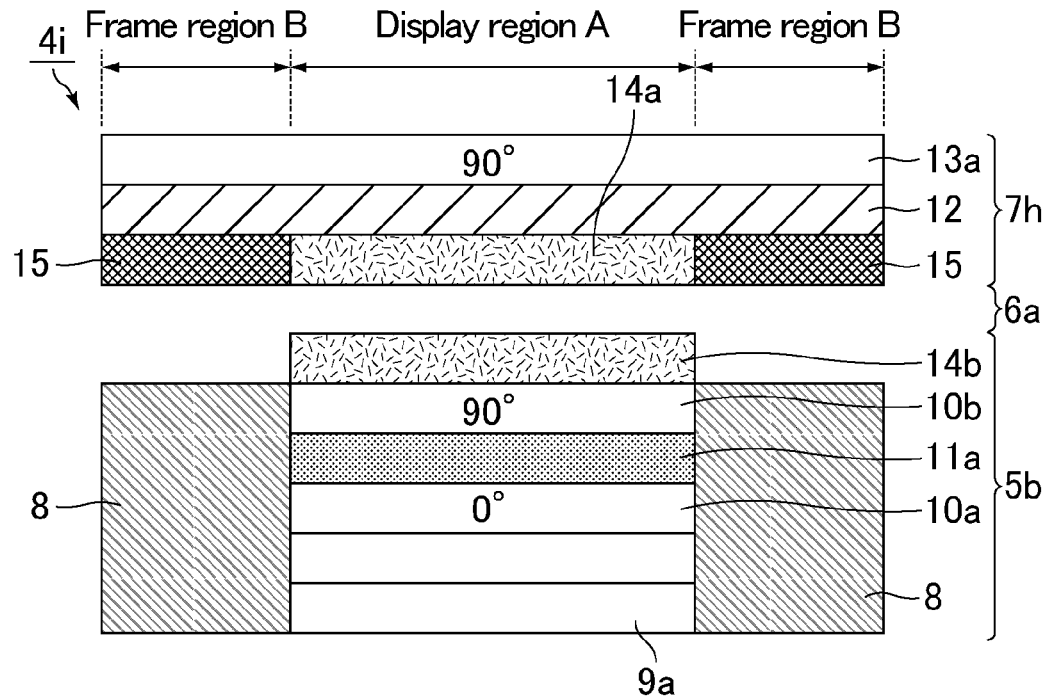
FIG. 10 is a schematic cross-sectional view showing the structure of a mirror display of Example 9.

Example 9 relates to a mirror display including a liquid crystal display device, a reflective polarizing plate serving as the half mirror layer, and a black tape serving as the reflectance adjuster. The difference from Example 2 is that the glass plate is disposed between the reflective polarizing plate and a combination of the black tape and the anti-reflection film. FIG. 10 is a schematic cross-sectional view showing the structure of a mirror display of Example 9. As shown in FIG. 10, a half mirror plate 7h includes the anti-reflection film 14a and the black tape 15, the glass plate 12, and the reflective polarizing plate 13a in the order set forth from the back side to the viewer side.

The driving principles in the display mode and in the mirror mode are the same as those in Example 2, so that the explanation thereof is omitted here. Also in a mirror display 4i of Example 9, the display region A and the frame region B have substantially the same reflectance, preventing the boundary line between the display region A and the frame region B from being observed.

EXAMPLE 10

Figure 11:
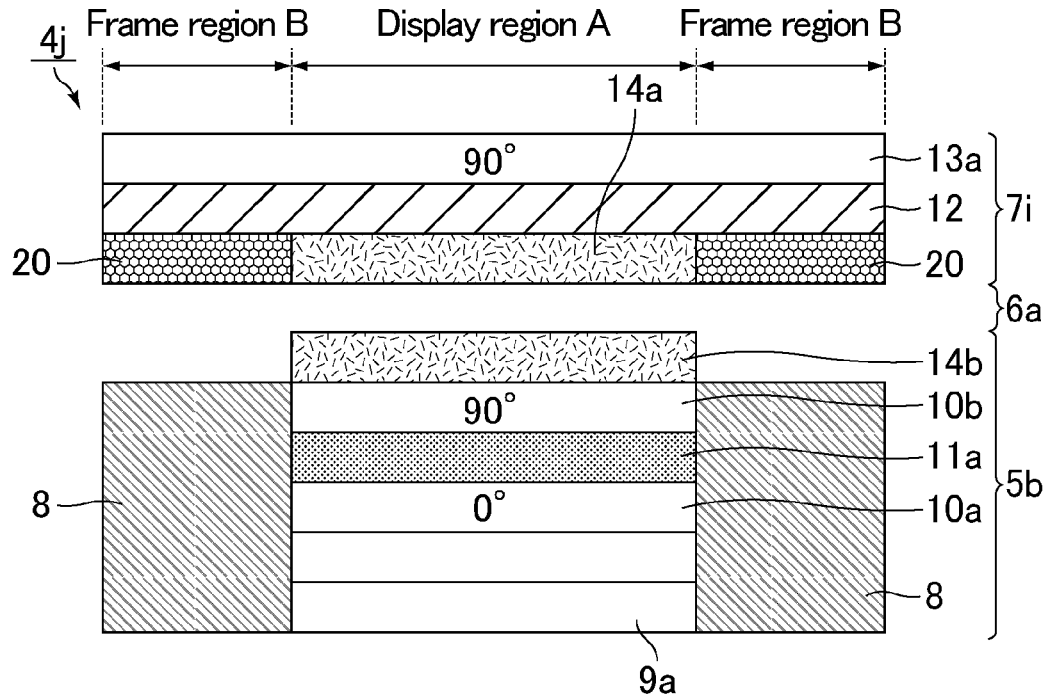
FIG. 11 is a schematic cross-sectional view showing the structure of a mirror display of Example 10.

Example 10 relates to a mirror display including a liquid crystal display device, a reflective polarizing plate serving as the half mirror layer, and a ceramic-printed layer serving as the reflectance adjuster. The difference from Example 9 is that the black tape serving as the reflectance adjuster is replaced by the ceramic-printed layer. FIG. 11 is a schematic cross-sectional view showing the structure of a mirror display of Example 10. As shown in FIG. 11, a half mirror plate 7i includes the glass plate 12 and a black ceramic-printed layer 20, the ceramic-printed layer being formed by ceramic printing on the glass plate at the side facing the reflective polarizing plate 13a in a region (frame region B) that does not overlap the display region of the liquid crystal display device 5b. The ceramic printing is a technique of forming a film by, for example, spraying a coating in admixture with glass powder, and then burning the sprayed coating.

The driving principles in the display mode and in the mirror mode are the same as those in Example 1 except that the light passing through the reflective polarizing plate 13a is absorbed by not the black tape 15 but the coating contained in the black ceramic-printed layer 20. Thus, the explanation thereof is omitted here. Also in a mirror display 4j of Example 10, the display region A and the frame region B have substantially the same reflectance, preventing the boundary line between the display region A and the frame region B from being observed. Although the present example uses the black ceramic-printed layer 20 in place of the black tape, a black color may be printed by a printing technique other than the ceramic printing.

EXAMPLE 11

Figure 12:
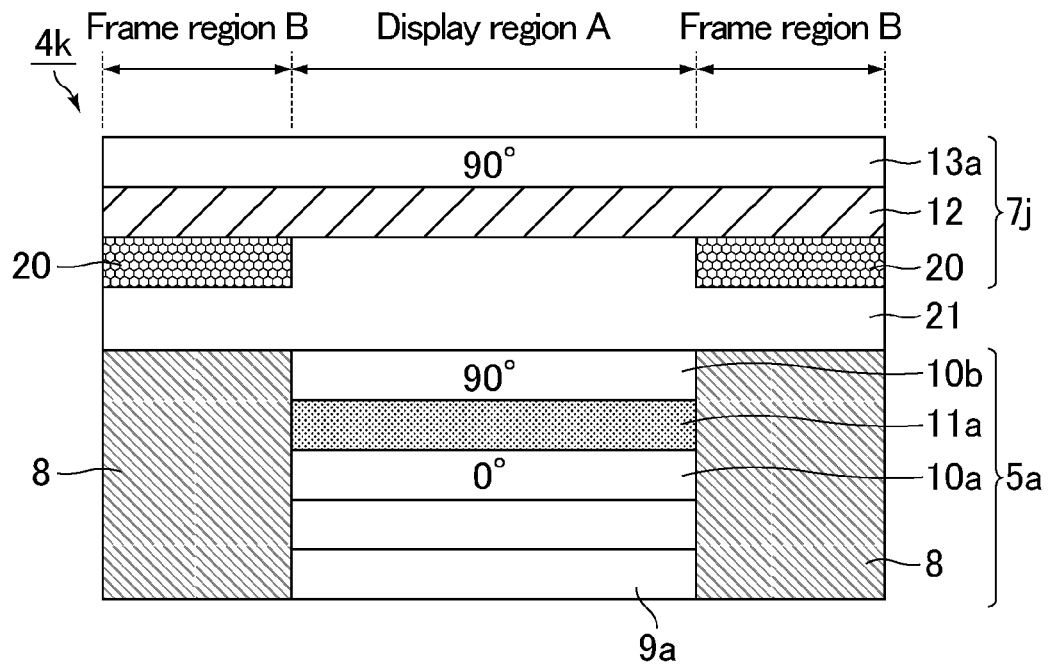
FIG. 12 is a schematic cross-sectional view showing the structure of a mirror display of Example 11.

Example 11 relates to a mirror display including a liquid crystal display device, a reflective polarizing plate serving as the half mirror layer, and a ceramic-printed layer serving as the reflectance adjuster. The difference from Example 10 is that the structure of disposing the anti-reflection film on both the half mirror plate and the liquid crystal display device and forming the air layer therebetween is replaced by a structure of charging a transparent adhesive into between the half mirror plate and the liquid crystal display device. FIG. 12 is a schematic cross-sectional view showing the structure of a mirror display of Example 11. As shown in FIG. 12, a mirror display 4k of Example 11 includes the liquid crystal display device 5a, a transparent adhesive layer 21, and a half mirror plate 7j in the order set forth from the back side to the viewer side.

Examples of the transparent adhesive include acrylic resin (refractive index: 1.5). Specifically, UV-curable photoelastic resin (trade name: WORLD ROCK HRJ series, manufactured by Kyoritsu Chemical & Co., Ltd.) was used.

If the half mirror plate 7j and the liquid crystal display device 5a are bonded using transparent adhesive charged into therebetween, they are difficult to separate thereafter. Thus, they are difficult to rework even if either the half mirror plate 7j or the liquid crystal display device 5a has a defect. Further, a stress may occur during the curing of transparent adhesive, causing deformation, such as a warp, of the mirror display 4k. Such addition of the bonding step causes an increase in production cost. In contrast, the refractive index of the transparent adhesive layer 21 is closer to those of the half mirror plate 7j and the liquid crystal display device 5a than that of the air layer. Thus, the transparent adhesive layer can suppress unnecessary reflection.

The driving principles in the display mode and in the mirror mode are substantially the same as those in Example 10, so that the explanation of the same respects is omitted here. In the mirror display 4k of Example 11, the half mirror plate 7j and the liquid crystal display device 5a are optically bonded by the transparent adhesive layer 21. Thus, the light passing through the reflective polarizing plate 13a is incident on the liquid crystal display device 5a without interface reflection in the display region A, and then the incident light is absorbed by absorptive polarizing plates 10a and 10b, a color filter (not shown), and other components of the liquid crystal display device 5a. Also in Example 11, the display region A and the frame region B have substantially the same reflectance, preventing the boundary line between the display region A and the frame region B from being observed.

EXAMPLE 12

Figure 13:
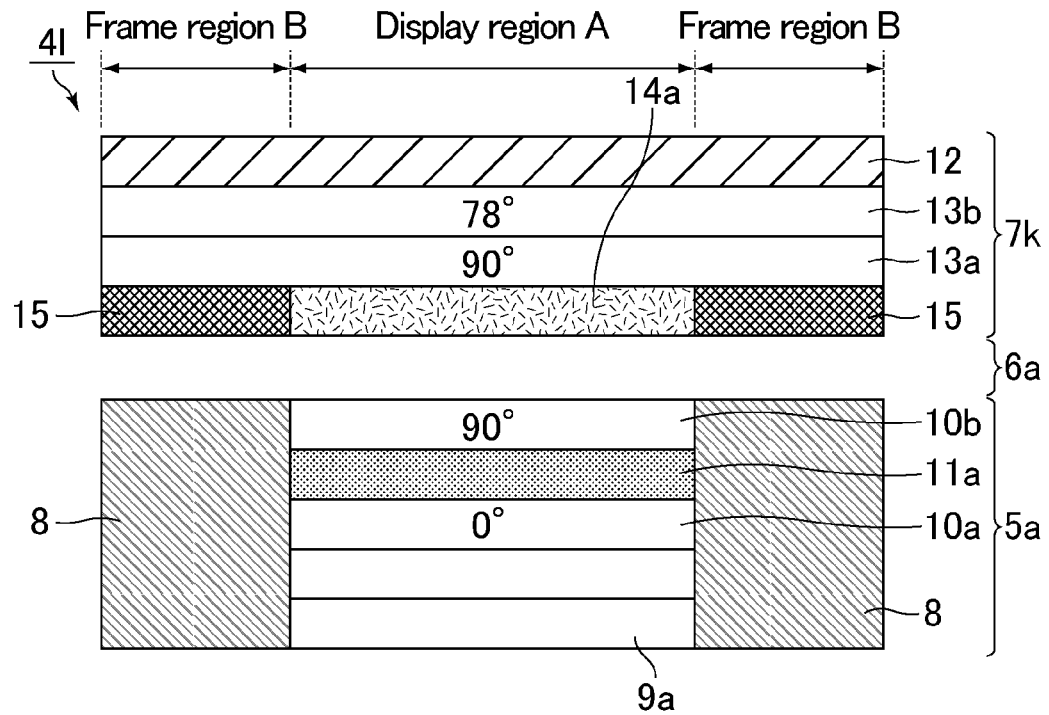
FIG. 13 is a schematic cross-sectional view showing the structure of a mirror display of Example 12.

Example 12 relates to a mirror display including a liquid crystal display device, a reflective polarizing plate serving as the half mirror layer, and a black tape serving as the reflectance adjuster. The difference from Example 1 is that a reflective polarizing plate whose transmission axis is at an azimuth angle of 78° is added to the half mirror plate. FIG. 13 is a schematic cross-sectional view showing the structure of a mirror display of Example 12. As shown in FIG. 13, a half mirror plate 7k of Example 12 includes the anti-reflection film 14a and the black tape 15, a first reflective polarizing plate 13a (azimuth of transmission axis: 90°), a second reflective polarizing plate 13b (azimuth of transmission axis: 78°), and the glass plate 12 in the order set forth from the back side to the viewer side. The respective components were bonded with acrylic pressure-sensitive adhesive (not shown).

A mirror display 4*l* of the present example can be driven in both the display mode and the mirror mode on the basis of the following principles.

In the display mode, the light emitted from the liquid crystal display device 5*a* is linearly polarized light vibrating in an azimuth angle of 90°. Since the transmission axis of the first reflective polarizing plate 13*a* is at an azimuth angle of 90°, the light can pass through the first reflective polarizing plate 13*a* with hardly any loss. In contrast, the transmission axis of the second reflective polarizing plate 13*b* is at an azimuth angle of 78°. The linearly polarized light vibrating in an azimuth angle of 90° can be divided into linearly polarized light components vibrating in an azimuth angle of 78° and linearly polarized light components vibrating in an azimuth perpendicular thereto, in other words, in an azimuth angle of 168°. Thus, when the linearly polarized light components vibrating in an azimuth angle of 90° are incident on the second reflective polarizing plate 13*b* whose transmission axis is at an azimuth angle of 78°, the linearly polarized light components vibrating in an azimuth angle of 78° can pass through the second reflective polarizing plate, while the linearly polarized light components vibrating in an azimuth angle of 168° fail to pass therethrough and are reflected thereon. As a result, although the mirror display 4*l* of the present example has a lower luminance than the mirror display 4*a* of Example 1, it can show an image in the display mode with a practically sufficient luminance.

On the other hand, in the mirror mode, most of the linearly polarized light components vibrating in an azimuth angle of 168° among the light components incident on the half mirror plate 7*k* from the viewer side are reflected on the second reflective polarizing plate 13*b* whose transmission axis is at an azimuth angle of 78°, in other words, whose reflection axis is at an azimuth angle of 168°. As a result, the mirror display 4*l* of the present example serves as a mirror when the liquid crystal panel 11*a* shows no image.

The linearly polarized light components vibrating in an azimuth angle of 78° among the outside light components incident on the half mirror plate 7*k* from the viewer side pass through the second reflective polarizing plate 13*b* whose transmission axis is at an azimuth angle of 78°. The linearly polarized light vibrating in an azimuth angle of 78° can be divided into the linearly polarized light components vibrating in an azimuth angle of 90° and linearly polarized light components vibrating in an azimuth perpendicular thereto, in other words, in an azimuth angle of 0°. Thus, the light components vibrating in an azimuth angle of 90° among the linearly polarized light components vibrating in an azimuth angle of 78° transmitted through the second reflective polarizing plate 13*b* whose transmission axis is at an azimuth angle of 78° pass through the first reflective polarizing plate 13*a* whose transmission axis is at an azimuth angle of 90°, whereas the light components vibrating in an azimuth angle of 0° fail to pass therethrough and are reflected and returned to the second reflective polarizing plate 13*b* whose transmission axis is at an azimuth angle of 78°. Then, these light components vibrating in an azimuth angle of 0° can also be divided into the linearly polarized light components vibrating in an azimuth angle of 78° and the linearly polarized light components vibrating in an azimuth perpendicular thereto, in other words, an azimuth angle of 168°. Thus, the light components vibrating in an azimuth angle of 78° among the linearly polarized light components vibrating in an azimuth angle of 0° reflected on the first reflective polarizing plate 13*a* whose transmission axis is at an azimuth angle of 90° pass through the second reflective polarizing plate 13*b* whose transmission axis is at an azimuth angle of 78° and are returned to a viewer as reflected light components. As a result, the mirror display 4*l* of the present example has a higher reflectance than the mirror display 4*a* of Example 1 and can achieve a mirror mode with better performance.

The structure from the first reflective polarizing plate 13*a* whose transmission axis is at an azimuth angle of 90° to the back side is the same as that of Example 1. Thus, because of the same reasons described in Example 1, the display region A and the frame region B have substantially the same reflectance, preventing the boundary line between the display region A and the frame region B from being observed.

EXAMPLE 13

Figure 14:
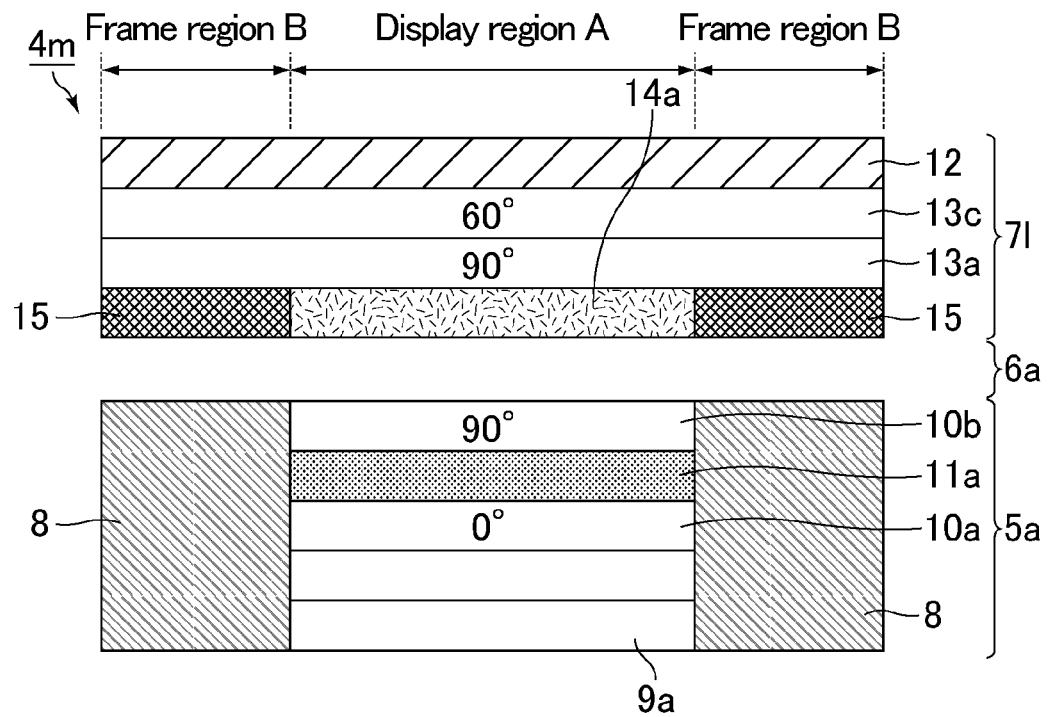
FIG. 14 is a schematic cross-sectional view showing the structure of a mirror display of Example 13.

Example 13 relates to a mirror display including a liquid crystal display device, a reflective polarizing plate serving as the half mirror layer, and a black tape serving as the reflectance adjuster. The difference from Example 1 is that a reflective polarizing plate whose transmission axis is at an azimuth angle of 60° is added to the half mirror plate. FIG. 14 is a schematic cross-sectional view showing the structure of a mirror display of Example 13. As shown in FIG. 14, a half mirror plate 7*l* of Example 13 includes the anti-reflection film 14*a* and the black tape 15, the first reflective polarizing plate 13*a* (azimuth of transmission axis: 90°), a second reflective polarizing plate 13*c* (azimuth of transmission axis: 60°), and the glass plate 12 in the order set forth from the back side to the viewer side. The respective components were bonded with acrylic pressure-sensitive adhesive (not shown).

The driving principles in the display mode and in the mirror mode are the same as those in Example 12 except for the difference in the azimuth angle of the transmission axis of the second reflective polarizing plate 13*c*. Thus, the explanation thereof is omitted here. Also in a mirror display 4*m* of Example 13, the display region A and the frame region B have substantially the same reflectance, preventing the boundary line between the display region A and the frame region B from being observed.

EXAMPLE 14

Figure 15:
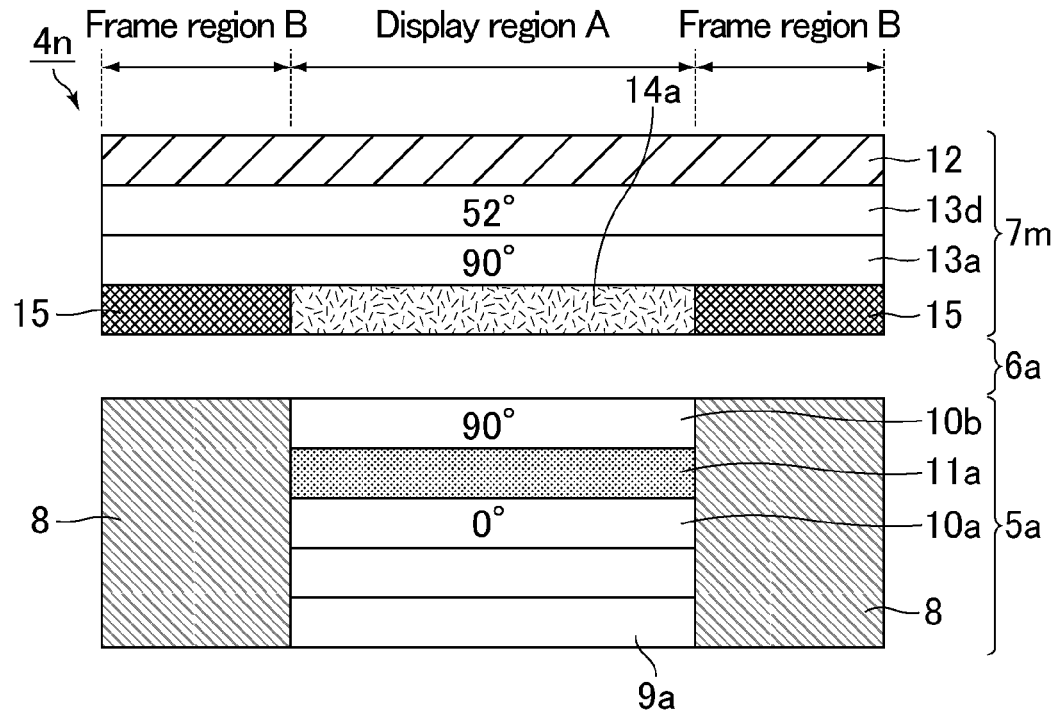
FIG. 15 is a schematic cross-sectional view showing the structure of a mirror display of Example 14.

Example 14 relates to a mirror display including a liquid crystal display device, a reflective polarizing plate serving as the half mirror layer, and a black tape serving as the reflectance adjuster. The difference from Example 1 is that a reflective polarizing plate whose transmission axis is at an azimuth angle of 52° is added to the half mirror plate. FIG. 15 is a schematic cross-sectional view showing the structure of a mirror display of Example 14. As shown in FIG. 15, a half mirror plate 7*m* of Example 14 includes the anti-reflection film 14*a* and the black tape 15, the first reflective polarizing plate 13*a* (azimuth of transmission axis: 90°), a second reflective polarizing plate 13*d* (azimuth of transmission axis: 52°), and the glass plate 12 in the order set forth from the back side to the viewer side. The respective components were bonded with acrylic pressure-sensitive adhesive (not shown).

The driving principles in the display mode and in the mirror mode are the same as those in Example 12 except for the difference in the azimuth angle of the transmission axis of the second reflective polarizing plate 13*d*. Thus, the explanation thereof is omitted here. Also in a mirror display 4n of Example 14, the display region A and the frame region B have substantially the same reflectance, preventing the boundary line between the display region A and the frame region B from being observed.

EXAMPLE 15

Figure 16:
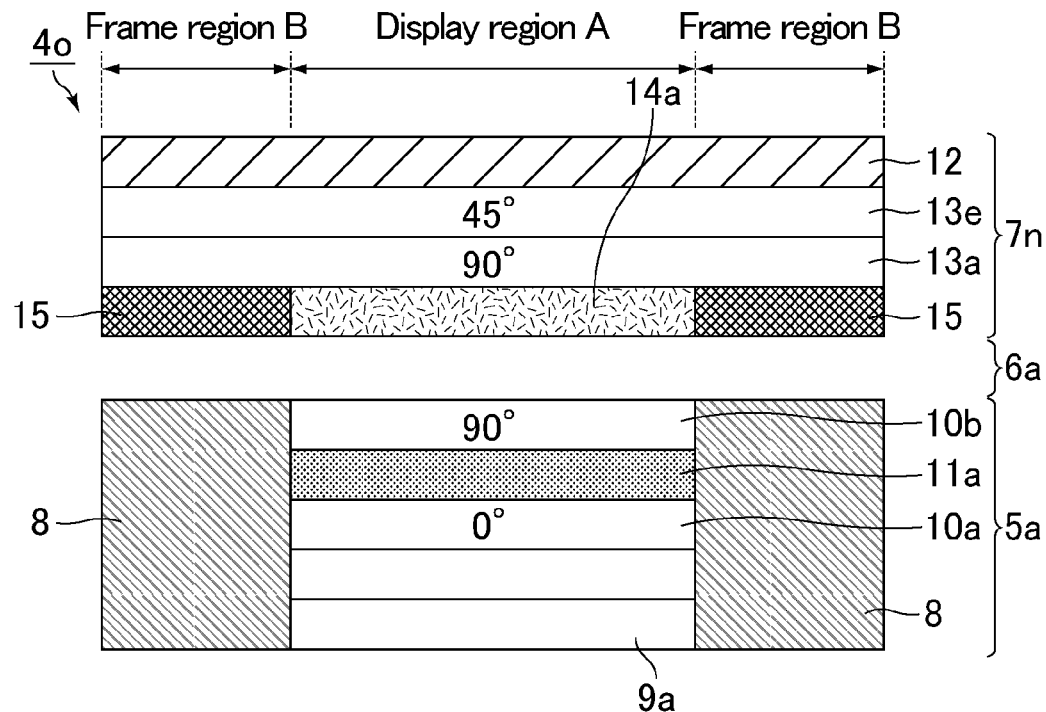
FIG. 16 is a schematic cross-sectional view showing the structure of a mirror display of Example 15.

Example 15 relates to a mirror display including a liquid crystal display device, a reflective polarizing plate serving as the half mirror layer, and a black tape serving as the reflectance adjuster. The difference from Example 1 is that a reflective polarizing plate whose transmission axis is at an azimuth angle of 45° is added to the half mirror plate. FIG. 16 is a schematic cross-sectional view showing the structure of a mirror display of Example 15. As shown in FIG. 16, a half mirror plate 7n of Example 15 includes the anti-reflection film 14a and the black tape 15, the first reflective polarizing plate 13a (azimuth of transmission axis: 90°), a second reflective polarizing plate 13e (azimuth of transmission axis: 45°), and the glass plate 12 in the order set forth from the back side to the viewer side. The respective components were bonded with acrylic pressure-sensitive adhesive (not shown).

The driving principles in the display mode and in the mirror mode are the same as those in Example 12 except for the difference in the azimuth angle of the transmission axis of the second reflective polarizing plate 13e. Thus, the explanation thereof is omitted here. Also in a mirror display 4o of Example 15, the display region A and the frame region B have substantially the same reflectance, preventing the boundary line between the display region A and the frame region B from being observed.

EXAMPLE 16

Figure 17:
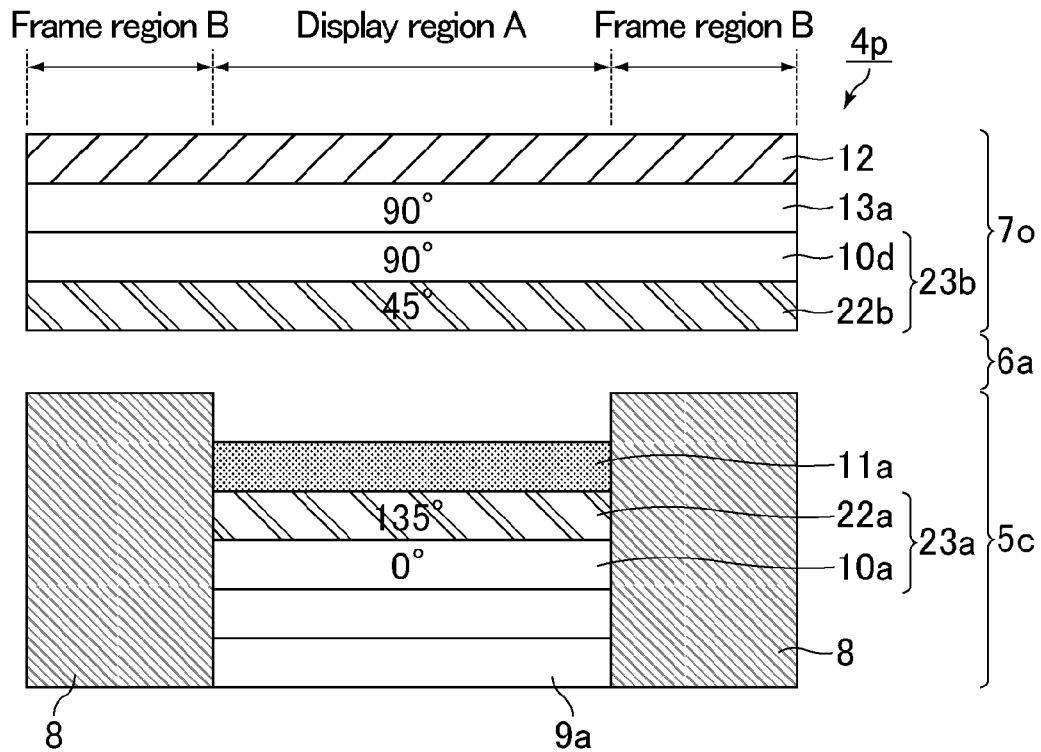
FIG. 17 is a schematic cross-sectional view showing the structure of a mirror display of Example 16.

Example 16 relates to a mirror display including a liquid crystal display device, a reflective polarizing plate serving as the half mirror layer, and a circular polarizing plate serving as the reflectance adjuster. FIG. 17 is a schematic cross-sectional view showing the structure of a mirror display of Example 16. As shown in FIG. 17, a mirror display 4p of Example 16 includes a liquid crystal display device 5c, the air layer 6a, and a half mirror plate 7o in the order set forth from the back side to the viewer side.

The liquid crystal display device 5c used was prepared by modifying a liquid crystal television (trade name: LC-20F5, manufactured by Sharp Corp.) including the backlight 9a, two absorptive polarizing plates disposed in a crossed-Nicols state, the liquid crystal panel 11a, and the bezel 8. Specifically, the two absorptive polarizing plates were separated from the liquid crystal panel 11a, and a circular polarizing plate 23a that consists of a λ/4 plate 22a and an absorptive polarizing plate 10a was attached to the back side (the side of the backlight 9a) of the liquid crystal panel 11a. The slow axis of the λ/4 plate 22a was at an azimuth angle of 135°, and the transmission axis of the absorptive polarizing plate 10a was at an azimuth angle of 0°. No polarizing plate was attached on the viewer side of the liquid crystal panel 11a where the absorptive polarizing plate was separated. The display mode of the liquid crystal panel 11a was UV$^2$A. The bezel 8 was made of a black plastic resin.

The half mirror plate 7o included the 2.5-mm-thick glass plate 12, the reflective polarizing plate 13a stacked on the back side (the side of the backlight 9a) of the glass plate with acrylic pressure-sensitive adhesive (not shown), and a circular pressure-sensitive 23b consisting of an absorptive polarizing plate 10d and a λ/4 plate 22b attached to the back side of the reflective polarizing plate.

The reflective polarizing plate 13a used was a multilayer reflective polarizing plate (trade name: DBEF) available from Sumitomo 3M Ltd. The reflective polarizing plate 13a was disposed such that the transmission axis was at an azimuth angle of 90°. The transmission axis of the absorptive polarizing plate 10d was at an azimuth angle of 90°, and the slow axis of the λ/4 plate 22b was at an azimuth angle of 45°. In other words, the circular polarizing plate 23b in the half mirror plate 7o is disposed in a crossed-Nicols state with the circular polarizing plate 23a in the liquid crystal display device 5c. The λ/4 plates 22a and 22b used were each prepared by uniaxially stretching a cycloolefinic polymer film (trade name: ZeonorFilm, manufactured by ZEON Corp.) to adjust the in-plane phase difference to 140 nm.

The mirror display 4p of the present example can be driven in both the display mode and the mirror mode on the basis of the following principles.

The circular polarizing plate 23b disposed in the half mirror plate 7o and the circular polarizing plate 23a disposed in the liquid crystal display device 5c serve as what is called crossed-Nicols circular polarizing plates. Thus, these circular polarizing plates 23a and 23b and the liquid crystal panel 11a therebetween as a whole can be considered as a liquid crystal display device. The display mode of this assumed liquid crystal display device corresponds to a conventionally known circularly polarized VA mode. With the circularly polarized VA mode, the light passing through the circular polarizing plate 23a on the back side and incident on the liquid crystal panel 11a is circularly polarized light. Then, after the light passes through the liquid crystal panel 11a and the circular polarizing plate 23b on the viewing side, the light emitted from the assumed liquid crystal display device is converted into linearly polarized light.

In the display mode, the light emitted from the assumed liquid crystal display device is linearly polarized light vibrating in an azimuth angle of 90°. Thus, the light can pass through the reflective polarizing plate 13a whose transmission axis is at an azimuth angle of 90° with hardly any loss. As a result, the mirror display 4p of the present example can show an image with a high luminance even though it includes the half mirror plate 7o.

In contrast, in the mirror mode, most of the linearly polarized light components vibrating in an azimuth angle of 0° among the light components incident on the half mirror plate 7o from the viewer side are reflected on the reflective polarizing plate 13a whose transmission axis is at an azimuth angle of 90°, i.e., whose reflection axis is at an azimuth angle of 0°. As a result, the mirror display 4p of the present example serves as a mirror when the liquid crystal panel 11a shows no image.

The linearly polarized light components vibrating in an azimuth angle of 90° among the outside light components incident on the half mirror plate 7o from the viewer side pass through the reflective polarizing plate 13a whose transmission axis is at an azimuth angle of 90°. In both the frame region B and the display region A, the light transmitted through the reflective polarizing plate 13a passes through the circular polarizing plate 23b, so that the light is converted into right-handed circularly polarized light and then incident on the air layer 6a. The light is reflected on the surfaces and the insides of the bezel 8 and the liquid crystal panel 11a and converted into left-handed circularly polarized light, and then returned to the circular polarizing plate 23b and absorbed. In other words, the anti-reflection effect of the circular polarizing plate 23b substantially prevents the light entering from the viewing-side circular polarizing plate 23b toward the back side from being observed as reflected light in both the frame region B and the display region A. As a result, the display region A and the frame region B have substantially the same reflectance, preventing the boundary line between the display region A and the frame region B from being observed.

EXAMPLE 17

Figure 18:
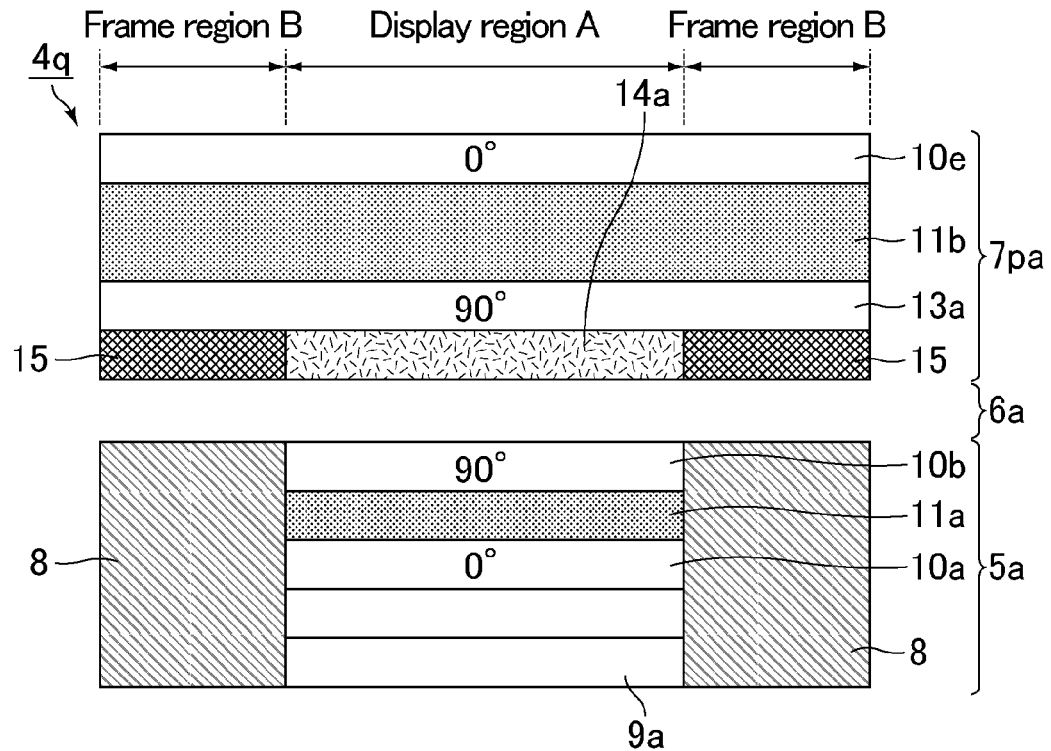
FIG. 18 is a schematic cross-sectional view showing the structure of a mirror display of Example 17.

Example 17 relates to a mirror display including a liquid crystal display device, a reflective polarizing plate serving as the half mirror layer, and a switching liquid crystal panel serving as the reflectance adjuster. FIG. 18 is a schematic cross-sectional view showing the structure of a mirror display of Example 17. As shown in FIG. 18, a mirror display 4q of Example 17 includes the liquid crystal display device 5a, the air layer 6a, and a half mirror plate 7pa in the order set forth from the back side to the viewer side. In Example 1, the reflective polarizing plate 13a constituting the half mirror plate 7a was attached to the glass plate 12 which is the outermost layer. Still, in Example 17, the reflective polarizing plate 13a constituting the half mirror plate 7pa was directly attached to a glass plate (not shown) constituting a switching liquid crystal panel 11b. Example 17 is the same as Example 1 except for this respect and addition of a switching region including the switching liquid crystal panel 11b and an absorptive polarizing plate 10e whose transmission axis is at an azimuth angle of 0°.

The switching liquid crystal panel 11b can be any panel which is capable of converting the vibrating direction of the linearly polarized light transmitted through the reflective polarizing plate 13a between the voltage-applied state and the no-voltage-applied state. The present example used a $UV^2A$ mode liquid crystal panel for black-and-white display with a phase difference of 320 nm. A liquid crystal panel for black-and-white display has no color filter layer. The switching liquid crystal panel 11b may be a panel of a liquid crystal display mode such as a TN mode or an IPS mode.

The mirror display 4q of the present example can be driven in both the display mode and the mirror mode on the basis of the following principles.

In the display mode, the liquid crystal panel 11a shows an image and a viewer observes the image on the liquid crystal panel 11a through the half mirror plate 7pa. The light emitted from the liquid crystal display device 5a is linearly polarized light vibrating in an azimuth angle of 90°, and the transmission axis of the reflective polarizing plate 13a in the half mirror plate 7pa is at an azimuth angle of 90°. Thus, the light can pass through the reflective polarizing plate 13a with hardly any loss. The switching liquid crystal panel 11b is in a voltage-applied state in the display mode, and converts the vibrating direction of the linearly polarized light transmitted through the reflective polarizing plate 13a into an azimuth angle of 0°. As a result, the light emitted from the switching liquid crystal panel 11b can pass through the absorptive polarizing plate 10e disposed closest to a viewer with hardly any loss. Thus, the mirror display 4q of the present example can show an image with a high luminance even though it includes the half mirror plate 7pa.

In contrast, in the mirror mode, the liquid crystal panel 11a shows no image and a viewer observes only the outside light reflected on the surface of the half mirror plate 7pa. Specifically, the linearly polarized light components vibrating in an azimuth angle of 0° among the light components incident on the half mirror plate 7pa from the viewer side can pass through the absorptive polarizing plate 10e whose transmission axis is at an azimuth angle of 0° with hardly any loss. Then, the switching liquid crystal panel 11b is in a no-voltage-applied state in the mirror mode, so that it does not convert the vibrating direction of the linearly polarized light. As a result, most of the light transmitted through the switching liquid crystal panel 11b is reflected on the reflective polarizing plate 13a whose transmission axis is at an azimuth angle of 90°, i.e., whose reflection axis is at an azimuth angle of 0°. Thus, the mirror display 4q of the present example serves as a mirror when the liquid crystal panel 11a shows no image. Further, the display region A and the frame region B have substantially the same reflectance, preventing the boundary line between the display region A and the frame region B from being observed.

In the display mode, the linearly polarized light components vibrating in an azimuth angle of 0° among the light components incident on the half mirror plate 7pa from the viewer side pass through the absorptive polarizing plate 10e whose transmission axis is at 0° with hardly any loss. The switching liquid crystal panel 11b is in a voltage-applied state, so that it converts the linearly polarized light vibrating in an azimuth angle of 0° after passing through the absorptive polarizing plate 10e into linearly polarized light vibrating in an azimuth angle of 90°. Thus, even when the converted linearly polarized light vibrating in an azimuth angle of 90° is incident on the reflective polarizing plate 13a whose transmission axis is at an azimuth angle of 90°, i.e., whose reflection axis is at an azimuth angle of 0°, from the switching liquid crystal panel 11b, the incident light is not reflected thereon and passes therethrough. The linearly polarized light transmitted through the reflective polarizing plate 13a is hardly reflected on the interface with the air layer 6a by the effects of the anti-reflection film 14a and is incident on the air layer 6a. Then, part of the light is reflected on the interface between the air layer 6a and the viewer-side absorptive polarizing plate 10b of the liquid crystal display device 5a, and the remaining light is absorbed by the absorptive polarizing plates 10a and 10b, a color filter (not shown), and other components of the liquid crystal display device 5a.

Thereby, the mirror display 4q of the present example achieves performance in the mirror mode substantially equal to that in Example 1. Further, in the display mode, the light components incident on the mirror display 4q from the viewer side are not reflected on the half mirror plate 7pa so that they are not converted into unnecessary reflected light components. Therefore, the contrast ratio is not decreased.

EXAMPLE 18

Figure 19:
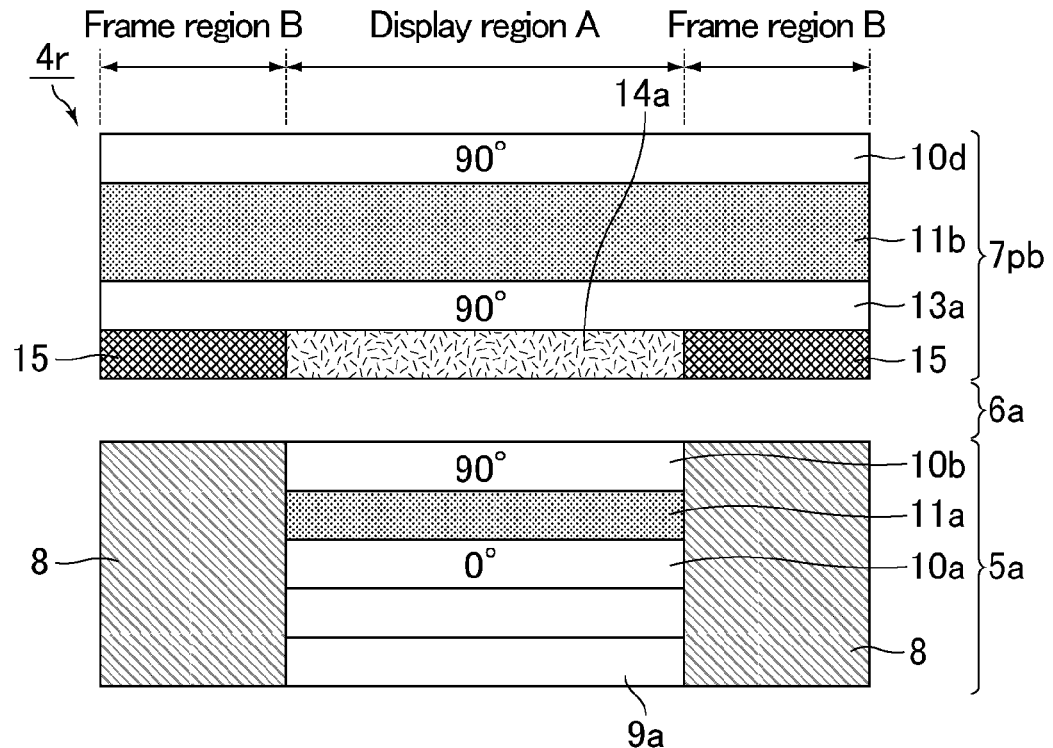
FIG. 19 is a schematic cross-sectional view showing the structure of a mirror display of Example 18.

Example 18 relates to a mirror display including a liquid crystal display device, a reflective polarizing plate serving as the half mirror layer, and a switching liquid crystal panel serving as the reflectance adjuster. The difference from Example 17 is that the transmission axis of the absorptive polarizing plate in the half mirror plate is at an azimuth angle of 90°, and thus the switching liquid crystal panel is driven in a no-voltage-applied state in the display mode and in a voltage-applied state in the mirror mode. FIG. 19 is a schematic cross-sectional view showing the structure of a mirror display of Example 18. As shown in FIG. 19, a mirror display 4r of Example 18 includes the liquid crystal display device 5a, the air layer 6a, and a half mirror plate 7pb in the order set forth from the back side to the viewer side. The half mirror plate 7pb includes the absorptive polarizing plate 10d whose transmission axis is at an azimuth angle of 90° stacked on the viewer side of the switching liquid crystal panel 11b.

The driving principles in the display mode and in the mirror mode are the same as those in Example 17 except for the difference in the azimuth angle of the transmission axis of the absorptive polarizing plate 10d in the half mirror plate 7pb. Thus, the explanation thereof is omitted here.

EXAMPLE 19

Figure 20:
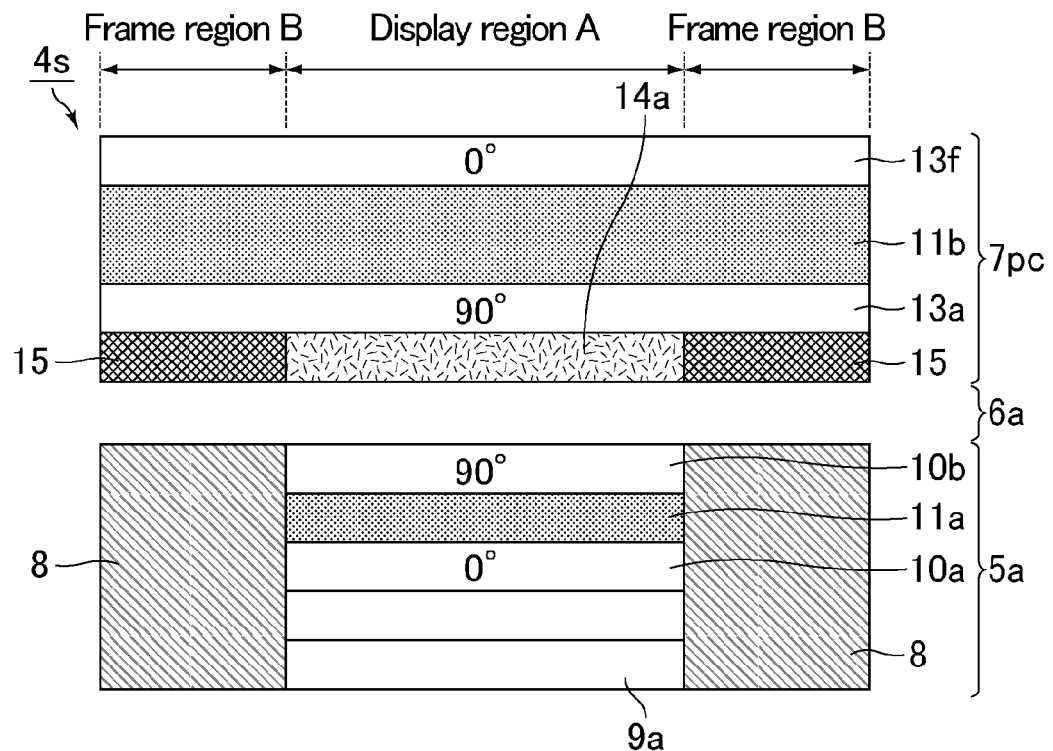
FIG. 20 is a schematic cross-sectional view showing the structure of a mirror display of Example 19.

Example 19 relates to a mirror display including a liquid crystal display device, a reflective polarizing plate serving as the half mirror layer, and a switching liquid crystal panel serving as the reflectance adjuster. FIG. 20 is a schematic cross-sectional view showing the structure of a mirror display of Example 19. As shown in FIG. 20, a mirror display 4s of Example 19 includes the liquid crystal display device 5a, the air layer 6a, and a half mirror plate 7pc in the order set forth from the back side to the viewer side. In Example 1, the reflective polarizing plate 13a constituting the half mirror plate 7a was attached to the glass plate 12 constituting the outermost layer. Still, in Example 19, the reflective polarizing plate 13a constituting the half mirror plate 7pc was directly attached to the glass plate (not shown) constituting the switching liquid crystal panel 11b. Example 19 is the same as Example 1 except for this respect and addition of a switching region consisting of the switching liquid crystal panel 11b and a reflective polarizing plate 13f whose transmission axis is at an azimuth angle of 0°.

The switching liquid crystal panel 11b used was a $UV^2A$ mode liquid crystal panel for black-and-white display with a phase difference of 320 nm.

The mirror display 4s of the present example can be driven in both the display mode and the mirror mode on the basis of the following principles.

In the display mode, the liquid crystal panel 11a shows an image and a viewer observes the image on the liquid crystal panel 11a through the half mirror plate 7pc. The light emitted from the liquid crystal display device 5a is linearly polarized light vibrating in an azimuth angle of 90°, and the transmission axis of the reflective polarizing plate 13a in the half mirror plate 7pc is at an azimuth angle of 90°. Thus, the light can pass through the reflective polarizing plate 13a with hardly any loss. The switching liquid crystal panel 11b is in a voltage-applied state in the display mode, and thus converts the vibrating direction of the linearly polarized light components transmitted through the reflective polarizing plate 13a into an azimuth angle of 0°. As a result, the light emitted from the switching liquid crystal panel 11b can pass through the reflective polarizing plate 13f disposed closest to a viewer with hardly any loss. Thus, the mirror display 4s of the present example can show an image with a high luminance even though it includes the half mirror plate 7pc.

In contrast, in the mirror mode, the liquid crystal panel 11a shows no image and a viewer observes only the outside light reflected on the surface of the half mirror plate 7pc. Specifically, the linearly polarized light components vibrating in an azimuth angle of 0° among the light components incident on the half mirror plate 7pc from the viewer side can pass through the reflective polarizing plate 13f whose transmission axis is at an azimuth angle of 0° with hardly any loss. The switching liquid crystal panel 11b is in a no-voltage-applied state in the mirror mode, and thus does not convert the vibrating direction of the linearly polarized light. As a result, most of the light transmitted through the switching liquid crystal panel 11b is reflected on the reflective polarizing plate 13a whose transmission axis is at an azimuth angle of 90°, i.e., whose reflection axis is at an azimuth angle of 0°. At the same time, most of the linearly polarized light components vibrating in an azimuth angle of 90° among the light components incident on the half mirror plate 7pc from the viewer side are reflected on the reflective polarizing plate 13f whose transmission axis is at an azimuth angle of 0°, i.e., whose reflection axis is at an azimuth angle of 90°. Thus, the reflectance of the mirror display 4s of the present example is about twice as high as that of the mirror display 4a of Example 1 when the liquid crystal panel 11a shows no image, serving as substantially a perfect mirror. Further, the display region A and the frame region B have substantially the same reflectance, preventing the boundary line between the display region A and the frame region B from being observed.

Thereby, the mirror display 4s of the present example achieves the performance in the display mode substantially equal to that in Example 1 and reflects most of the light incident on the mirror display 4s from the viewer side in the mirror mode, serving as substantially a perfect mirror.

EXAMPLE 20

Figure 21:
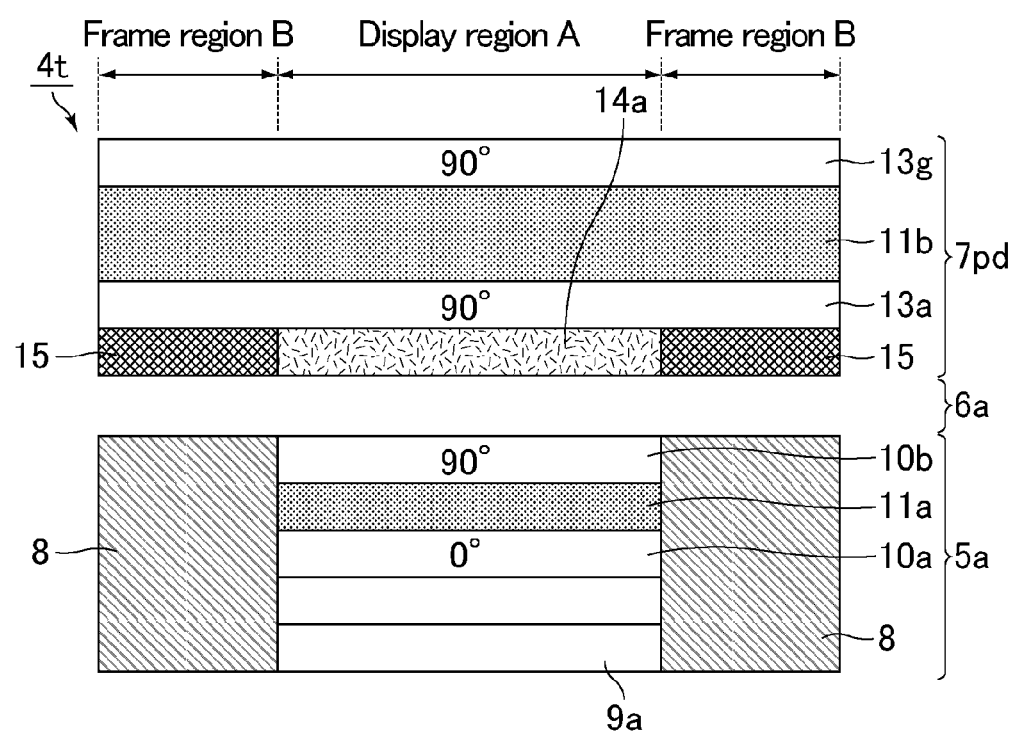
FIG. 21 is a schematic cross-sectional view showing the structure of a mirror display of Example 20.

Example 20 relates to a mirror display including a liquid crystal display device, a reflective polarizing plate serving as the half mirror layer, and a switching liquid crystal panel serving as the reflectance adjuster. The difference from Example 19 is that the transmission axis of the reflective polarizing plate in the half mirror plate is at an azimuth angle of 90°, and thus the switching liquid crystal panel is driven in a no-voltage-applied state in the display mode and in a voltage-applied state in the mirror mode. FIG. 21 is a schematic cross-sectional view showing the structure of a mirror display of Example 20. As shown in FIG. 21, a mirror display 4t of Example 20 includes the liquid crystal display device 5a, the air layer 6a, and a half mirror plate 7pd in the order set forth from the back side to the viewer side. The half mirror plate 7pd includes a reflective polarizing plate 13g whose transmission axis is at an azimuth angle of 90° stacked on the viewer side of the switching liquid crystal panel 11b.

The driving principles in the display mode and in the mirror mode are the same as those in Example 19 except for the difference in the azimuth angle of the transmission axis of the reflective polarizing plate 13g in the half mirror plate 7pd. Thus, the explanation thereof is omitted here.

The cross-sectional views relating to the above examples illustrate such that the boundary between the liquid crystal panel and the bezel corresponds to the boundary between the display region A and the frame region B. Still, the boundary between the display region A and the frame region B may be inside the boundary between the liquid crystal panel and the bezel. In other words, the liquid crystal panel may have a region that does not contribute to image display on a peripheral portion.

Liquid crystal panels usually include, on peripheral portions thereof, a light-shielding band called black matrix (BM). If the half mirror plate and the display device are misaligned during assembling, the display portion of the display device may be blocked by the reflectance adjuster such as a black tape or the frame component may appear in a region where no reflectance adjuster exists. In order to prevent these problems, the BM may be designed to be thicker than usual. Specifically, the width of the BM disposed on the peripheral portion of a liquid crystal panel is usually smaller than 5 mm per side. Still, in order to prevent the above problems, the width is preferably 5 mm or greater, and more preferably 7 mm or greater.

[Evaluation Results of Mirror Displays of Examples 1 to 20]

For the mirror displays of Examples 1 to 20, (1) the transmittance in the display mode, (2) the reflectance in the display region A in the mirror mode, (3) the reflectance in the frame region B in the mirror mode, and (4) the difference between the reflectance in the display region A and the reflectance in the frame region B in the mirror mode are summarized in Table 1.

The transmittance in the display mode was determined as follows. First, a mirror display was made to show a white screen in a darkroom, and the screen luminance at this time was measured. Then, the measured value was standardized on the basis of the white-screen luminance of a liquid crystal display device (trade name: LC-20F5, manufactured by Sharp Corp.) commonly used in the respective examples. This white-screen luminance was defined as 100%. The measurement device used was a luminance meter (trade name: BM-5A) available from TOPCON CORP.

The reflectance in the mirror mode is a reflectance of a liquid crystal display device showing a black screen (in the power-off state). The measurement device used was a portable spectrophotometer (trade name: CM-2600d, range of measurement wavelength: 360 to 740 nm, integrating sphere type) available from KONICA MINOLTA, INC. The reflection measurement mode was a specular component included (SCI) mode. In the SCI mode, both the diffuse-reflected light and the specular-reflected light are measured, and the reflectance of light including the specular-reflected light is measured.

TABLE 1

| | Transmittance in display mode (%) | Reflectance in mirror mode (%) | | |
|---|---|---|---|---|
| | | Display region A | Frame region B | Difference |
| Example 1 | 91.9 | 55.6 | 52.8 | 2.8 |
| Example 2 | 92.4 | 53.8 | 52.8 | 1.0 |
| Example 3 | 91.6 | 57.2 | 56.3 | 0.9 |
| Example 4 | 91.6 | 57.2 | 56.5 | 0.7 |
| Example 5 | 91.6 | 57.2 | 56.7 | 0.5 |
| Example 6 | 91.6 | 57.2 | 56.9 | 0.3 |
| Example 7 | 91.9 | 55.6 | 52.8 | 2.8 |
| Example 8 | 92.4 | 53.8 | 52.8 | 1.0 |
| Example 9 | 92.5 | 53.9 | 52.9 | 1.0 |
| Example 10 | 92.5 | 53.9 | 53.0 | 0.9 |
| Example 11 | 92.5 | 53.9 | 53.0 | 0.9 |
| Example 12 | 90.1 | 57.4 | 54.6 | 2.8 |
| Example 13 | 80.2 | 62.1 | 59.9 | 2.2 |
| Example 14 | 72.9 | 65.3 | 63.7 | 1.6 |
| Example 15 | 64.1 | 70.0 | 68.4 | 1.6 |
| Example 16 | 93.2 | 53.2 | 53.0 | 0.2 |
| Example 17 | 78.1 | 48.9 | 46.5 | 2.4 |
| Example 18 | 78.1 | 48.9 | 46.5 | 2.4 |
| Example 19 | 76.3 | 97.3 | 94.7 | 2.6 |
| Example 20 | 76.3 | 97.3 | 94.7 | 2.6 |

The subjective evaluation shows that the mirror displays of Examples 1 to 20 each achieved a sufficient screen luminance in the display mode. Also, the mirror displays of Examples 1 to 20 each prevented the boundary between the display region A and the frame region B from being observed, achieving particularly excellent design quality. Further, the mirror displays of Examples 1 to 20 were each evaluated as of practical use as a mirror. In particular, the mirror displays of Examples 14, 15, 19, and 20 having a reflectance of higher than 65% in the mirror mode were visually equal to a normal mirror (reflectance: about 80%) which is not a mirror display.

As mentioned above, the mirror displays of Examples 1 to 20 can be driven in the mirror mode without any sacrifice of display performance. Also in the mirror mode, these mirror displays can prevent the boundary line between the display region A and the frame region B from being observed, providing a display device with good design quality. Further, the mirror displays of Examples 14, 15, 19, and 20 have a reflectance which is equal to a normal mirror, so that the mirror displays can practically sufficiently be driven in the mirror mode.

For the purpose of improving the functionality of the bezel 8, one or both of the surface and edge face of the bezel 8 may be subjected to surface machining. In this case, the reflectance may be non-uniform in the frame region B. Even in such a case, a reflectance adjuster can make the reflectance uniform in the frame region B, thereby improving the performance as a mirror and the design quality.

In addition, even if the bezel 8 is provided with a remote control receiver or a device name printed thereon, for example, a reflectance adjuster can make them difficult to observe in the mirror mode, reducing uncomfortable feeling as a mirror.

EXAMPLE 21

Figure 22:
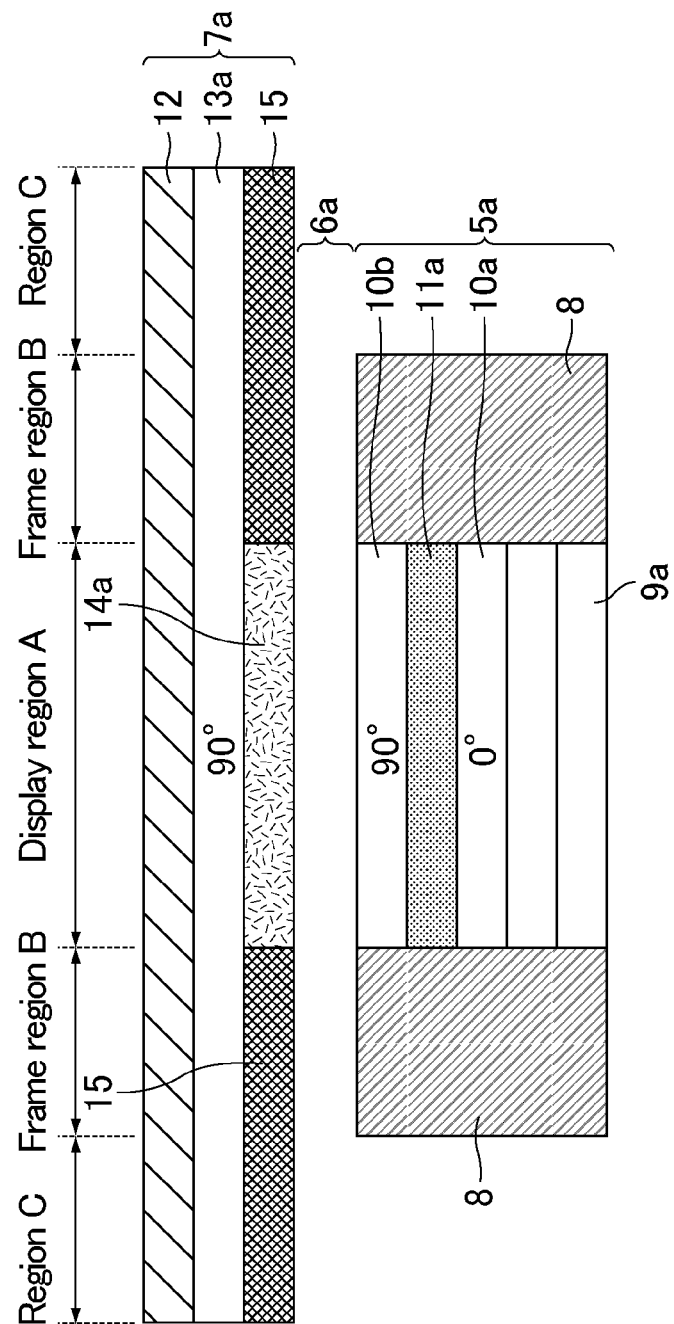
FIG. 22 is a schematic cross-sectional view showing the structure of a mirror display of Example 21.

In Examples 1 to 20, the half mirror layer and the reflectance adjuster were disposed so as to correspond to the region (frame region B) where the bezel 8 was disposed. Still, they may be extended to a region (region C) where no bezel 8 is disposed outside the frame region B. On the basis of the mirror display 4a of Example 1, one example in which the half mirror layer and the reflectance adjuster are extended to the region C is shown in FIG. 22 as Example 21. FIG. 22 is a schematic cross-sectional view showing the structure of a mirror display of Example 21. As shown in FIG. 22, the mirror display of Example 21 includes the reflective polarizing plate 13a serving as the half mirror layer which is disposed not only in the display region A and the frame region B but also in the region (region C) where no bezel 8 is disposed outside the frame region B. Further, the black tape 15 serving as the reflectance adjuster is also disposed not only in the frame region B but also in the region C. The mirror display of Example 21 has the same structure as the mirror display 4a of Example 1 except for the region C. Thus, it prevents the boundary line between the display region A and the frame region B from being observed. In addition, the mirror display of Example 21 can be used not only as a mirror when the display device is in the power-off state, but also in various uses with a fusion of image displaying function and mirror function by utilizing the region C.

EXAMPLE 22

Figure 23:
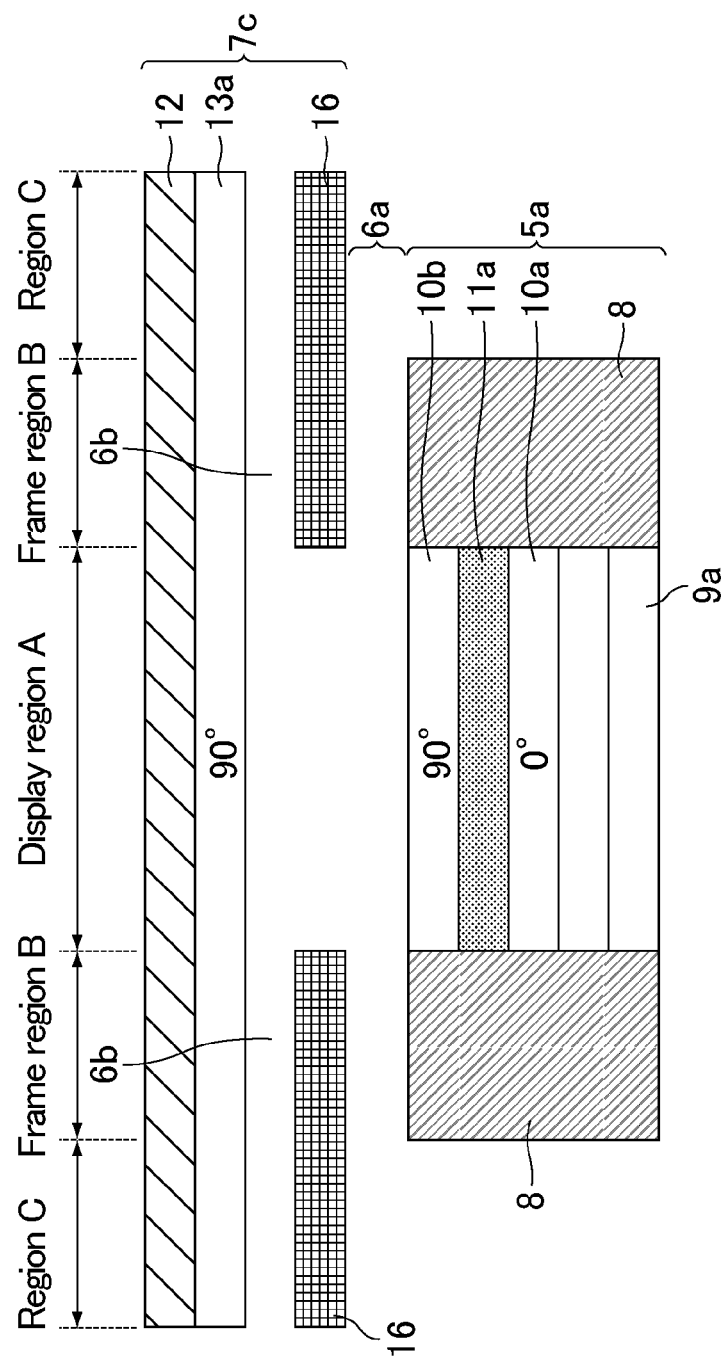
FIG. 23 is a schematic cross-sectional view showing the structure of a mirror display of Example 22.

Example 22 shows one example in which the half mirror layer and the reflectance adjuster are extended to the region C based on the mirror display 4c of Example 3. FIG. 23 is a schematic cross-sectional view showing the structure of a mirror display of Example 22. As shown in FIG. 23, the mirror display of Example 22 includes the reflective polarizing plate 13a serving as the half mirror layer which is disposed not only in the display region A and the frame region B but also in the region (region C) where no bezel 8 is disposed outside the frame region B. Further, the black paper 16 serving as the reflectance adjuster is also disposed not only in the frame region B but also in the region C. The mirror display of Example 22 has the same structure as the mirror display 4c of Example 3 except for the region C. Thus, it prevents the boundary line between the display region A and the frame region B from being observed. In addition, the mirror display of Example 22 can be used not only as a mirror when the display device is in the power-off state, but also in various uses with a fusion of image displaying function and mirror function by utilizing the region C.

EXAMPLE 23

Figure 24:
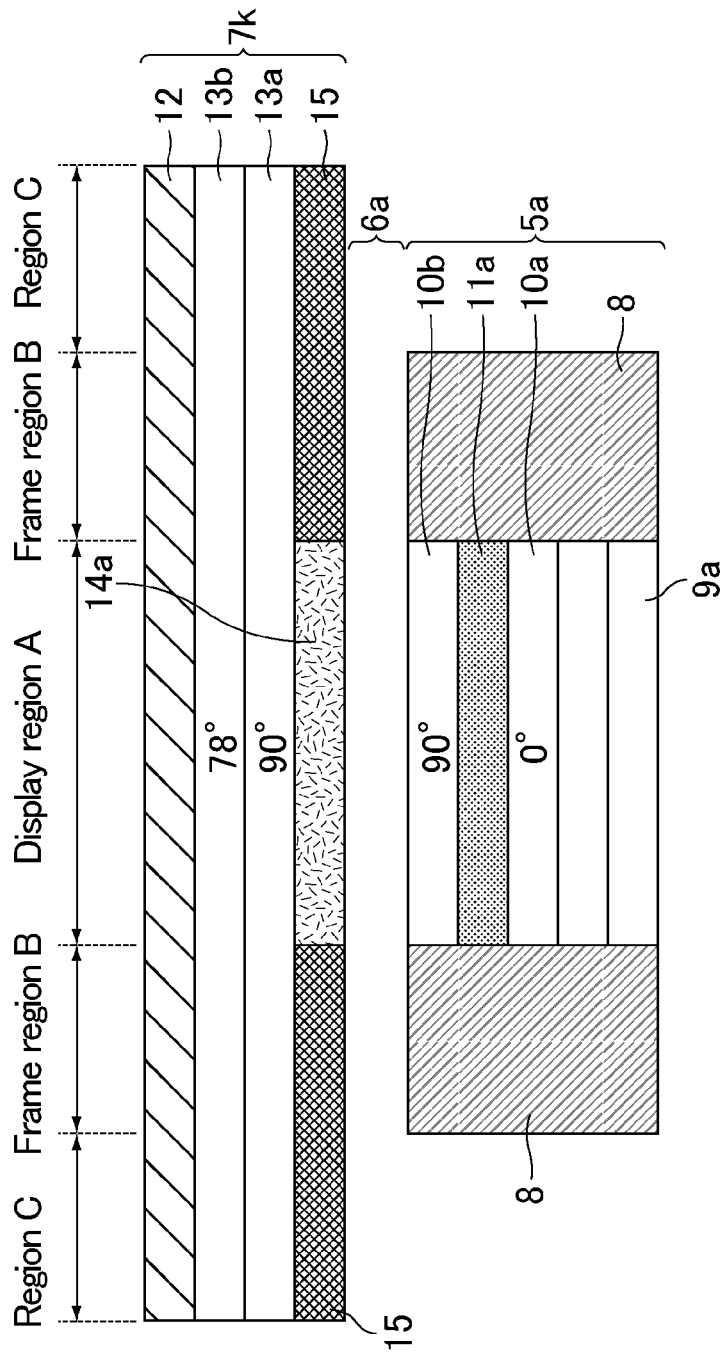
FIG. 24 is a schematic cross-sectional view showing the structure of a mirror display of Example 23.

Example 23 shows one example in which the half mirror layer and the reflectance adjuster are extended to the region C based on the mirror display of Example 12. FIG. 24 is a schematic cross-sectional view showing the structure of a mirror display of Example 23. As shown in FIG. 24, the mirror display of Example 23 includes the first and second reflective polarizing plates 13a and 13b as the half mirror layers which are disposed not only in the display region A and the frame region B but also in the region (region C) where no bezel 8 is disposed outside the frame region B. Further, the black tape 15 serving as the reflectance adjuster is also disposed not only in the frame region B but also in the region C. The mirror display of Example 23 has the same structure as the mirror display of Example 12 except for the region C. Thus, it prevents the boundary line between the display region A and the frame region B from being observed. In addition, the mirror display of Example 23 can be used not only as a mirror when the display device is in the power-off state, but also in various uses with a fusion of image displaying function and mirror function by utilizing the region C.

EXAMPLE 24

Figure 25:
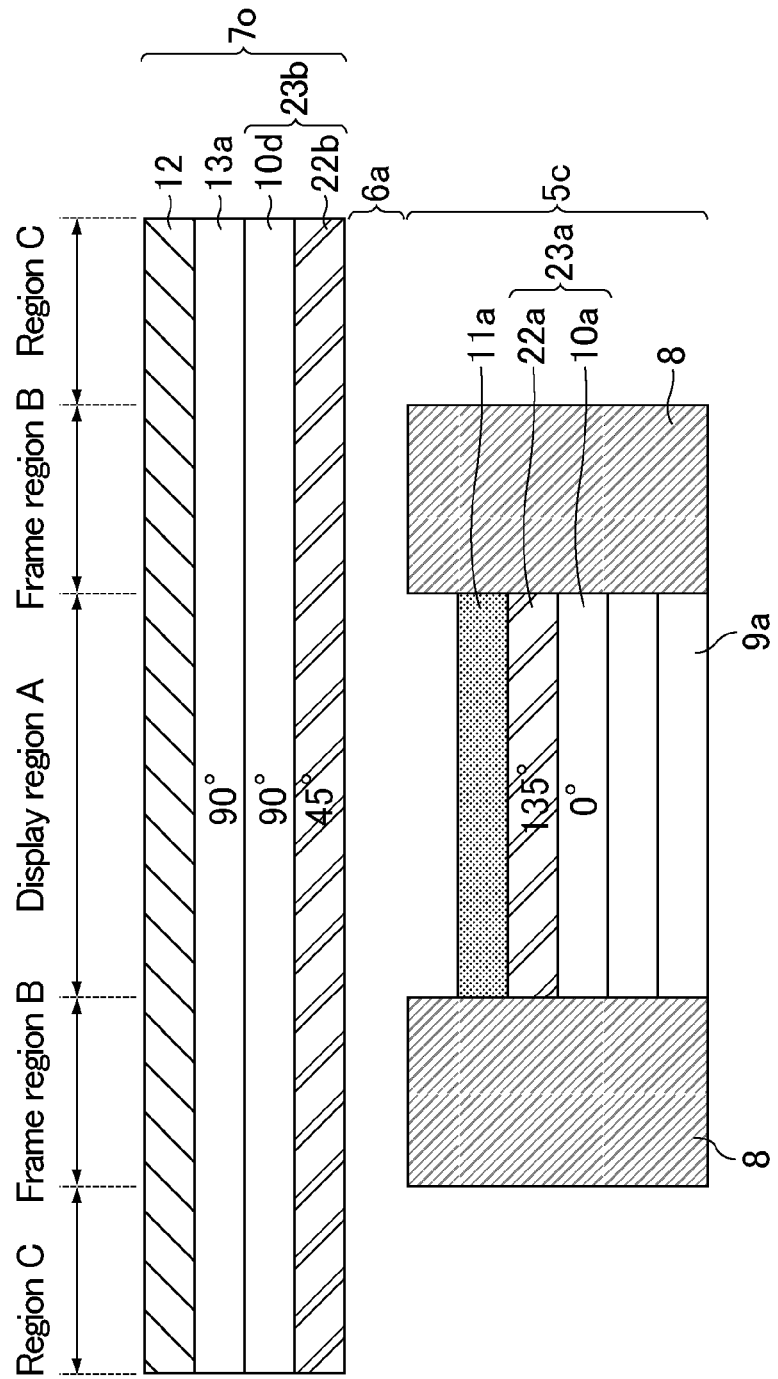
FIG. 25 is a schematic cross-sectional view showing the structure of a mirror display of Example 24.

Example 24 shows one example in which the half mirror layer and the reflectance adjuster are extended to the region C based on the mirror display 4p of Example 16. FIG. 25 is a schematic cross-sectional view showing the structure of a mirror display of Example 24. As shown in FIG. 25, the mirror display of Example 24 includes the reflective polarizing plate 13a serving as the half mirror layer which is disposed not only in the display region A and the frame region B but also in the region (region C) where no bezel 8 is disposed outside the frame region B. Further, the circular polarizing plate 23b serving as the reflectance adjuster is also disposed not only in the frame region B but also in the region C. The mirror display of Example 24 has the same structure as the mirror display 4p of Example 16 except for the region C. Thus, it prevents the boundary line between the display region A and the frame region B from being observed. In addition, the mirror display of Example 24 can be used not only as a mirror when the display device is in the power-off state, but also in various uses with a fusion of image displaying function and mirror function by utilizing the region C.

EXAMPLE 25

Figure 26:
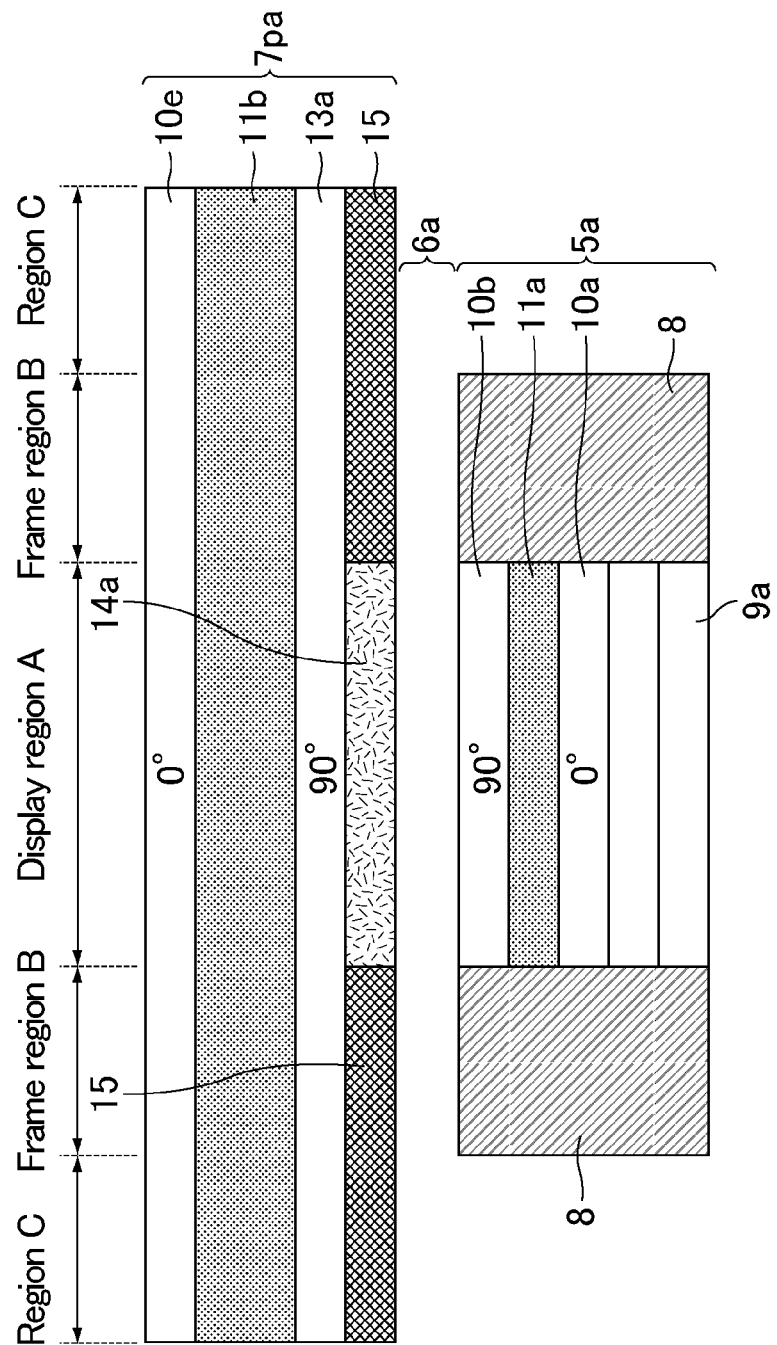
FIG. 26 is a schematic cross-sectional view showing the structure of a mirror display of Example 25.

Example 25 shows one example in which the half mirror layer and the reflectance adjuster are extended to the region C based on the mirror display 4q of Example 17. FIG. 26 is a schematic cross-sectional view showing the structure of a mirror display of Example 25. As shown in FIG. 26, the mirror display of Example 25 includes the reflective polarizing plate 13a serving as the half mirror layer which is disposed not only in the display region A and the frame region B but also in the region (region C) where no bezel 8 is disposed outside the frame region B. Further, the switching liquid crystal panel 11b serving as the reflectance adjuster is also disposed not only in the frame region B but also in the region C. The mirror display of Example 25 has the same structure as the mirror display 4q of Example 17 except for the region C. Thus, it prevents the boundary line between the display region A and the frame region B from being observed. In addition, the mirror display of Example 25 can be used not only as a mirror when the display device is in the power-off state, but also in various uses with a fusion of image displaying function and mirror function by utilizing the region C.

EXAMPLE 26

Figure 27:
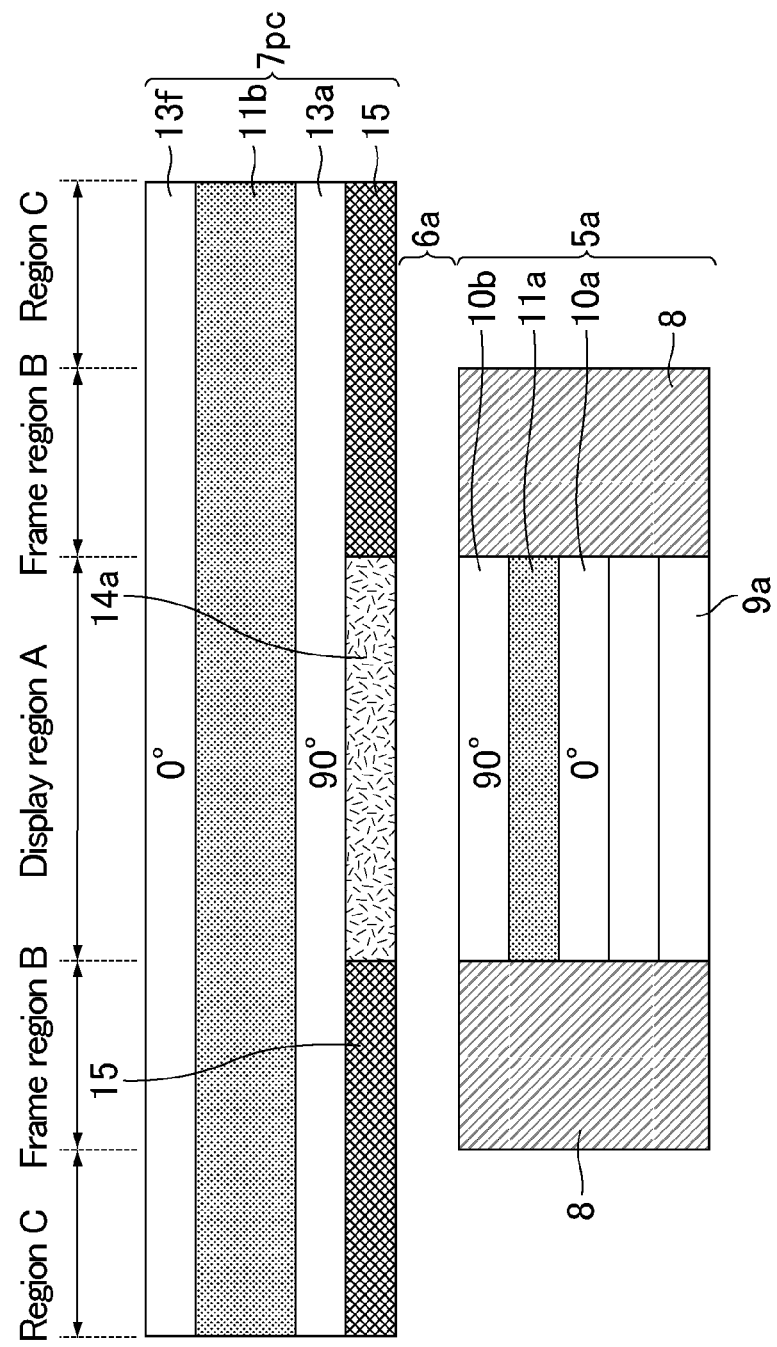
FIG. 27 is a schematic cross-sectional view showing the structure of a mirror display of Example 26.

Example 26 shows one example in which the half mirror layer and the reflectance adjuster are extended to the region C based on the mirror display 4s of Example 19. FIG. 27 is a schematic cross-sectional view showing the structure of a mirror display of Example 26. As shown in FIG. 27, the mirror display of Example 26 includes the reflective polarizing plate 13a serving as the half mirror layer which is disposed not only in the display region A and the frame region B but also in the region (region C) where no bezel 8 is disposed outside the frame region B. Further, the switching liquid crystal panel 11b serving as the reflectance adjuster is also disposed not only in the frame region B but also in the region C. The mirror display of Example 26 has the same structure as the mirror display 4s of Example 19 except for the region C. Thus, it prevents the boundary line between the display region A and the frame region B from being observed. In addition, the mirror display of Example 26 can be used not only as a mirror when the display device is in the power-off state, but also in various uses with a fusion of image displaying function and mirror function by utilizing the region C.

EXAMPLE 27

Figure 28:
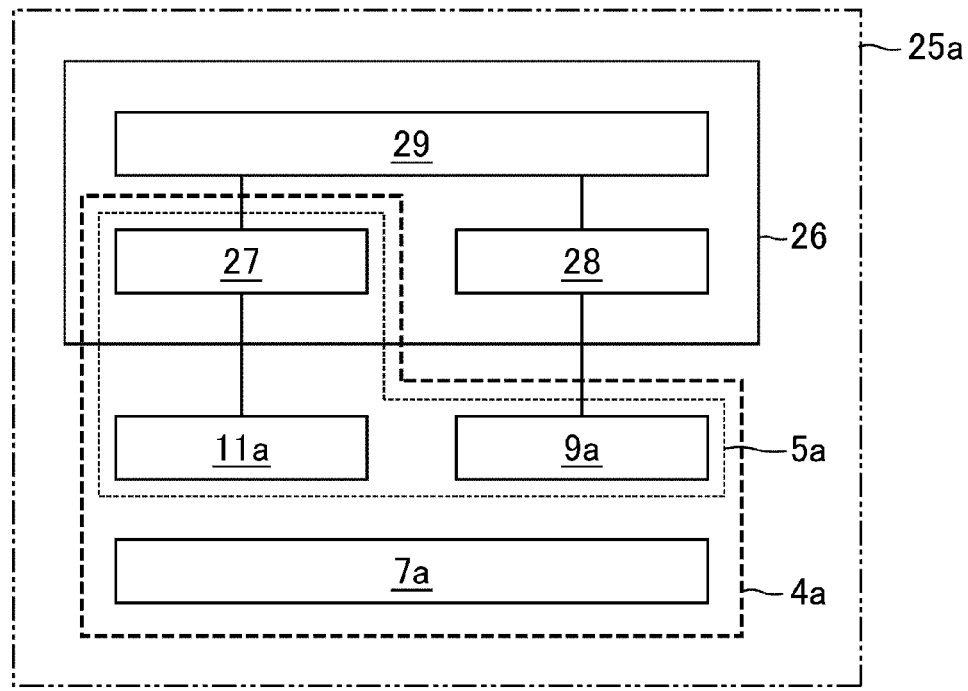
FIG. 28 is a block diagram for explaining the main structure of an electronic device of Example 27.

An electronic device of Example 27 is an electronic device including the mirror display 4a of Example 1 and a display light control device. FIG. 28 is a block diagram for explaining the main structure of an electronic device of Example 27. As shown in FIG. 28, the mirror display 4a includes the liquid crystal display device 5a and the half mirror plate 7a, and the liquid crystal display device 5a includes the liquid crystal panel 11a and the backlight 9a therein. A display light control device 26 includes a panel control unit 27, a backlight control unit 28, and a signal control unit 29.

The panel control unit 27 includes a controller and a driver each configured to drive the liquid crystal panel 11a. For the physical structure thereof, the panel control unit may or may not be built in the liquid crystal display device 5a. In the present example, the panel control unit 27 is built in a liquid crystal television (trade name: LC-20F5, manufactured by Sharp Corp.) used as the liquid crystal display device 5a.

The backlight control unit 28 includes a controller and a driver each configured to drive the backlight 9a, and may or may not be built in the liquid crystal display device 5a. The backlight control unit 28 emits signals for switching the display mode and the mirror mode. The backlight control unit 28 also provides an effect of turning off the backlight 9a in response to the presence or absence of image signals.

The signal control unit 29 emits signals for operating the panel control unit 27 and the backlight control unit 28 together.

When a user selects the mirror mode, the display light control device 26 transmits a control signal for stopping the driving of the liquid crystal panel 11a to the panel control unit 27 and transmits a control signal for turning off the backlight 9a to the backlight control unit 28. This prevents unnecessary light leakage on the back side of the mirror surface in the mirror mode, so that the mirror performance in the mirror mode can be maximized and the electric energy consumption of the liquid crystal display device 5a can be suppressed. The signal control unit 29 can be configured to transmit a control signal for turning off the backlight 9a to the backlight control unit 28 when the image signal is zero, i.e., the liquid crystal display device 5a shows a black screen.

The electronic device 25a of the present example may include any one of the mirror displays of Examples 2 to 26 instead of the mirror display 4a of Example 1.

EXAMPLE 28

Figure 29:
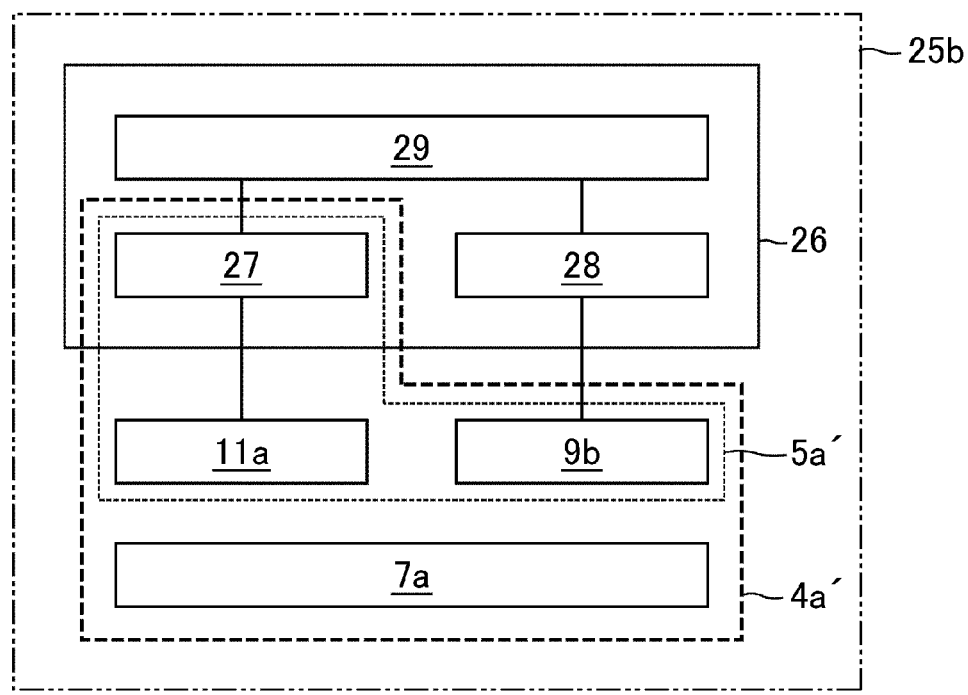
FIG. 29 is a block diagram for explaining the main structure of an electronic device of Example 28.

Example 28 relates to an electronic device including a mirror display and a display light control device. The difference from Example 27 is that a local-dimming backlight is used as the backlight of the liquid crystal display device. FIG. 29 is a block diagram for explaining the main structure of an electronic device of Example 28. As shown in FIG. 29, a mirror display 4a' includes a liquid crystal display device 5a' and the half mirror plate 7a, and the liquid crystal display device 5a' includes the liquid crystal panel 11a and a local-dimming backlight 9b therein. The display light control device 26 includes the panel control unit 27, the backlight control unit 28, and the signal control unit 29.

The local-dimming backlight is a backlight unit which has a light-emitting region divided into multiple blocks (domains) and has a function of controlling the luminances of the respective blocks of the backlight or turning off the backlight in response to an input image. In the present example, LED light sources were arranged in blocks of 16 rows×9 columns, and the luminances of the backlight can be controlled per block in response to the control signals from the LED controller.

Since the local-dimming backlight 9b can control the luminances of the backlight per block (in other words, locally), it can provide not only a function of switching the mirror mode and the display mode on the whole screen in terms of time but also a function of driving one domain in the mirror mode and another domain in the display mode at the same time on the same plane. For example, the center of the display region may be a mirror region. In the domain driven in the mirror mode, the backlight is locally turned off or the luminance thereof is reduced.

The electronic device 25b of the present example may further include an input device such as a touch panel. In this case, for example, the device may have a function of changing the sizes of the display region and the mirror region in response to pinch-in and pinch-out gestures on the touch panel. When a user performs a pinch-in gesture on a display (touch panel), the size of the display region is reduced and the size of the peripheral region, i.e., the mirror region, is expanded in response to the gesture. In contrast, when a user performs a pinch-out gesture on a display (touch panel), the size of the display region is expanded and the size of the peripheral region, i.e., the mirror region, is reduced in response to the gesture. Such operating feeling can improve the convenience of electronic devices and the commercial value thereof. This function can also be achieved in the electronic device 25a of Example 27, which includes no local-dimming backlight 9b, by showing a black screen in a region desired to serve as the mirror region. Still, if light leakage from the liquid crystal display device 5a deteriorates the mirror performance of the mirror region, a user may feel uncomfortable. Thus, the above function is particularly suitable for embodiments using the local-dimming backlight 9b, as shown in the present example.

The electronic device 25b of the present example may include, instead of the mirror display 4a', an alternative mirror display which is prepared by replacing the backlight 9a in one of the mirror displays of Examples 2 to 26 by the local-dimming backlight 9b.

EXAMPLE 29

Figure 30:
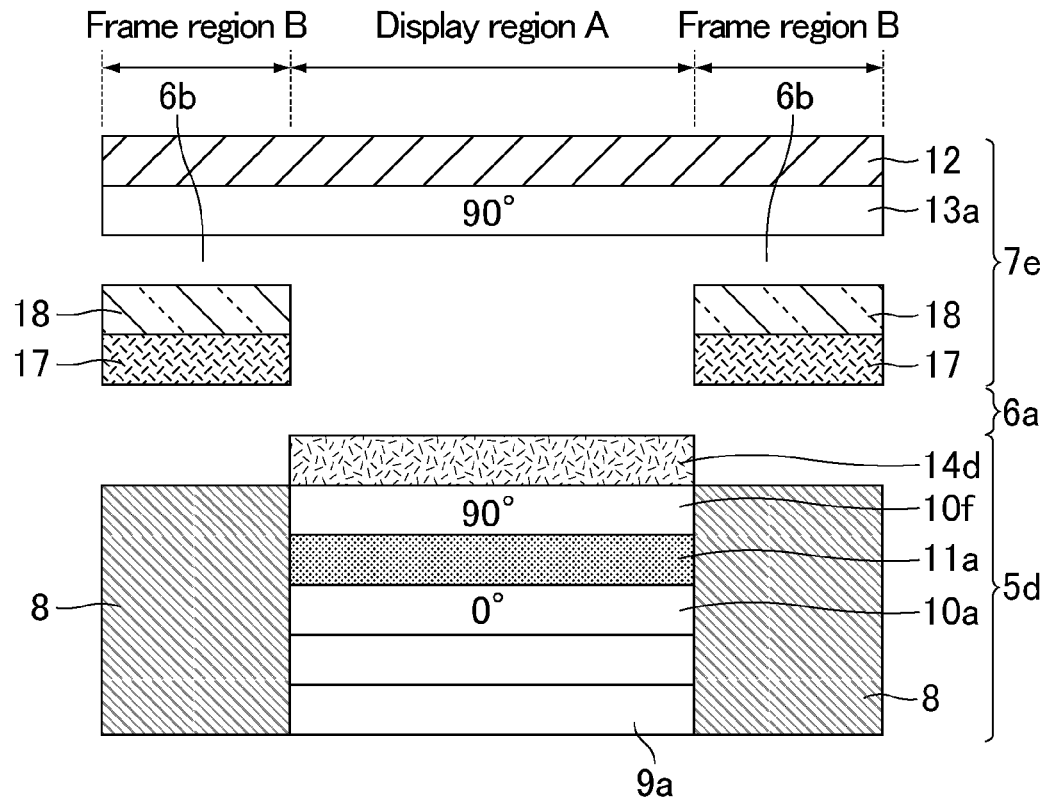
FIG. 30 is a schematic cross-sectional view showing the structure of a mirror display of Example 29.

Example 29 relates to a mirror display including a liquid crystal display device, a reflective polarizing plate serving as the half mirror layer, and a black acrylic plate and an AG film serving as the reflectance adjusters. FIG. 30 is a schematic cross-sectional view showing the structure of a mirror display of Example 29. As shown in FIG. 30, the mirror display of Example 29 includes a liquid crystal display device 5d, the air layer 6a, and the half mirror plate 7e in the order set forth from the back side to the viewer side. The liquid crystal display device 5d and the half mirror plate 7e were fixed by fitting the upper and lower edges of the half mirror plate 7e to a pair of aluminum rails which are attached to the upper and lower edges of the liquid crystal display device 5d so as to form a frame-like structure. The air layer 6a is the space formed in a slight gap between the liquid crystal display device 5d and the half mirror plate 7e.

The liquid crystal display device 5d used was prepared by modifying a liquid crystal television (trade name: LC-20F5, manufactured by Sharp Corp.) including the backlight 9a, two absorptive polarizing plates 10a and 10f disposed in a crossed-Nicols state, the liquid crystal panel 11a, and the bezel 8. The transmission axis of the back-side absorptive polarizing plate 10a was at an azimuth angle of 0° and the transmission axis of the viewer-side absorptive polarizing plate 10f was at an azimuth angle of 90°, provided that the degree of azimuth angle is defined to increase in positive (+) in the counterclockwise direction starting from the long side of the liquid crystal display device 5d. The display mode of the liquid crystal panel 11a was $UV^2A$. The bezel 8 was made of a black plastic resin.

The viewer-side absorptive polarizing plate of the liquid crystal television (manufactured by Sharp Corp.) underwent no anti-reflection treatment but underwent an anti-glare (AG) treatment with a haze of 3.0% on the surface thereof. Similar to the back-side absorptive polarizing plate 10a, the viewer-side absorptive polarizing plate was replaced by a clear polarizing plate which underwent neither AG treatment nor anti-reflection treatment. In other words, the viewer-side absorptive polarizing plate 10f used was a clear polarizing plate. Further, an anti-reflection film (AGLR film) 14d with a haze of 2.9% and a reflectance of 2.5% was attached to the viewer-side absorptive polarizing plate (clear polarizing plate) 10f.

In the present example, the AG-treated polarizing plate was first replaced by the clear polarizing plate 10f, and then the AGLR film 14d was attached thereto. Alternatively, the same effects can be achieved by replacing the original polarizing plate with a preliminarily AGLR-treated polarizing plate. The same effects can also be achieved by attaching an AGLR film directly to the AG-treated polarizing plate. The selection of the method can be in accordance with various factors such as production cost and production steps. Replacing the original polarizing plate with a preliminarily AGLR-treated polarizing plate is not necessarily the best way. In the case of small-quantity production of mirror displays, for example, modifying liquid crystal panels or liquid crystal display devices for typical liquid crystal televisions to finish the products may be more inexpensive than preparing liquid crystal panels to which a specially designed polarizing plate is attached in some cases.

The half mirror plate 7e included the 2.5-mm-thick glass plate 12 and the reflective polarizing plate 13a stacked thereon with acrylic pressure-sensitive adhesive (not shown). Then, the black acrylic plate 17 to which the AG film 18 was attached with acrylic pressure-sensitive adhesive (not shown) was disposed as the reflectance adjuster in a region (the frame region B of the mirror display) which does not overlap the display region of the liquid crystal panel 11a with the air layer 6b interposed therebetween. Substantially similar to the AGLR film 14d disposed on the viewer-side absorptive polarizing plate 10f of the liquid crystal display device 5d, this AG film 18 underwent an AG treatment with a haze of 3.0%. Still, it did not undergo an anti-reflection treatment and the reflectance thereof was 4.1%. In the present example, the AG film 18 was attached to the black acrylic plate 17. Still, the same effects can be achieved by eliminating the black acrylic plate 17 and attaching the AG film directly to the bezel 8 (made of black plastic resin) in the liquid crystal display device 5d.

In order to allow the half mirror plate 7e to sufficiently serve as a mirror, no anti-reflection film is disposed on the viewing side of the glass plate 12. The thickness of the glass plate 12 is not limited to 2.5 mm as mentioned above, and may be thinner or thicker than this value. The glass plate 12 may be replaced by a transparent plate made of acrylic resin, for example.

The reflective polarizing plate 13a may be a multilayer reflective polarizing plate, a nanowire-grid polarizing plate, or a reflective polarizing plate utilizing the selective reflection of cholesteric liquid crystal, for example. The present example used a multilayer reflective polarizing plate (trade name: DBEF) available from Sumitomo 3M Ltd. The reflective polarizing plate 13a was disposed such that the transmission axis thereof was at an azimuth angle of 90°.

The driving principles in the display mode and in the mirror mode of the mirror display of the present example are the same as those in Example 1, so that the explanation thereof is omitted here.

Most of the linearly polarized light components vibrating in an azimuth angle of 0° among the light components incident on the half mirror plate 7e from the viewer side are reflected on the reflective polarizing plate 13a whose transmission axis is at an azimuth angle of 90°, i.e., whose reflection axis is at an azimuth angle of 0°. Thereby, the mirror display of the present example serves as a mirror. In contrast, the linearly polarized light components vibrating in an azimuth angle of 90° among the light components incident on the half mirror plate 7e from the viewer side pass through the reflective polarizing plate 13a whose transmission axis is at an azimuth angle of 90°. Part of these light components is reflected on the interface between the reflective polarizing plate 13a and the air layers 6a and 6b in both the display region A where the liquid crystal panel 11a is disposed and the frame region B which is different from the display region A. Part of the light components traveling in the display region A among the light components incident on the air layers 6a and 6b is reflected on the interface between the air layer 6a and the AGLR film 14d; most of the remaining light components are absorbed by the absorptive polarizing plates 10a and 10f and a color filter of the liquid crystal display device 5d; and part of the remaining light components is reflected due to the internal reflection in the liquid crystal display device 5d. The light components traveling in the frame region B are reflected on the interface between the air layer 6b and the AG film 18, and the remaining light components are absorbed by the black acrylic plate 17. Thereby, the display region A and the frame region B have substantially the same reflectance, preventing the boundary line between the display region A and the frame region B from being observed.

In the present example where the display region A and the frame region B underwent different surface treatments, in comparison with Example 5, the reflectance of the AGLR film 14d disposed in the display region A is lower than the reflectance of the AG film 18 disposed in the frame region B. Thus, the present example can compensate a slight difference in reflectance between the display region A and the frame region B, which is due to the fact that the internal reflection of the liquid crystal display device 5d is not 0. This leads to an effect of much further preventing the boundary line between the display region A and the frame region B from being observed.

The internal reflection of the liquid crystal display device 5d means a reflection from the inside of the liquid crystal display device 5d which may be due to transparent electrodes formed from indium tin oxide (ITO), thin film transistor (TFT) elements, metal bus lines, and the like components, for example. The percentage of the internal reflection is generally 0.5 to 2.0% when measured through an absorptive linear polarizing plate. Such a reflection is called internal reflection distinguished from the surface reflection which is defined in accordance with the material forming the outermost surface and the type of surface treatment. Even if the surface of a polarizing plate undergoes an ideal anti-reflection treatment with a reflectance of 0%, the reflectance of the liquid crystal display device is not 0% but 0.5 to 2.0% as mentioned above. This is called the internal reflection of a liquid crystal display device (or a liquid crystal panel). In contrast, the internal reflection of the black acrylic plate 17 determined in the same manner as mentioned above is 0%.

The reflectance of the AGLR film 14d used in the present example was 2.5%, the internal reflectance of the liquid crystal display device 5d was 1.5%, and the reflectance of the AG film 18 was 4.1%. Thus, with respect to the portion below (closer to the back side than) the reflective polarizing plate 13a, the reflectance in the display region A is (2.5%+ 1.5%=) 4.0% and the reflectance in the frame region B is 4.1%, i.e., they have substantially the same reflectance. As is clear from the values shown in Table 4 that provides the evaluation results of the examples, the difference in reflectance between the display region A and the frame region B becomes smaller when the measurement is performed through the glass plate 12 and the reflective polarizing plate 13a.

In the case of applying the AG film 18 to the display region A (Example 5), the reflectance in the display region A is (4.1%+1.5%=) 5.6%. This proves that the structure of the present example can much more prevent the boundary line between the display region A and the frame region B from being observed.

EXAMPLE 30

Example 30 relates to a mirror display including a liquid crystal display device, a reflective polarizing plate serving as the half mirror layer, and a black acrylic plate and an AG film serving as the reflectance adjusters. The difference from Example 29 is that the reflectance of the AGLR film 14d disposed in the display region A is 1.3%. In other words, the anti-reflection film (AGLR film) 14d with a haze of 2.9% and a reflectance of 1.3% is attached to the clear polarizing plate 10f. The difference from Example 29 is only the reflectance of the AGLR film 14d. Thus, the explanation of the structure thereof is omitted here.

The driving principles in the display mode and in the mirror mode of the mirror display of the present example are substantially the same as those in Example 29, so that the explanation of the common respects is omitted here.

In the present example, the reflectance of the AGLR film 14d was 1.4%, the internal reflectance of the liquid crystal display device 5d was 1.5%, and the reflectance of the AG film 18 was 4.1%. Thus, with respect to the portion below (closer to the back side than) the reflective polarizing plate 13a, the reflectance in the display region A is (1.4%+1.5%=) 2.9% and the reflectance in the frame region B is 4.1%. Unlike Example 29, the reflectance in the display region A is slightly lower than that in the frame region B. The difference in reflectance between the display region A and the frame region B is increased to a degree similar to that of Example 5. The difference between Example 5 and Example 30 can be revealed by focusing not only on the absolute value of the difference in reflectance but also on which has a greater reflectance, the display region A and the frame region B, i.e., the positive or negative sign of the difference.

The reflectance in the display region A, the reflectance in the frame region B, and the difference therebetween in each of Examples 5, 29, and 30 are shown in the following Table 2. The reflectances and the difference therebetween are determined with respect to the reflectances below the reflective polarizing plate 13a.

TABLE 2

| | Reflectance below reflective polarizing plate (%) | | |
|---|---|---|---|
| | Display region A | Frame region B | Difference |
| Example 5 | 5.6 | 4.1 | −1.5 |
| Example 29 | 4.0 | 4.1 | 0.1 |
| Example 30 | 2.9 | 4.1 | 1.2 |

In Example 5, the reflectance in the display region A is greater than the reflectance in the frame region B. In particular, when the liquid crystal display device 5a including no local-dimming backlight is in a power-on state and a user selects the mirror mode, the display region A disadvantageously give light leakage from the liquid crystal display device 5a. Thus, the brightness of the display region A in the mirror mode is much higher than the brightness expected from the reflectance of 5.6%. Specifically, even though the reflectances in the display region A and in the frame region B are adjusted so as to prevent the boundary line between the display region A and the frame region B from being observed when the mirror display is driven in the mirror mode with the liquid crystal display device 5a in a power-off state, the boundary line is easily observed when the mirror display is driven in the mirror mode with the liquid crystal display device 5a in a power-on state.

On the contrary, in Example 30, the reflectance in the display region A is smaller than the reflectance in the frame region B. Thus, light leakage in the display region A with the liquid crystal display device 5d in a power-on state functions to make it difficult to observe the boundary line between the display region A and the frame region B. In other words, such a structure prevents the boundary line between the display region A and the frame region B from being easily observed in both the power-off state and the power-on state.

In the case that the reflectance in the display region A is smaller than the reflectance in the frame region B in consideration of driving the mirror display in the mirror mode with the liquid crystal display device in a power-on state, the optimal range of the difference in reflectance between the display region A and the frame region B (determined with respect to the reflectances below the reflective polarizing plate) depends on the conditions such as the luminance and the contrast of the liquid crystal display device and the illuminance of the environment where the mirror display is used. Under usual conditions, the reflectance in the display region A (determined with respect to the reflectance below the reflective polarizing plate) is preferably smaller than the reflectance in the frame region B (determined with respect to the reflectance below the reflective polarizing plate) by 0.5% or higher and 3% or lower. Such a structure prevents the boundary line between the display region A and the frame region B from being easily observed in both the power-off state and the power-on state.

EXAMPLE 31

Figure 31:
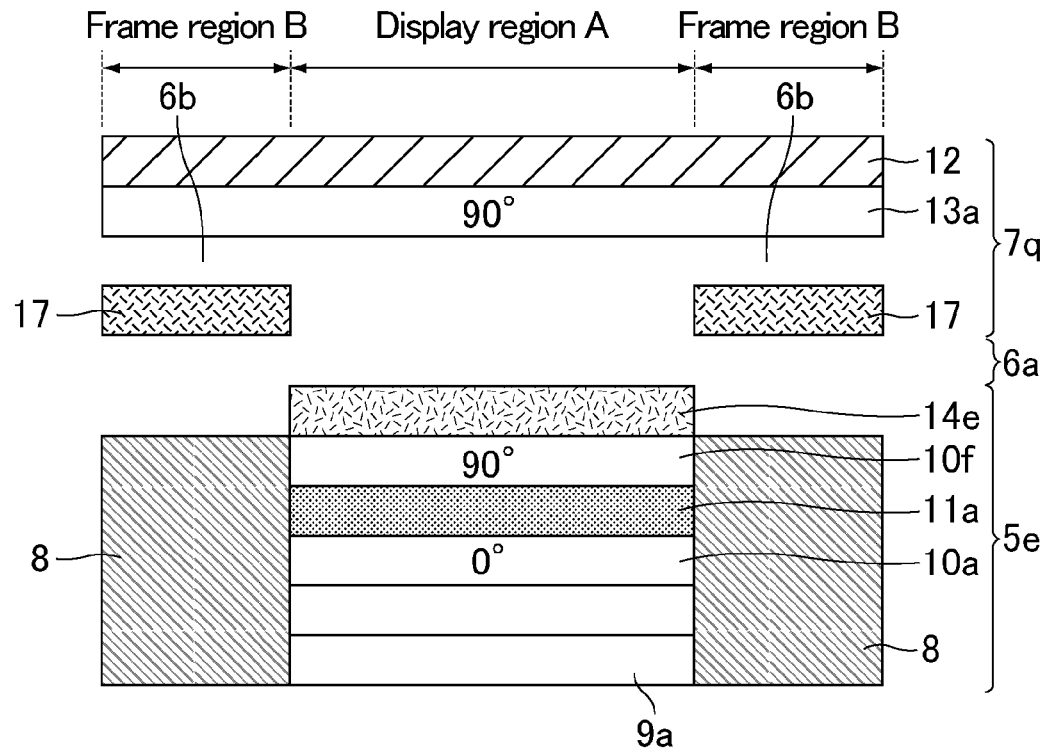
FIG. 31 is a schematic cross-sectional view showing the structure of a mirror display of Example 31.

Example 31 relates to a mirror display including a liquid crystal display device, a reflective polarizing plate serving as the half mirror layer, and a black acrylic plate serving as the reflectance adjuster. The difference from Example 29 is that the black acrylic plate 17 to which the AG film 18 is attached serving as the reflectance adjuster is replaced by a black acrylic plate alone and that the AGLR film 14d serving as the anti-reflection film disposed on the outermost surface of the liquid crystal display device is replaced by a clear LR film which is an LR film undergone no AG treatment. FIG. 31 is a schematic cross-sectional view showing the structure of a mirror display of Example 31. As shown in FIG. 31, the mirror display of Example 31 included the clear polarizing plate 10f and an anti-reflection film (clear LR film) 14e with a reflectance of 2.5% attached to the clear polarizing plate. Further, the black acrylic plate 17 serving as the reflectance adjuster was disposed in a region (the frame region B of the mirror display) which does not overlap the display region of the liquid crystal panel 11a with the air layer 6b interposed therebetween.

In the present example, the AG-treated polarizing plate was first replaced by the clear polarizing plate 10f, and then the clear LR film 14e was attached thereto. Alternatively, the same effects can be achieved by replacing the original polarizing plate with a preliminarily clear-LR-treated polarizing plate. The same effects can also be achieved by attaching a clear LR film directly to the AG-treated polarizing plate. The selection of the method can be in accordance with various factors such as production cost and production steps. Replacing the original polarizing plate with a preliminarily clear-LR-treated polarizing plate is not necessarily the best way. In the case of small-quantity production of mirror displays, for example, modifying liquid crystal panels or liquid crystal display devices for typical liquid crystal televisions to finish the products may be more inexpensive than preparing liquid crystal panels to which a specially designed polarizing plate is attached in some cases.

In the present example, the black acrylic plate 17 was disposed. Still, if the bezel 8 in a liquid crystal display device 5e is made of a black plastic resin, the same effects can be achieved even without the black acrylic plate 17.

The reflective polarizing plate 13a used in the present example was a multilayer reflective polarizing plate (trade name: DBEF) available from Sumitomo 3M Ltd. The reflective polarizing plate 13a was disposed such that the transmission axis was at an azimuth angle of 90°.

The driving principles in the display mode and in the mirror mode of the mirror display of the present example are the same as those in Example 1, so that the explanation thereof is omitted here.

Most of the linearly polarized light components vibrating in an azimuth angle of 0° among the light components incident on a half mirror plate 7q from the viewer side are reflected on the reflective polarizing plate 13a whose transmission axis is at an azimuth angle of 90°, i.e., whose reflection axis is at an azimuth angle of 0°. Thereby, the mirror display of the present example serves as a mirror. In contrast, the linearly polarized light components vibrating in an azimuth angle of 90° among the light components incident on the half mirror plate 7q from the viewer side pass through the reflective polarizing plate 13a whose transmission axis is at an azimuth angle of 90°. Part of these light components is reflected on the interface between the reflective polarizing plate 13a and the air layers 6a and 6b in both the display region A where the liquid crystal panel 11a is disposed and the frame region B which is different from the region A. Part of the light components traveling in the display region A among the light components incident on the air layers 6a and 6b is reflected on the interface between the air layer 6a and the clear LR film 14e; most of the remaining light components are absorbed by the absorptive polarizing plates 10a and 10f and a color filter in the liquid crystal display device 5e; and part of the remaining light components is reflected due to the internal reflection in the liquid crystal display device 5e. The light components traveling in the frame region B are reflected on the interface between the air layer 6b and the black acrylic plate 17, and the remaining light components are absorbed by the black acrylic plate 17. Thereby, the display region A and the frame region B have substantially the same reflectance, preventing the boundary line between the display region A and the frame region B from being observed.

Similar to Example 29, the display region A and the frame region B underwent different surface treatments in the present example. Thus, the reflectance of the clear LR film 14e disposed in the display region A is lower than the reflectance of the surface (without surface treatment) of the black acrylic plate 17 disposed in the frame region B. As a result, the present example can compensate a slight difference in reflectance between the display region A and the frame region B, which is due to the fact that the internal reflection of the liquid crystal display device 5e is not 0. Thus, such a structure provides an effect of much more preventing the boundary line between the display region A and the frame region B from being observed.

In the present example, the reflectance of the clear LR film 14e was 2.5%, the internal reflectance of the liquid crystal display device 5e was 1.5%, and the surface reflectance of the black acrylic plate 17 was 4.1%. Thus, with respect to the portion below (closer to the back side than) the reflective polarizing plate 13a, the reflectance in the display region A is (2.5%+1.5%=) 4.0% and the reflectance in the frame region B is 4.1%, i.e., they have substantially the same reflectance. As is clear from the values shown in Table 4 which provides the evaluation results of examples, the difference in reflectance between the display region A and the frame region B becomes smaller when the measurement is performed through the glass plate 12 and the reflective polarizing plate 13a.

EXAMPLE 32

Example 32 relates to a mirror display including a liquid crystal display device, a reflective polarizing plate serving as the half mirror layer, and a black acrylic plate serving as the reflectance adjuster. The difference from Example 31 is that the reflectance of the clear LR film 14e disposed in the display region A is 1.0%. In other words, the anti-reflection film (clear LR film) 14e with a reflectance of 1.0% was attached to the clear polarizing plate 10f. The difference from Example 31 is only the reflectance of the clear LR film 14e, so that the explanation of the structure thereof is omitted here.

The driving principles in the display mode and in the mirror mode of the mirror display of the present example are the same as those in Example 31, so that the explanation of the common respects is omitted here. The difference between Example 31 and Example 32 (the present example) is substantially the same as the difference between Example 29 and Example 30. Still, the explanation thereof is given below so as to make sure of the difference.

In the present example, the reflectance of the clear LR film 14e was 1.0%, the internal reflectance of the liquid crystal display device 5e was 1.5%, and the surface reflectance of the black acrylic plate 17 was 4.1%. Thus, with respect to the portion below (closer to the back side than) the reflective polarizing plate 13a, the reflectance in the display region A is (1.0%+1.5%=) 2.5% and the reflectance in the frame region B is 4.1%. Unlike Example 31, the reflectance in the display region A is slightly lower than that in the frame region B. The difference in reflectance between the display region A and the frame region B is increased to a degree similar to that of Example 5. The difference between Example 5 and Example 32 can be revealed by focusing not only on the absolute value of the difference in reflectance but also on which has a greater reflectance, the display region A and the frame region B, i.e., the positive or negative sign of the difference.

The reflectance in the display region A, the reflectance in the frame region B, and the difference therebetween in each of Examples 5, 31, and 32 are shown in Table 3. The reflectances and the difference therebetween are determined with respect to the reflectances below the reflective polarizing plate 13a.

TABLE 3

| | Reflectance below reflective polarizing plate (%) | | |
|---|---|---|---|
| | Display region A | Frame region B | Difference |
| Example 5 | 5.6 | 4.1 | −1.5 |
| Example 31 | 4.0 | 4.1 | 0.1 |
| Example 32 | 2.5 | 4.1 | 1.6 |

In Example 5, the reflectance in the display region A is greater than the reflectance in the frame region B. In particular, when the liquid crystal display device 5a including no local-dimming backlight is in a power-on state and a user selects the mirror mode, the display region A disadvantageously give light leakage from the liquid crystal display device 5a. Thus, the brightness of the display region A in the mirror mode is much higher than the brightness expected from the reflectance of 5.6%. Specifically, even though the reflectances in the display region A and in the frame region B are adjusted so as to prevent the boundary line between the display region A and the frame region B from being observed when the mirror display is driven in the mirror mode with the liquid crystal display device 5a in a power-off state, the boundary line is easily observed when the mirror display is driven in the mirror mode with the liquid crystal display device 5a in a power-on state.

On the contrary, in Example 32, the reflectance in the display region A is smaller than the reflectance in the frame region B. Thus, light leakage in the display region A with the liquid crystal display device 5e in a power-on state functions to make it difficult to observe the boundary line between the display region A and the frame region B. In other words, such a structure prevents the boundary line between the display region A and the frame region B from being easily observed in both the power-off state and the power-on state.

EXAMPLE 33

Figure 32:
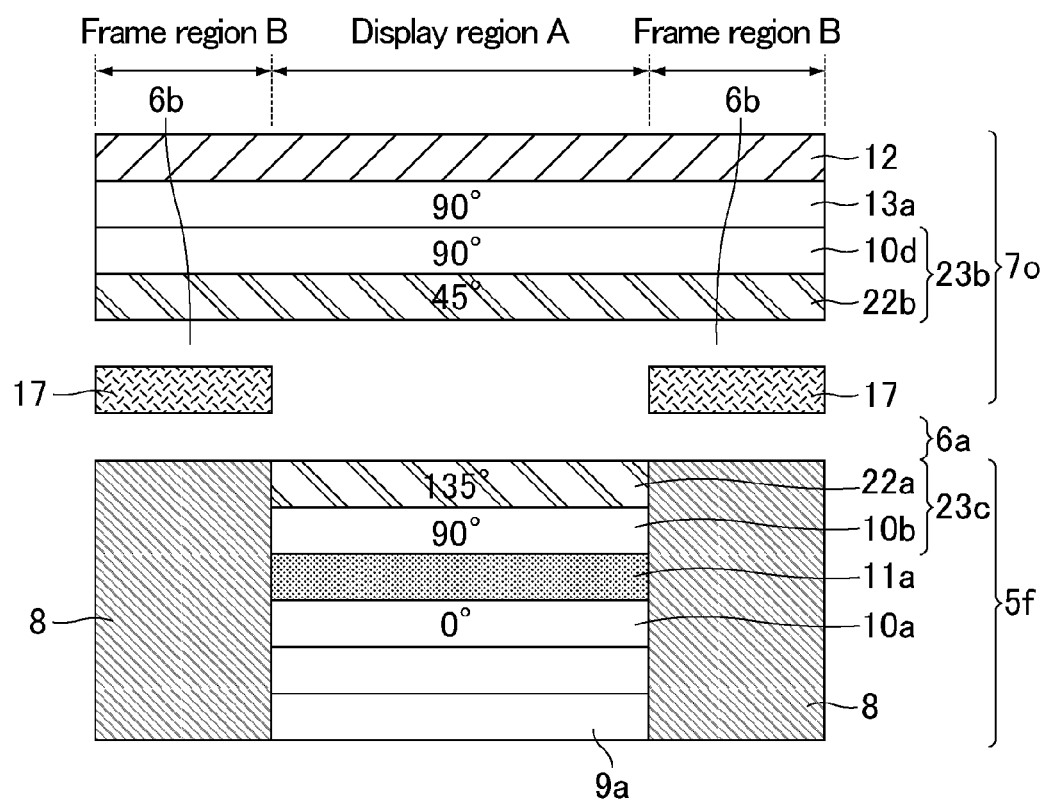
FIG. 32 is a schematic cross-sectional view showing the structure of a mirror display of Example 33.

Example 33 relates to a mirror display including a liquid crystal display device, a reflective polarizing plate serving as the half mirror layer, and a circular polarizing plate and a black acrylic plate serving as the reflectance adjusters. FIG. 32 is a schematic cross-sectional view showing the structure of a mirror display of Example 33. As shown in FIG. 32, the mirror display of Example 33 includes a liquid crystal display device 5f, the air layer 6a, and the half mirror plate 7o in the order set forth from the back side to the viewer side. The liquid crystal display device 5f and the half mirror plate 7o were fixed by fitting the upper and lower edges of the half mirror plate 7o to a pair of aluminum rails which are attached to the upper and lower edges of the liquid crystal display device 5f so as to form a frame-like structure. The air layer 6a is the space formed in a slight gap between the liquid crystal display device 5f and the half mirror plate 7o.

The liquid crystal display device 5f used was prepared by modifying a liquid crystal television (trade name: LC-20F5, manufactured by Sharp Corp.) including the backlight 9a, two absorptive polarizing plates 10a and 10b disposed in a crossed-Nicols state, the liquid crystal panel 11a, and the bezel 8. The transmission axis of the back-side absorptive polarizing plate 10a was at an azimuth angle of 0° and the transmission axis of the viewer-side absorptive polarizing plate 10b was at an azimuth angle of 90°, provided that the degree of azimuth angle is defined to increase in positive (+) in the counterclockwise direction starting from the long side of the liquid crystal display device 5f. The surface of the viewer-side absorptive polarizing plate 10b undergoes no anti-reflection treatment. The display mode of the liquid crystal panel 11a was $UV^2A$. The bezel 8 was made of a black plastic resin.

The λ/4 plate 22a was stacked closer to the viewer side than the viewer-side absorptive polarizing plate 10b with acrylic pressure-sensitive adhesive (not shown) such that the slow axis thereof was at an azimuth angle of 135°. The λ/4 plate 22a used was prepared by uniaxially stretching a cycloolefinic polymer film (trade name: ZeonorFilm, manufactured by ZEON Corp.) to adjust the in-plane phase difference to 140 nm.

The half mirror plate 7o included the 2.5-mm-thick glass plate 12, the reflective polarizing plate 13a stacked thereon with acrylic pressure-sensitive adhesive (not shown), and a circular polarizing plate 23b consisting of the absorptive polarizing plate 10d and the λ/4 plate 22b attached to the reflective polarizing plate 13a. Then, the black acrylic plate 17 serving as the reflectance adjuster was disposed in a region (the frame region B of the mirror display) which does not overlap the display region of the liquid crystal panel 11a with the air layer 6b interposed therebetween.

In order to allow the half mirror plate 7o to sufficiently serve as a mirror, no anti-reflection film is disposed on the viewing side of the glass plate 12. The thickness of the glass plate 12 is not limited to 2.5 mm as mentioned above, and may be thinner or thicker than this value. The glass plate 12 may be replaced by a transparent plate made of acrylic resin, for example.

The reflective polarizing plate 13a may be a multilayer reflective polarizing plate, a nanowire-grid polarizing plate, or a reflective polarizing plate utilizing the selective reflection of cholesteric liquid crystal, for example. The present example used a multilayer reflective polarizing plate (trade name: DBEF) available from Sumitomo 3M Ltd. The reflective polarizing plate 13a was disposed such that the transmission axis thereof was at an azimuth angle of 90°. The transmission axis of the absorptive polarizing plate 10d was at an azimuth angle of 90°, and the slow axis of the λ/4 plate 22b was at an azimuth angle of 45°. In other words, the circular polarizing plate 23b of the half mirror plate 7o is disposed in a crossed-Nicols state with a circular polarizing plate 23c of the liquid crystal display device 5f. The λ/4 plate 22b used was prepared by uniaxially stretching a cycloolefinic polymer film (trade name: ZeonorFilm, manufactured by ZEON Corp.) to adjust the in-plane phase difference to 140 nm.

In the present example, the λ/4 plate 22a is stacked closer to the viewer side than the absorptive polarizing plate 10b which is disposed on the viewer side of the liquid crystal display device 5f such that the slow axis of the λ/4 plate is at an azimuth angle of 135°. Thus, in the display mode, left-handed circularly polarized light is emitted from the liquid crystal display device 5f, and the light is converted into linearly polarized light vibrating in an azimuth angle of 90° by the λ/4 plate 22b disposed closest to the back side of the half mirror plate 7o such that the slow axis thereof is at an azimuth angle of 45°. Then, the converted light components can pass through the absorptive polarizing plate 10d whose transmission axis is at an azimuth angle of 90° and the reflective polarizing plate 13a with hardly any loss. Thereby, even though the mirror display of the present example includes the half mirror plate 7o, it can show images with high luminance.

In the mirror mode, most of the linearly polarized light components vibrating in an azimuth angle of 0° among the light components incident on the half mirror plate 7o from the viewer side are reflected on the reflective polarizing plate 13a whose transmission axis is at an azimuth angle of 90°, i.e., whose reflection axis is at an azimuth angle of 0°, so that the display serves as a mirror. With such driving principles, the mirror display of the present example can be driven in both the display mode and the mirror mode.

In the mirror mode, the linearly polarized light components vibrating in an azimuth angle of 90° among the outside light components incident on the half mirror plate 7o from the viewer side pass through the reflective polarizing plate 13a whose transmission axis is at an azimuth angle of 90° and the absorptive polarizing plate 10d. The components are converted into right-handed circularly polarized light by the λ/4 plate 22b whose slow axis is at an azimuth angle of 45°.

Then, the light is incident on the air layers 6a and 6b, and is reflected on the interface between the air layers 6a and 6b, and on the surfaces of the black acrylic plate 17, the bezel 8, and the λ/4 plate 22a. The reflected components are converted into left-handed circularly polarized light, and then returned to the circular polarizing plate 23b and absorbed thereby. In other words, even if the light entering from the half mirror plate 7o toward the back side passes through the air layers 6a and 6b and is reflected on the surfaces of the black acrylic plate 17, the bezel 8, and the λ/4 plate 22a, the anti-reflection effect of the circular polarizing plate 23b substantially prevents such light from being observed by a viewer as reflected light in both the display region A and the frame region B. Thereby, the display region A and the frame region B have substantially the same reflectance, preventing the boundary line between the display region A and the frame region B from being observed.

In the frame region B, part of the light components entering from the half mirror plate 7o toward the back side is reflected on the surface of the black acrylic plate 17 and the remaining light components are absorbed by the black acrylic plate 17. In the display region A, part of the light components is reflected on the surface of the λ/4 plate 22a and the remaining light components are converted into linearly polarized light vibrating in an azimuth angle of 90° by the effect of the λ/4 plate 22a and then pass through the absorptive polarizing plate 10b whose transmission axis is at an azimuth angle of 90°. Most part of such light components is absorbed by the absorptive polarizing plate 10b and a color filter of the liquid crystal display device 5f, and the remaining part thereof is again reflected due to the internal reflection of the liquid crystal display device 5f. Thus, the reflectance in the display region A is slightly higher than that in the frame region B by the internal reflection of the liquid crystal display device 5f. This problem can effectively be solved not by reducing the reflectance in the display region A but by increasing the reflectance in the frame region B. Examples of the method thereof include disposing a reflection-increasing film on the black acrylic plate 17, and disposing the λ/4 plate 22b in the half mirror plate 7o in the display region A and not disposing the same in the frame region B.

EXAMPLE 34

Figure 33:
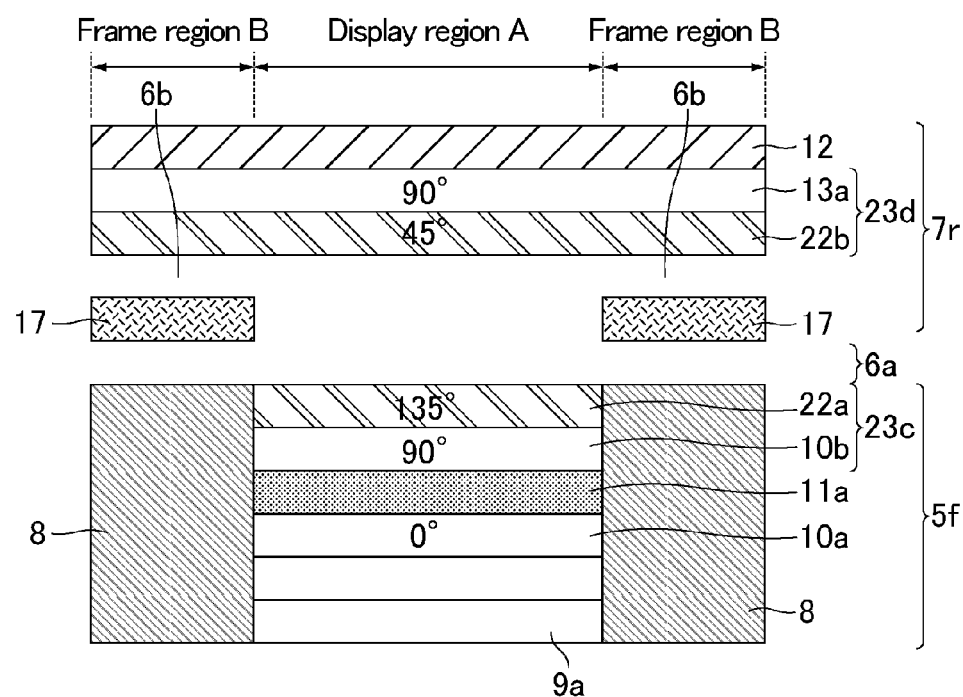
FIG. 33 is a schematic cross-sectional view showing the structure of a mirror display of Example 34.

Example 34 relates to a mirror display including a liquid crystal display device, a reflective polarizing plate serving as the half mirror layer, and a λ/4 plate and a black acrylic plate serving as the reflectance adjusters. The difference from Example 33 is that the absorptive polarizing plate 10d disposed in the half mirror plate 7o is eliminated and a circular polarizing plate is constituted by a combination of the reflective polarizing plate serving as the half mirror layer and the λ/4 plate serving as the reflectance adjuster. FIG. 33 is a schematic cross-sectional view showing the structure of a mirror display of Example 34. As shown in FIG. 33, the mirror display of Example 34 included the liquid crystal display device 5f, the air layer 6a, and a half mirror plate 7r in the order set forth from the back side to the viewer side. The half mirror plate 7r included the glass plate 12, the reflective polarizing plate 13a stacked thereon with acrylic pressure-sensitive adhesive (not shown), and the λ/4 plate 22b attached to the reflective polarizing plate 13a.

The degree of polarization of a reflective polarizing plate is usually lower than that of an absorptive polarizing plate. Thus, elimination of the absorptive polarizing plate 10b in the liquid crystal display device 5f may decrease the contrast in the display mode. Still, the absorptive polarizing plate 10d disposed in the half mirror plate 7o in Example 33 is disposed in order to increase the degree of circular polarization of light entering from the half mirror plate 7o toward the back side. Thus, the elimination thereof and formation of a circular polarizing plate 23d only from the reflective polarizing plate 13a and the λ/4 plate 22b in the half mirror plate 7r have no influence on the contrast in the display mode. If the degree of polarization of the reflective polarizing plate 13a is insufficient, the above degree of circular polarization decreases. Still, it only means that the anti-reflection effect of the circular polarizing plate 23b, which is described in Example 33, is slightly deteriorated and the reflectances in the display region A and in the frame region B in the mirror mode both increase at similar levels. Thus, the present example can exert an effect of making it difficult to observe the boundary line between the display region A and the frame region B.

The driving principles in the display mode and in the mirror mode of the mirror display of the present example are the same as those in Example 33, so that the explanation thereof is omitted here.

EXAMPLE 35

Figure 34:
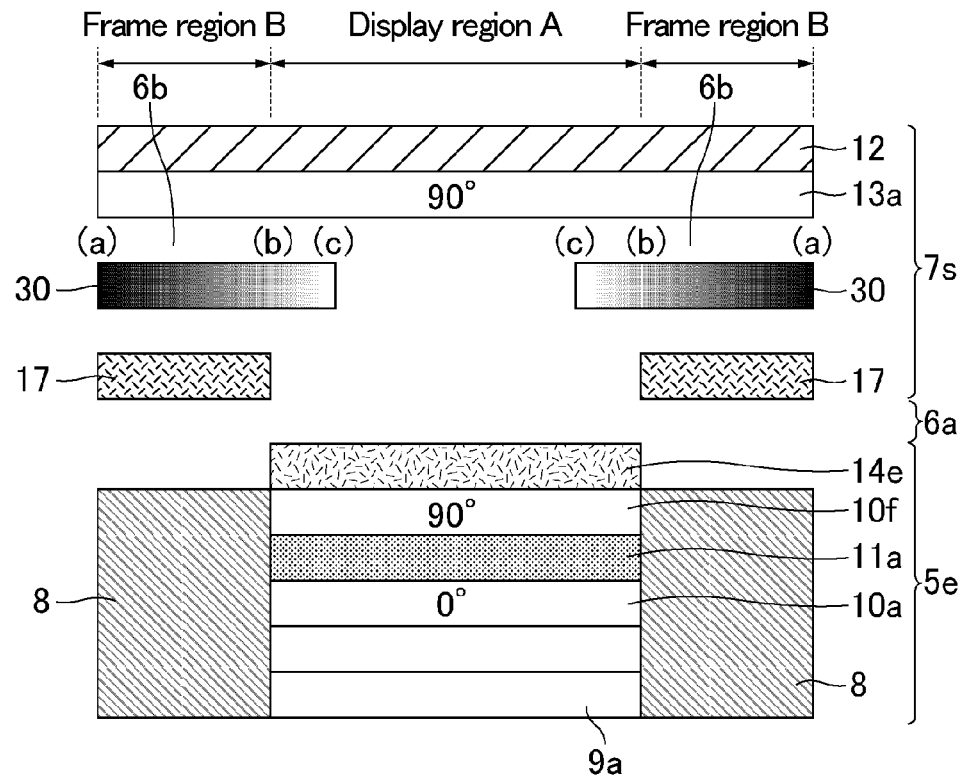
FIG. 34 is a schematic cross-sectional view showing the structure of a mirror display of Example 35.

Example 35 relates to a mirror display including a liquid crystal display device, a reflective polarizing plate serving as the half mirror layer, and a gradation filter and a black acrylic plate serving as the reflectance adjusters. The difference from Example 31 is that the gradation filter is used as the reflectance adjuster in addition to the black acrylic plate 17. FIG. 34 is a schematic cross-sectional view showing the structure of a mirror display of Example 35. As shown in FIG. 34, the mirror display of Example 35 included the liquid crystal display device 5e, the air layer 6a, and a half mirror plate 7s in the order set forth from the back side to the viewer side. The half mirror plate 7s included a gradation filter 30 and the black acrylic plate 17 serving as the reflectance adjusters in a region (the frame region B of the mirror display) which does not overlap the display region of the liquid crystal panel 11a with the air layer 6b interposed therebetween. Specifically, the gradation filter 30 was disposed on the back side of the reflective polarizing plate 13a with the air layer 6b interposed therebetween, and the black acrylic plate 17 was disposed on the back side of the gradation filter 30 with an air layer interposed therebetween.

Figure 35:
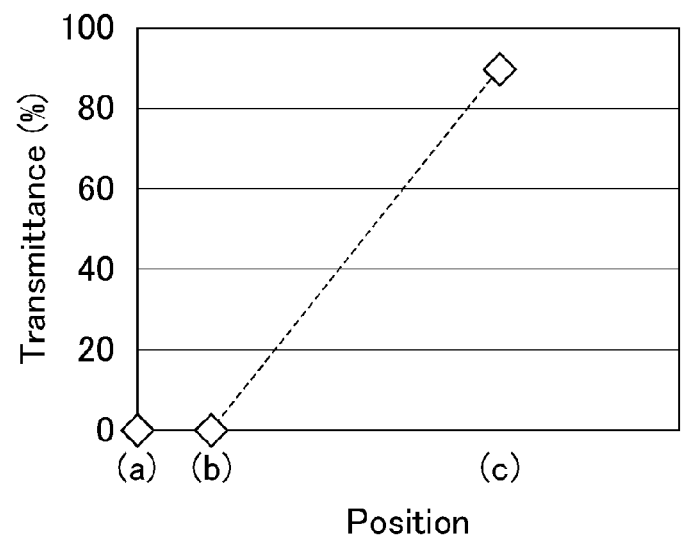
FIG. 35 is a graph of the light transmittance of a gradation filter used in Example 35 in relation to the positions shown in FIG. 34.

The gradation filter is an optical filter whose light transmittance is adjusted to change continually within a certain range. The gradation filter 30 of the present example is structured such that the transmittance thereof continually increases from the frame region B to the display region A. The edge of the gradation filter 30 overlaps the edge of the display region A of the mirror display. FIG. 35 is a graph of the light transmittance of a gradation filter used in Example 35 in relation to the positions shown in FIG. 34. As shown in FIG. 35, the light transmittance of the gradation filter is adjusted as follows. The transmittance is about 0% within the range from the position (a) to the position (b). The transmittance continually increases from the position (b) to the position (c), and the transmittance reaches about 92% at the position (c).

The gradation filter 30 is prepared by printing the aforementioned gradation pattern on a 100-μm-thick transparent PET film.

In the present example, the gradation filter 30 is disposed above the black acrylic plate 17 with an air layer interposed therebetween. Still, the same effects can be achieved by attaching the gradation filter to the black acrylic plate 17 with pressure sensitive adhesive or adhesive, or eliminating the black acrylic plate 17.

The driving principles in the display mode and in the mirror mode of the mirror display of the present example are the same as those in Example 31, so that the explanation of the same respects is omitted here.

In Example 31, the reflectances in the display region A and in the frame region B are adjusted so as to make it difficult to observe the boundary line between the display region A and the frame region B without the gradation filter 30. In particular, when the liquid crystal display device 5e including no local-dimming backlight is in a power-on state and a user selects the mirror mode, the display region A disadvantageously give light leakage from the liquid crystal display device 5e. Thus, the brightness of the display region A in the mirror mode is much higher than the brightness expected from the reflectance of 5.6%. Specifically, even though the reflectances in the display region A and in the frame region B are adjusted so as to prevent the boundary line between the display region A and the frame region B from being observed when the mirror display is driven in the mirror mode with the liquid crystal display device 5e in a power-off state, the boundary line is easily observed when the mirror display is driven in the mirror mode with the liquid crystal display device 5e in a power-on state. On the contrary, the present example uses the gradation filter 30 which has an effect of obscuring the boundary line between the display region A and the frame region B. Thus, a viewer fails to observe a clear boundary line. In the present example, the distance between the position (b) and the position (c), which corresponds to the length of a range where the transmittance changes, was set to 50 mm. The optimal value thereof depends on the factors such as a display size of a liquid crystal display device, and it is usually preferably 10 mm or greater, more preferably 30 mm or greater, and still more preferably 50 mm or greater.

EXAMPLE 36

Example 36 relates to a mirror display including a liquid crystal display device, a reflective polarizing plate serving as the half mirror layer, and a gradation filter serving as the reflectance adjuster. The difference from Example 35 is that (1) the gradation filter has a different size and light transmittance pattern so as to cover not only the frame region B but also the whole display region A, (2) the gradation filter is stacked on the reflective polarizing plate with acrylic pressure-sensitive adhesive, (3) a moth-eye-structured film serving as the anti-reflection film is stacked on the back side of the gradation filter with acrylic pressure-sensitive adhesive, (4) the black acrylic plate is eliminated, and (5) the anti-reflection film of the liquid crystal display device is changed from the clear LR film to the moth-eye-structured film.

Figure 36:
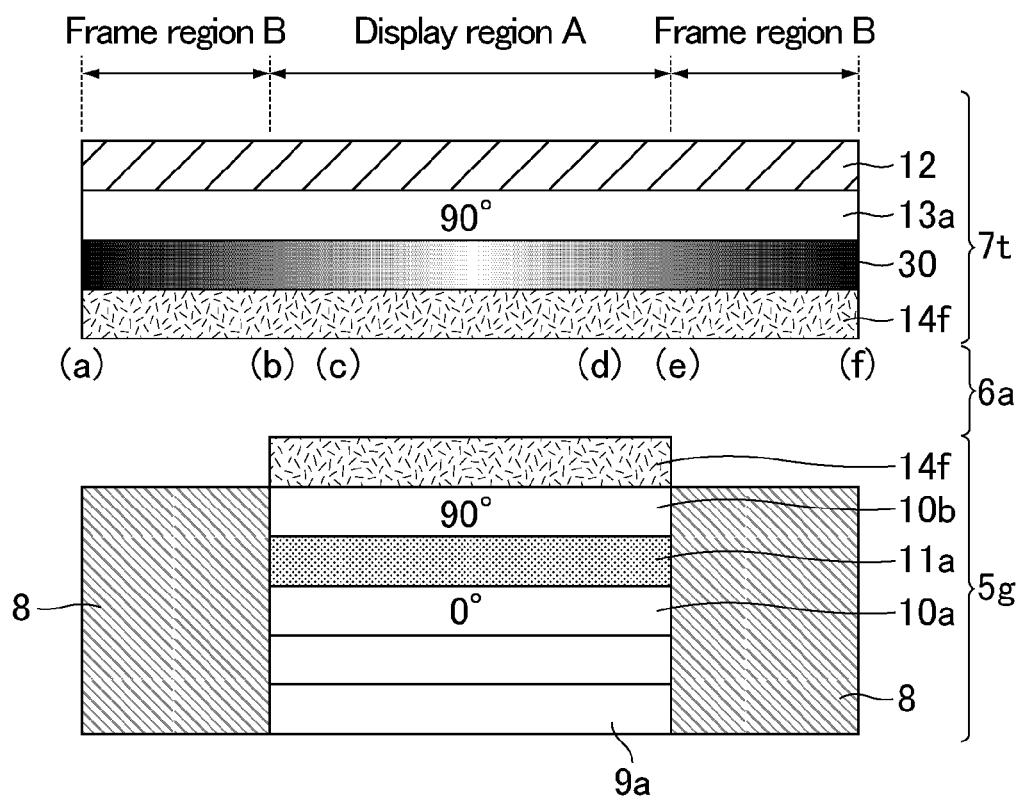
FIG. 36 is a schematic cross-sectional view showing the structure of a mirror display of Example 36.

FIG. 36 is a schematic cross-sectional view showing the structure of a mirror display of Example 36. As shown in FIG. 36, the mirror display of Example 36 included a liquid crystal display device 5g, the air layer 6a, and a half mirror plate 7t in the order set forth from the back side to the viewer side. The liquid crystal display device 5g included the absorptive polarizing plate 10b and an anti-reflection film 14f (a moth-eye-structured film) attached thereto. The half mirror plate 7t included the reflective polarizing plate 13a, the gradation filter 30 disposed on the whole back side of the reflective polarizing plate with pressure sensitive adhesive (not shown), and the anti-reflection film 14f (the moth-eye-structured film) disposed on the whole back side of the gradation filter 30 with pressure sensitive adhesive (not shown).

Figure 37:
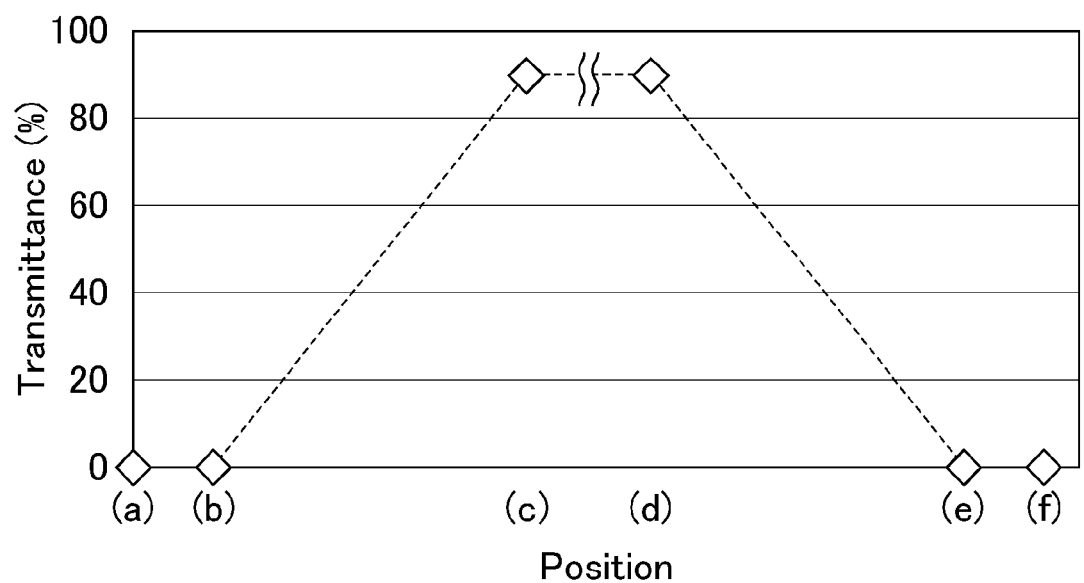
FIG. 37 is a graph of the light transmittance of a gradation filter used in Example 36 in relation to the positions shown in FIG. 36.

FIG. 37 is a graph of the light transmittance of a gradation filter used in Example 36 in relation to the positions shown in FIG. 36. As shown in FIG. 37, in the present example, the light transmittance of the gradation filter is adjusted as follows. The transmittance is about 0% in the range from the position (a) to the position (b). The transmittance continually increases from the position (b) to the position (c), and the transmittance reaches about 92% at the position (c). Then, the transmittance is kept at about 92% in the range from the position (c) to the position (d). The transmittance continually decreases from the position (d) to the position (e), and the transmittance reaches about 0% at the position (e). The transmittance is kept at about 0% in the range from the position (e) to the position (f).

Similar to Example 35, the gradation filter 30 was prepared by printing the above gradation pattern on a 100-μm-thick transparent PET film.

Example 35 uses the gradation filter 30 that has an effect of obscuring the boundary line between the display region A and the frame region B. Thus, when selecting the mirror mode with the liquid crystal display device 5e in the power-on state, a user does not observe a clear boundary line. Still, when observing the liquid crystal display device 5e in an oblique direction, the user may observe the boundary line due to the influence of, for example, diffused reflection on the edge of the gradation filter 30 at the side of the display region A (in other words, the cross section of the gradation filter at the position (c)). On the contrary, in the present example, the gradation filter 30 has a transparent region also in the range from the position (c) to the position (d). Thus, the cross section of the gradation filter 30 is not observed, showing an effect of making it much more difficult to observe the boundary line between the display region A and the frame region B.

Figure 38:
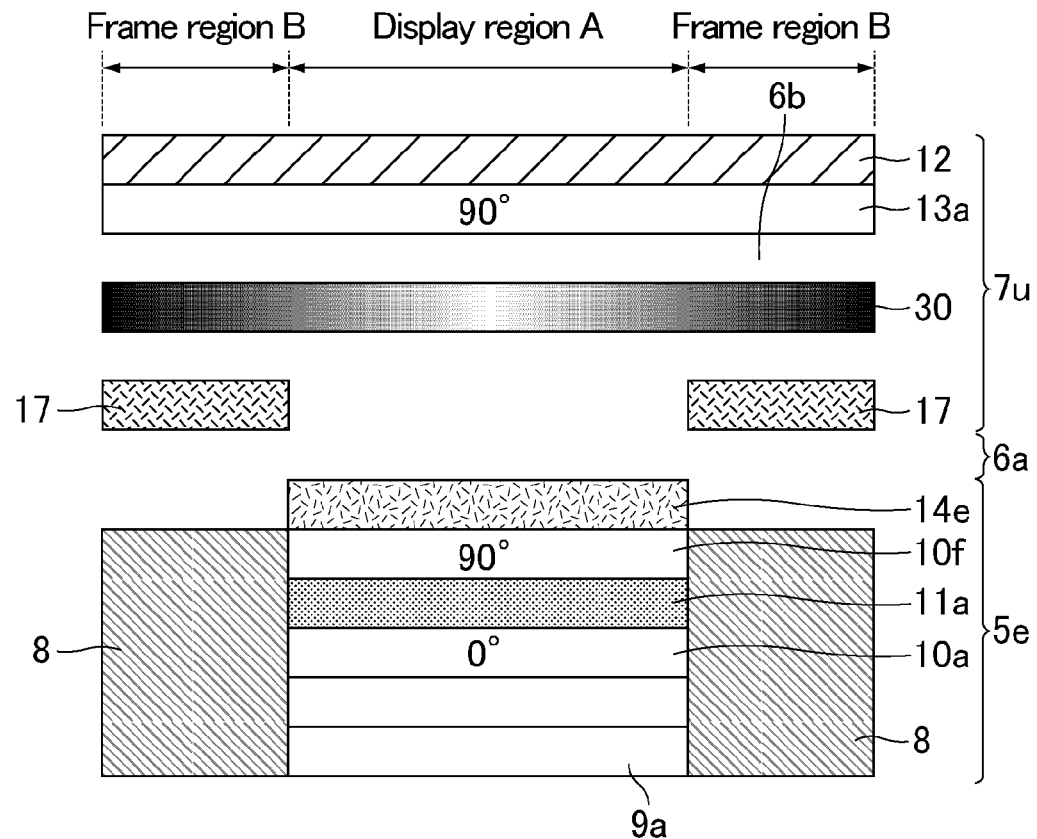
FIG. 38 is a schematic cross-sectional view showing one variation of the structure of the mirror display of Example 36.
Figure 39:
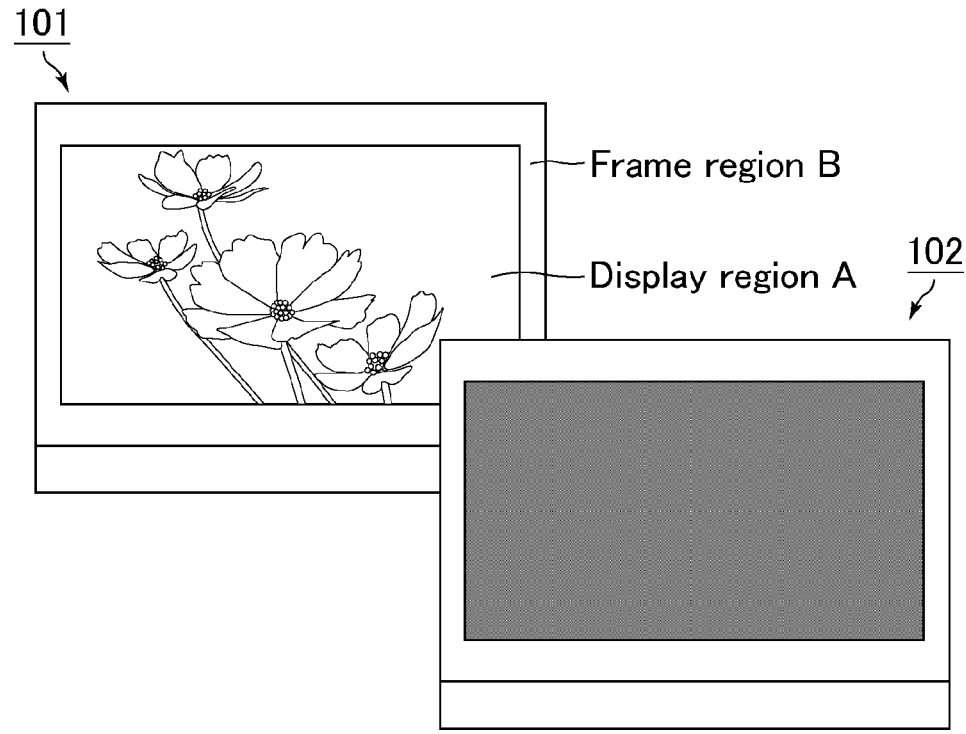
FIG. 39 is an explanatory view showing the display states in the power-on state and in the power-off state of a common conventional display device.

The above effect can also be achieved by the structure shown in FIG. 38 to which only the factor that "(1) the gradation filter has a different size and light transmittance pattern so as to cover not only the frame region B but also the whole display region A" is applied. FIG. 38 is a schematic cross-sectional view showing one variation of the structure of the mirror display of Example 36, including a half mirror plate 7u which is different from Example 35. The structure shown in FIG. 38 includes a transparent filter (a transparent region of the gradation filter 30) sandwiched between air layers in the display region A. This generates an 8% interface reflection (two 4% interface reflections). Such an increase in the interface reflection expands the difference in reflectance between the display region A and the frame region B and decreases the transmittance in the display region A, i.e., the transmittance in the display mode.

On the contrary, in the present example, the structure of the variation shown in FIG. 38 is improved such that the increase in interface reflection is compensated. Specifically, as mentioned above, a decrease in the transmittance in the display mode is prevented by the factors "(2) the gradation filter is stacked on the reflective polarizing plate with acrylic pressure-sensitive adhesive", "(3) a moth-eye-structured film serving as the anti-reflection film is stacked on the back side of the gradation filter with acrylic pressure-sensitive adhesive", "(4) the black acrylic plate is eliminated", and "(5) the anti-reflection film of the liquid crystal display device is changed from the clear LR film to the moth-eye-structured film".

[Evaluation Results of Mirror Displays of Examples 29 to 36]

For the mirror displays of Examples 29 to 36, (1) the transmittance in the display mode, (2) the reflectance in the display region A in the mirror mode, (3) the reflectance in the frame region B in the mirror mode, and (4) the difference between the reflectance in the display region A and the reflectance in the frame region B in the mirror mode are summarized in Table 4.

The transmittance in the display mode was determined as follows. First, a mirror display was made to show a white screen in a darkroom, and the screen luminance at this time was measured. Then, the measured value was standardized on the basis of the white-screen luminance of a liquid crystal display device (trade name: LC-20F5, manufactured by Sharp Corp.) commonly used in the respective examples. This white-screen luminance was defined as 100%. The measurement device used was a luminance meter (trade name: BM-5A) available from TOPCON CORP.

The reflectance in the mirror mode is a reflectance of a liquid crystal display device showing a black screen (in the power-off state). The measurement device used was a portable spectrophotometer (trade name: CM-2600d, range of measurement wavelength: 360 to 740 nm, integrating sphere type) available from KONICA MINOLTA, INC. The reflection measurement mode was a specular component included (SCI) mode. In the SCI mode, both the diffuse-reflected light and the specular-reflected light are measured, and the reflectance of light including the specular-reflected light is measured.

TABLE 4

| | Transmittance in display mode (%) | Reflectance in mirror mode (%) | | |
|---|---|---|---|---|
| | | Display region A | Frame region B | Difference |
| Example 29 | 91.7 | 56.7 | 56.5 | 0.2 |
| Example 30 | 91.7 | 56.1 | 56.5 | −0.4 |
| Example 31 | 91.6 | 56.6 | 56.6 | 0.0 |
| Example 32 | 91.7 | 56.0 | 56.6 | −0.6 |
| Example 33 | 91.6 | 54.2 | 53.7 | 0.5 |
| Example 34 | 91.6 | 54.4 | 53.9 | 0.5 |
| Example 35 | 91.6 | 56.6 | 56.7 | −0.1 |
| Example 36 | 92.1 | 53.9 | 53.0 | 0.9 |

The subjective evaluation shows that the mirror displays of Examples 29 to 36 each achieved a sufficient screen luminance in the display mode, being evaluated as having sufficient display performance. Also, the mirror displays of Examples 29 to 36 each prevented the boundary between the display region A and the frame region B from being observed, achieving particularly excellent design quality. Further, the mirror displays of Examples 29 to 36 were each evaluated as of practical use as a mirror.

As mentioned above, the mirror displays of Examples 29 to 36 can be driven in the mirror mode without any sacrifice of display performance. Also in the mirror mode, these mirror displays can prevent the boundary line between the display region A and the frame region B from being observed, providing a display device with good design quality.

In Examples 29 to 36, the half mirror layer and the reflectance adjuster were disposed so as to correspond to the region (frame region B) where the bezel 8 was disposed. Still, as in Examples 21 to 26, they may be extended to a region outside the frame region B where no bezel 8 is disposed. The mirror displays of Examples 29 to 36 can be used instead of the mirror display 4a or 4a' in the electronic devices of Examples 27 and 28.

<Embodiments Characterized by Features Other than Making Equal Reflectance in Display Region A and Reflectance in Frame Region B>

The aforementioned mirror displays and electronic devices of Examples 1 to 36 are characterized in that the reflectance adjuster prevents the boundary line between the display region A and the frame region B from being observed. In addition to this feature, Examples 12 to 15, 17 to 20, and 28 disclose novel features which conventional mirror displays and electronic devices do not have. Specifically, the mirror displays of Examples 12 to 15 (FIGS. 13 to 16) achieve a high performance mirror mode showing a high reflectance by the use of two reflective polarizing plates (the first reflective polarizing plate 13a and the second reflective polarizing plate 13b) whose transmission axes cross each other. The mirror displays of Examples 17 and 18 (FIGS. 18 and 19) achieve good performance in both the display mode and the mirror mode by a combination use of the reflective polarizing plate 13a, the switching liquid crystal panel 11b, and the absorptive polarizing plate 10e or 10d. The mirror displays of Examples 19 and 20 (FIGS. 20 and 21) achieve good performance in both the display mode and the mirror mode by a combination use of the reflective polarizing plate 13a, the switching liquid crystal panel 11b, and the reflective polarizing plate 13f or 13g. The electronic device of Example 28 includes the local-dimming backlight 9b so that it can prevent deterioration in mirror performance in the mirror region due to light leakage from the liquid crystal display device 5a. For example, such an electronic device can suitably be used in providing a function of driving one domain in the mirror mode and another domain in the display mode at the same time on the same plane. The following will describe specific examples of the embodiments characterized by features other than making equal the reflectance in the display region A and the reflectance in the frame region B. These embodiments are suitable for mirror displays in which the display region and the mirror region have the same size and are disposed at the same position.

EXAMPLE 37

Example 37 relates to a mirror display including a half mirror plate, and a first reflective polarizing plate whose transmission axis is at an angle of 90° and a second reflective polarizing plate whose transmission axis is at an azimuth angle of 78° disposed in the half mirror plate. The difference from Example 12 is that the half mirror plate is disposed only in the display region A and is not disposed in the frame region B, and neither the anti-reflection film 14a nor the black tape 15 is disposed.

Figure 40:
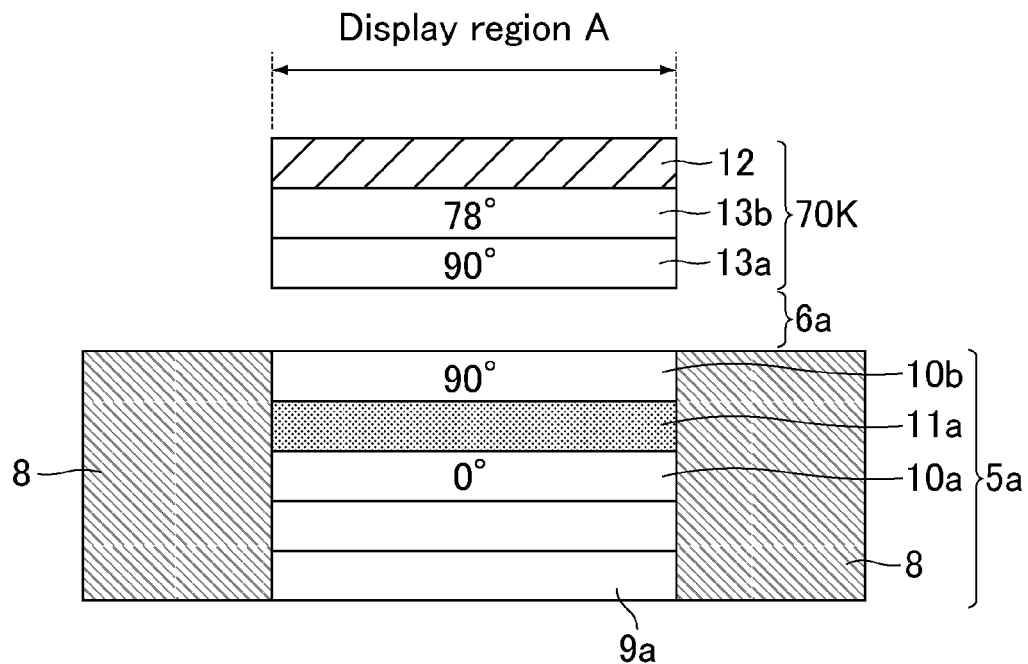
FIG. 40 is a schematic cross-sectional view showing the structure of a mirror display of Example 37.

FIG. 40 is a schematic cross-sectional view showing the structure of a mirror display of Example 37. As shown in FIG. 40, a half mirror plate 70K of Example 37 includes the first reflective polarizing plate 13a (azimuth of transmission axis: 90°), the second reflective polarizing plate 13b (azimuth of transmission axis: 78°), and the glass plate 12 in the order set forth from the back side to the viewer side. The respective components were bonded with acrylic pressure-sensitive adhesive (not shown). Although FIG. 40 illustrates a bezel 8 serving as the frame component, such a frame component may be or may not be disposed in the present example.

The driving principles in the display mode and in the mirror mode of the mirror display of the present example are the same as those in Example 12 except that the reflectance in the frame region B is not adjusted by the half mirror plate and that the reflectance is not adjusted by the anti-reflection film 14a in the display region A. The present example can achieve a high reflectance by the use of two reflective polarizing plates (the first reflective polarizing plate 13a and the second reflective polarizing plate 13b) whose transmission axes cross each other. Thus, the mirror display can achieve improved quality in the mirror mode. Specifically, the mirror display can achieve in the mirror mode the same reflectance as the reflectance in the display region A (57.4%) in Example 12 shown in Table 1.

EXAMPLE 38

Example 38 relates to a mirror display including a half mirror plate, and a first reflective polarizing plate whose transmission axis is at an angle of 90° and a second reflective polarizing plate whose transmission axis is at an azimuth angle of 78° disposed in the half mirror plate. The difference from Example 37 is that the half mirror plate includes no glass plate 12 and the half mirror plate is stacked on the liquid crystal display device 5a. In the mirror display in which the display region and the mirror region have the same size and are disposed at the same position, the half mirror plate may have no supporting component such as a glass plate and the half mirror plate may be integrated with the display device.

Figure 41:
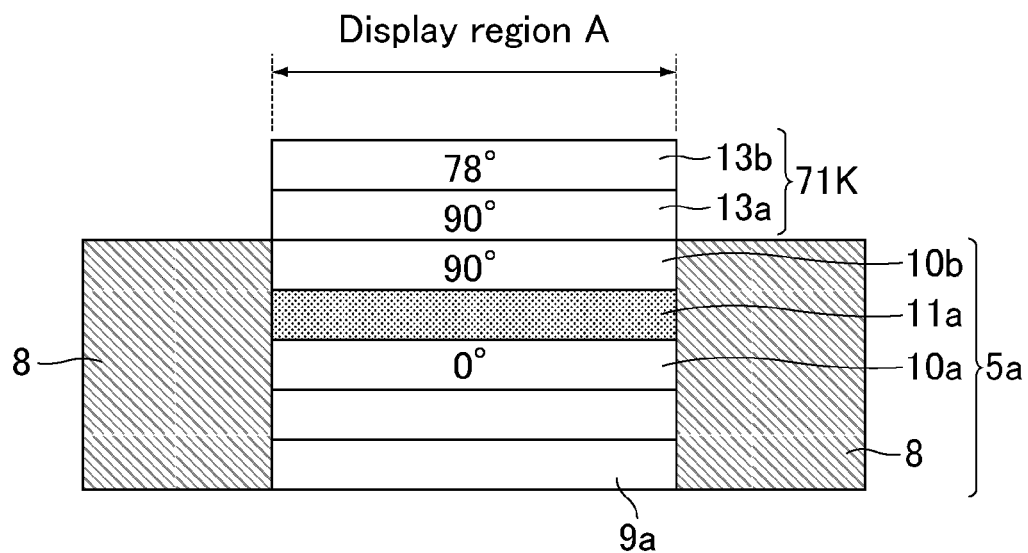
FIG. 41 is a schematic cross-sectional view showing the structure of a mirror display of Example 38.

FIG. 41 is a schematic cross-sectional view showing the structure of a mirror display of Example 38. As shown in FIG. 41, a half mirror plate 71K of Example 38 includes the first reflective polarizing plate 13a (azimuth of transmission axis: 90°) and the second reflective polarizing plate 13b (azimuth of transmission axis: 78°) in the order set forth from the back side to the viewer side. The back side of the first reflective polarizing plate 13a is in contact with the absorptive polarizing plate 10b of the liquid crystal display device 5a. The respective components were bonded with acrylic pressure-sensitive adhesive (not shown). Although FIG. 41 illustrates the bezel 8 serving as the frame component, such a frame component may be or may not be disposed in the present example.

The driving principles in the display mode and in the mirror mode of the mirror display of the present example are substantially the same as those in Example 37. The present example can achieve a high reflectance by the use of two reflective polarizing plates (the first reflective polarizing plate 13a and the second reflective polarizing plate 13b) whose transmission axes cross each other. Thus, the mirror display can achieve improved quality in the mirror mode. Specifically, the mirror display can achieve in the mirror mode the same reflectance as the reflectance in the display region A (57.4%) in Example 12 shown in Table 1.

EXAMPLE 39

Example 39 relates to a mirror display including a half mirror plate, and a first reflective polarizing plate whose transmission axis is at an angle of 90° and a second reflective polarizing plate whose transmission axis is at an azimuth angle of 60° disposed in the half mirror plate. The difference from Example 13 is that the half mirror plate is disposed only in the display region A and not disposed in the frame region B, and neither the anti-reflection film 14a nor the black tape 15 is disposed.

Figure 42:
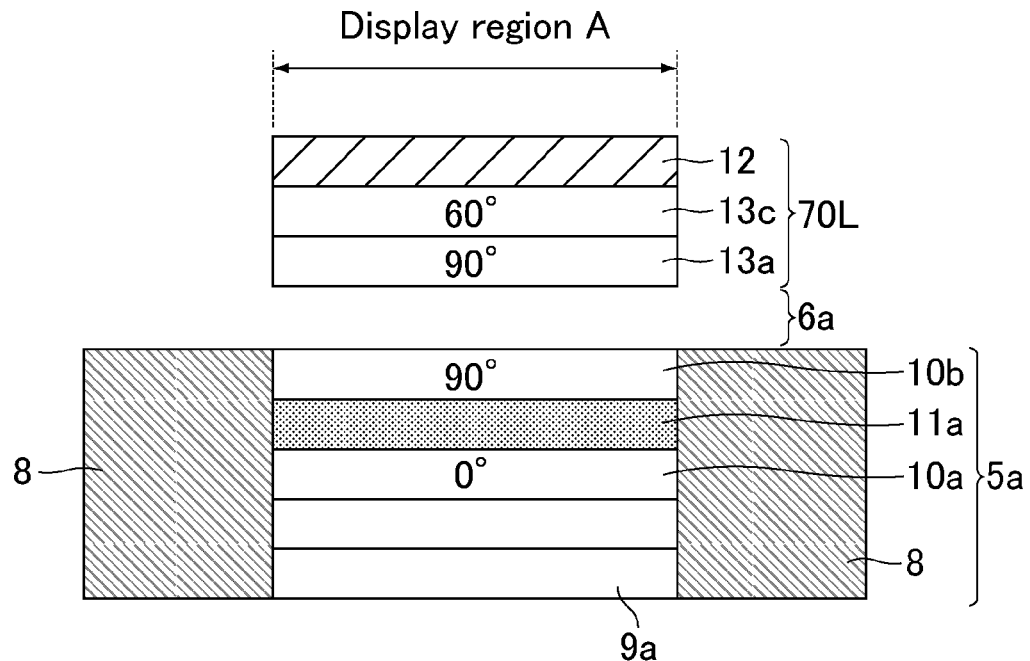
FIG. 42 is a schematic cross-sectional view showing the structure of a mirror display of Example 39.

FIG. 42 is a schematic cross-sectional view showing the structure of a mirror display of Example 39. As shown in FIG. 42, a half mirror plate 70L of Example 39 includes the first reflective polarizing plate 13a (azimuth of transmission axis: 90°), the second reflective polarizing plate 13c (azimuth of transmission axis: 60°), and the glass plate 12 in the order set forth from the back side to the viewer side. The respective components were bonded with acrylic pressure-sensitive adhesive (not shown). Although FIG. 42 illustrates the bezel 8 serving as the frame component, such a frame component may be or may not be disposed in the present example.

The driving principles in the display mode and in the mirror mode of the mirror display of the present example are the same as those in Example 13 except that the reflectance in the frame region B is not adjusted by the half mirror plate and that the reflectance is not adjusted by the anti-reflection film 14a in the display region A. The present example can achieve a high reflectance by the use of two reflective polarizing plates (the first reflective polarizing plate 13a and the second reflective polarizing plate 13c) whose transmission axes cross each other. Thus, the mirror display can achieve improved quality in the mirror mode. Specifically, the mirror display can achieve in the mirror mode the same reflectance as the reflectance in the display region A (62.1%) in Example 13 shown in Table 1.

EXAMPLE 40

Example 40 relates to a mirror display including a half mirror plate, and a first reflective polarizing plate whose transmission axis is at an angle of 90° and a second reflective polarizing plate whose transmission axis is at an azimuth angle of 60° disposed in the half mirror plate. The difference from Example 39 is that the half mirror plate includes no glass plate 12 and the half mirror plate is stacked on the liquid crystal display device 5a. In the mirror display in which the display region and the mirror region have the same size and are disposed at the same position, the half mirror plate may have no supporting component such as a glass plate and the half mirror plate may be integrated with the display device.

Figure 43:
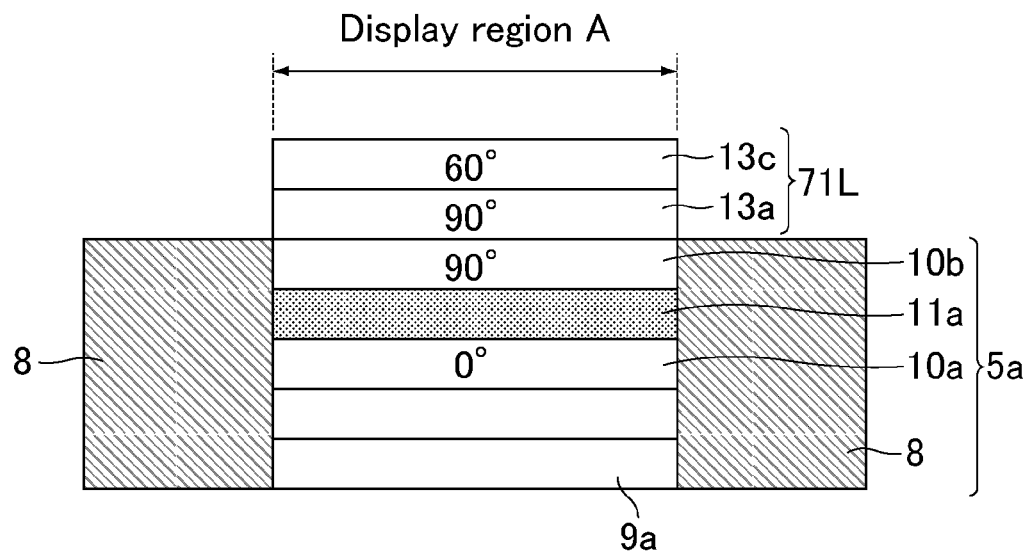
FIG. 43 is a schematic cross-sectional view showing the structure of a mirror display of Example 40.

FIG. 43 is a schematic cross-sectional view showing the structure of a mirror display of Example 40. As shown in FIG. 43, a half mirror plate 71L of Example 40 includes the first reflective polarizing plate 13a (azimuth of transmission axis: 90°) and the second reflective polarizing plate 13c (azimuth of transmission axis: 60°) in the order set forth from the back side to the viewer side. The back side of the first reflective polarizing plate 13a is in contact with the absorptive polarizing plate 10b of the liquid crystal display device. The respective components were bonded with acrylic pressure-sensitive adhesive (not shown). Although FIG. 43 illustrates the bezel 8 serving as the frame component, such a frame component may be or may not be disposed in the present example.

The driving principles in the display mode and in the mirror mode of the mirror display of the present example are substantially the same as those in Example 39. The present example can achieve a high reflectance by the use of two reflective polarizing plates (the first reflective polarizing plate 13a and the second reflective polarizing plate 13c). Thus, the mirror display can achieve improved quality in the mirror mode. Specifically, the mirror display can achieve in the mirror mode the same reflectance as the reflectance in the display region A (62.1%) in Example 13 shown in Table 1.

EXAMPLE 41

Example 41 relates to a mirror display including a half mirror plate, and a first reflective polarizing plate whose transmission axis is at an angle of 90° and a second reflective polarizing plate whose transmission axis is at an azimuth angle of 52° disposed in the half mirror plate. The difference from Example 14 is that the half mirror plate is disposed only in the display region A and not disposed in the frame region B, and neither the anti-reflection film 14*a* nor the black tape 15 is disposed.

Figure 44:
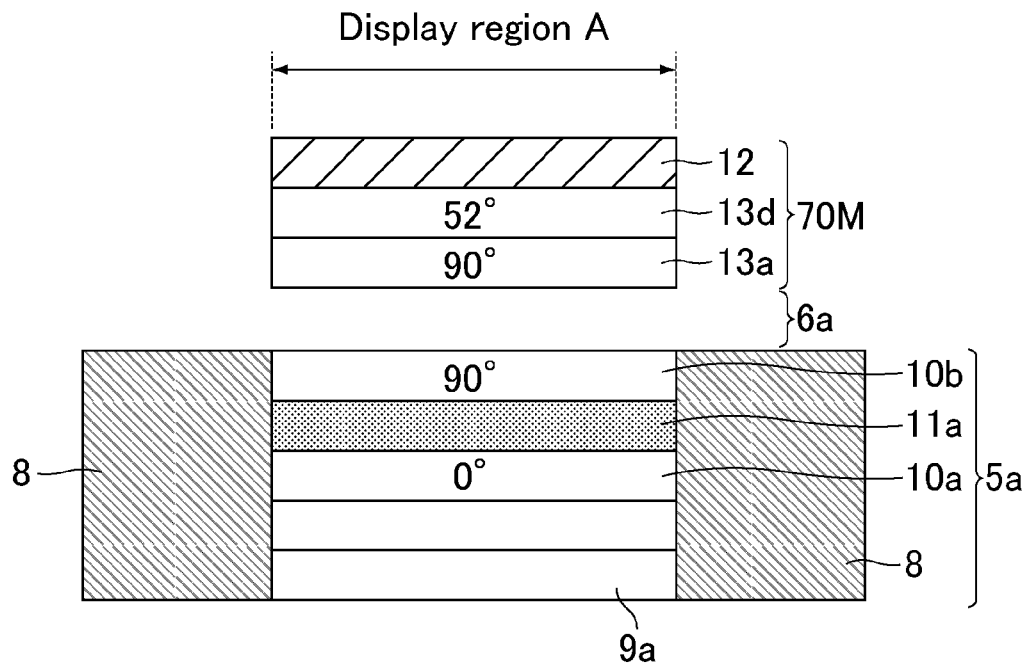
FIG. 44 is a schematic cross-sectional view showing the structure of a mirror display of Example 41.

FIG. 44 is a schematic cross-sectional view showing the structure of a mirror display of Example 41. As shown in FIG. 44, a half mirror plate 70M of Example 41 includes the first reflective polarizing plate 13*a* (azimuth of transmission axis: 90°), the second reflective polarizing plate 13*d* (azimuth of transmission axis: 52°), and the glass plate 12 in the order set forth from the back side to the viewer side. The respective components were bonded with acrylic pressure-sensitive adhesive (not shown). Although FIG. 44 illustrates the bezel 8 serving as the frame component, such a frame component may be or may not be disposed in the present example.

The driving principles in the display mode and in the mirror mode of the mirror display of the present example are the same as those in Example 14 except that the reflectance in the frame region B is not adjusted by the half mirror plate and that the reflectance is not adjusted by the anti-reflection film 14*a* in the display region A. The present example can achieve a high reflectance by the use of two reflective polarizing plates (the first reflective polarizing plate 13*a* and the second reflective polarizing plate 13*d*) whose transmission axes cross each other. Thus, the mirror display can achieve improved quality in the mirror mode. Specifically, the mirror display can achieve in the mirror mode the same reflectance as the reflectance in the display region A (65.3%) in Example 14 shown in Table 1.

EXAMPLE 42

Example 42 relates to a mirror display including a half mirror plate, and a first reflective polarizing plate whose transmission axis is at an angle of 90° and a second reflective polarizing plate whose transmission axis is at an azimuth angle of 52° disposed in the half mirror plate. The difference from Example 41 is that the half mirror plate includes no glass plate 12 and the half mirror plate is stacked on the liquid crystal display device 5*a*. In the mirror display in which the display region and the mirror region have the same size and are disposed at the same position, the half mirror plate may have no supporting component such as a glass plate and the half mirror plate may be integrated with the display device.

Figure 45:
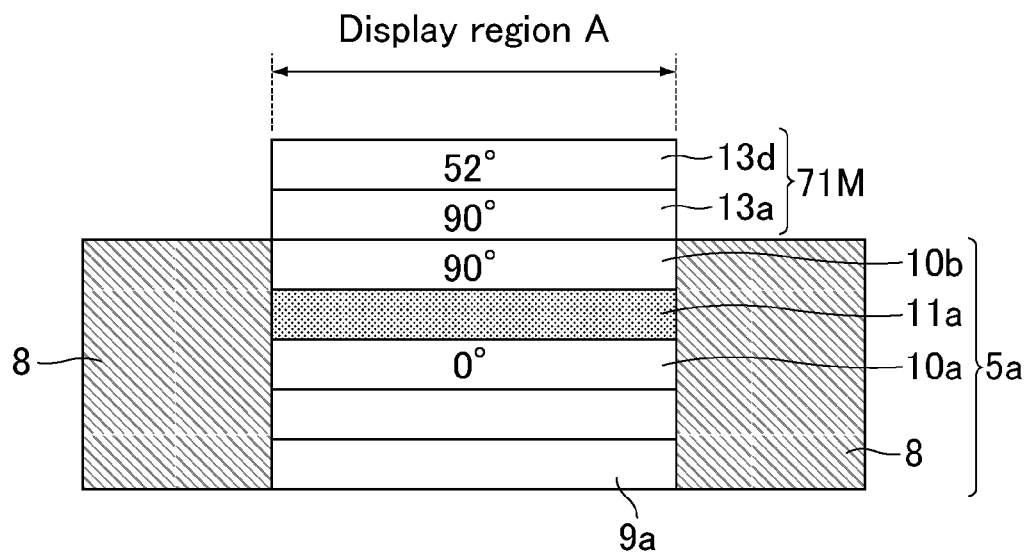
FIG. 45 is a schematic cross-sectional view showing the structure of a mirror display of Example 42.

FIG. 45 is a schematic cross-sectional view showing the structure of a mirror display of Example 42. As shown in FIG. 45, a half mirror plate 71M of Example 42 includes the first reflective polarizing plate 13*a* (azimuth of transmission axis: 90°) and the second reflective polarizing plate 13*d* (azimuth of transmission axis: 45°) in the order set forth from the back side to the viewer side. The back side of the first reflective polarizing plate 13*a* is in contact with the absorptive polarizing plate 10*b* of the liquid crystal display device 5*a*. The respective components were bonded with acrylic pressure-sensitive adhesive (not shown). Although FIG. 45 illustrates the bezel 8 serving as the frame component, such a frame component may be or may not be disposed in the present example.

The driving principles in the display mode and in the mirror mode of the mirror display of the present example are substantially the same as those in Example 41. The present example can achieve a high reflectance by the use of two reflective polarizing plates (the first reflective polarizing plate 13*a* and the second reflective polarizing plate 13*d*) whose transmission axes cross each other. Thus, the mirror display can achieve improved quality in the mirror mode. Specifically, the mirror display can achieve in the mirror mode the same reflectance as the reflectance in the display region A (65.3%) in Example 14 shown in Table 1.

EXAMPLE 43

Example 43 relates to a mirror display including a half mirror plate, and a first reflective polarizing plate whose transmission axis is at an angle of 90° and a second reflective polarizing plate whose transmission axis is at an azimuth angle of 45° disposed in the half mirror plate. The difference from Example 15 is that the half mirror plate is disposed only in the display region A and not disposed in the frame region B, and neither the anti-reflection film 14*a* nor the black tape 15 is disposed.

Figure 46:
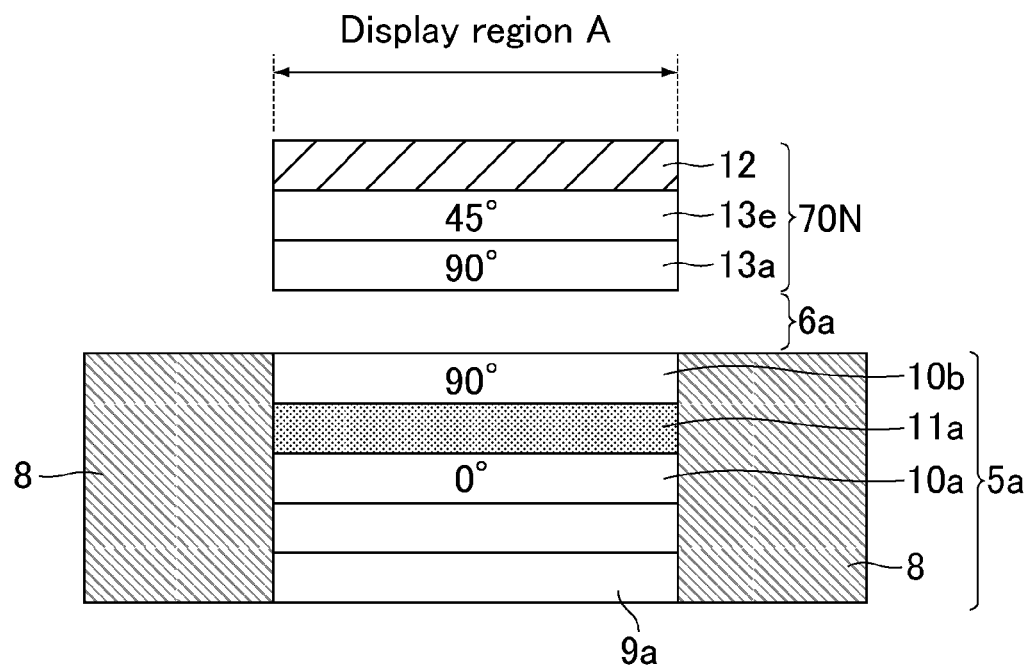
FIG. 46 is a schematic cross-sectional view showing the structure of a mirror display of Example 43.

FIG. 46 is a schematic cross-sectional view showing the structure of a mirror display of Example 43. As shown in FIG. 46, a half mirror plate 70N of Example 43 includes the first reflective polarizing plate 13*a* (azimuth of transmission axis: 90°), the second reflective polarizing plate 13*e* (azimuth of transmission axis: 45°), and the glass plate 12 in the order set forth from the back side to the viewer side. The respective components were bonded with acrylic pressure-sensitive adhesive (not shown). Although FIG. 46 illustrates the bezel 8 serving as the frame component, such a frame component may be or may not be disposed in the present example.

The driving principles in the display mode and in the mirror mode of the mirror display of the present example are the same as those in Example 15 except that the reflectance in the frame region B is not adjusted by the half mirror plate and that the reflectance is not adjusted by the anti-reflection film 14*a* in the display region A. The present example can achieve a high reflectance by the use of two reflective polarizing plates (the first reflective polarizing plate 13*a* and the second reflective polarizing plate 13*e*) whose transmission axes cross each other. Thus, the mirror display can achieve improved quality in the mirror mode. Specifically, the mirror display can achieve in the mirror mode the same reflectance as the reflectance in the display region A (70.0%) in Example 15 shown in Table 1.

EXAMPLE 44

Example 44 relates to a mirror display including a half mirror plate, and a first reflective polarizing plate whose transmission axis is at an angle of 90° and a second reflective polarizing plate whose transmission axis is at an azimuth angle of 45° disposed in the half mirror plate. The difference from Example 43 is that the half mirror plate includes no glass plate 12 and the half mirror plate is stacked on the liquid crystal display device 5*a*. In the mirror display in which the display region and the mirror region have the same size and are disposed at the same position, the half mirror plate may have no supporting component such as a glass plate and the half mirror plate may be integrated with the display device.

Figure 47:
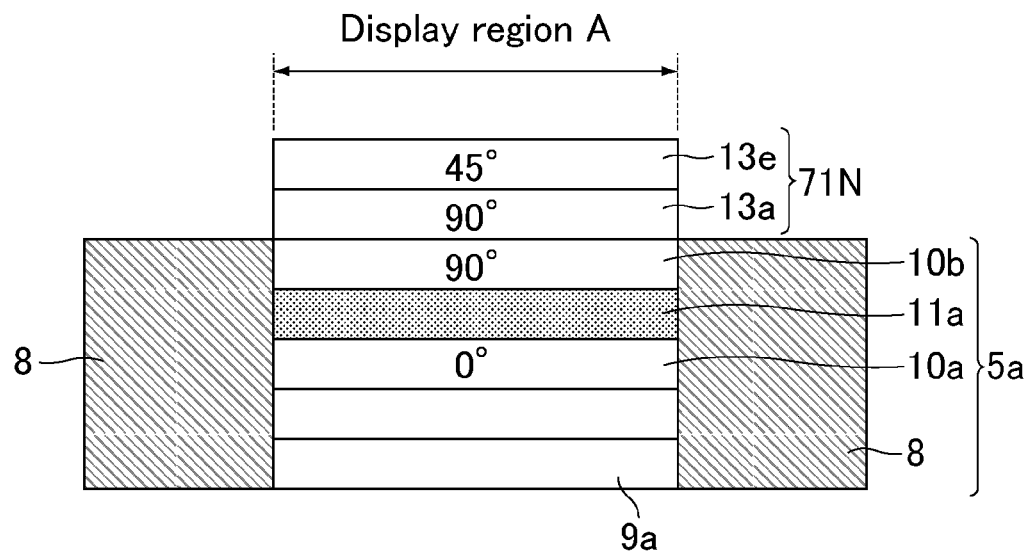
FIG. 47 is a schematic cross-sectional view showing the structure of a mirror display of Example 44.

FIG. 47 is a schematic cross-sectional view showing the structure of a mirror display of Example 44. As shown in FIG. 47, a half mirror plate 71N of Example 44 includes the first reflective polarizing plate 13*a* (azimuth of transmission axis: 90°) and the second reflective polarizing plate 13*e* (azimuth of transmission axis: 45°) in the order set forth from the back side to the viewer side. The back side of the first reflective polarizing plate 13a is in contact with the absorptive polarizing plate 10b of the liquid crystal display device 5a. The respective components were bonded with acrylic pressure-sensitive adhesive (not shown). Although FIG. 47 illustrates the bezel 8 serving as the frame component, such a frame component may be or may not be disposed in the present example.

The driving principles in the display mode and in the mirror mode of the mirror display of the present example are substantially the same as those in Example 43. The present example can achieve a high reflectance by the use of two reflective polarizing plates (the first reflective polarizing plate 13a and the second reflective polarizing plate 13e) whose transmission axes cross each other. Thus, the mirror display can achieve improved quality in the mirror mode. Specifically, the mirror display can achieve in the mirror mode the same reflectance as the reflectance in the display region A (70.0%) in Example 15 shown in Table 1.

Summary of Examples 37 to 44

As specifically shown in Examples 37 to 44, the following mirror display (A) can achieve a high performance mirror mode showing a high reflectance. Specifically, the mirror display (A) includes a half mirror plate and a display device disposed behind the half mirror plate. The half mirror plate includes first and second reflective polarizing plate whose transmission axes cross each other.

The transmission axes of the first and second reflective polarizing plates preferably form an angle of 12° or greater and 45° or smaller. As the angle formed by the transmission axis of the second reflective polarizing plate with the transmission axis of the first reflective polarizing plate increases, the reflectance tends to increase and the transmittance tends to decrease. When the angle formed by the transmission axis of the second reflective polarizing plate with the transmission axis of the first reflective polarizing plate is increased to reach 45°, the reflectance in the mirror mode is sufficiently high and the mirror display achieves good reflection performance which is equal to a usual mirror which is not a mirror display in terms of the feeling of a viewer.

The half mirror plate may separately be disposed apart from the display device or may be disposed in contact with the display device. In the case of separately disposing the half mirror plate apart from the display device, the half mirror plate may further include a supporting component.

The display device may be a liquid crystal panel including a first polarizing plate, a liquid crystal layer, and a second polarizing plate in the order set forth from the side of the half mirror plate to the other side. In this case, one of the above first and second reflective polarizing plates preferably has a transmission axis which is substantially parallel with the transmission axis of the first polarizing plate. The display device can be of any type, and it may be an organic electroluminescence display device (GELD) or may be a plasma display, for example. Alternatively, the display device may be a 3D display which can give stereoscopic (3D) images.

EXAMPLE 45

Example 45 relates to a mirror display including a half mirror plate, and an absorptive polarizing plate, a switching liquid crystal panel, and a reflective polarizing plate each disposed in the half mirror plate. The difference from Example 17 is that the half mirror plate is disposed only in the display region A and not disposed in the frame region B, and neither the anti-reflection film 14a nor the black tape 15 is disposed.

Figure 48:
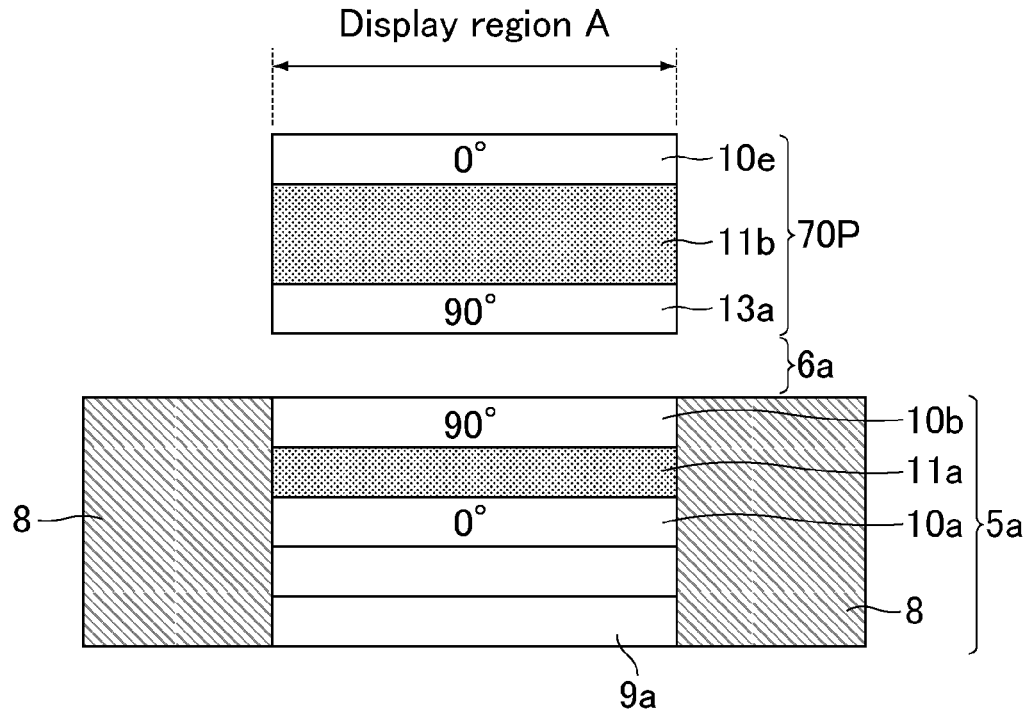
FIG. 48 is a schematic cross-sectional view showing the structure of a mirror display of Example 45.

FIG. 48 is a schematic cross-sectional view showing the structure of a mirror display of Example 45. As shown in FIG. 48, a half mirror plate 70P of Example 45 includes the reflective polarizing plate 13a whose transmission axis is at an azimuth angle of 90°, the switching liquid crystal panel 11b, and the absorptive polarizing plate 10e whose transmission axis is at an azimuth angle of 0° in the order set forth from the back side to the viewer side. The switching liquid crystal panel 11b is in the voltage-applied state in the display mode and in the no-voltage-applied state in the mirror mode. The respective components were bonded with acrylic pressure-sensitive adhesive (not shown). Although FIG. 48 illustrates the bezel 8 serving as the frame component, such a frame component may be or may not be disposed in the present example.

The driving principles in the display mode and in the mirror mode of the mirror display of the present example are the same as those in Example 17 except that the reflectance in the frame region B is not adjusted by the half mirror plate and that the reflectance is not adjusted by the anti-reflection film 14a in the display region A. The present example can achieve good performance in both the display mode and the mirror mode by the combination use of the reflective polarizing plate 13a, the switching liquid crystal panel 11b, and the absorptive polarizing plate 10e. In particular, the light incident on the mirror display from the viewer side is prevented from being reflected on the half mirror plate 70P and being converted into unnecessary reflected light. Thus, the present example can advantageously achieve a high contrast ratio in the display mode.

EXAMPLE 46

Example 46 relates to a mirror display including a half mirror plate, and an absorptive polarizing plate, a switching liquid crystal panel, and a reflective polarizing plate each disposed in the half mirror plate. The difference from Example 45 is that the reflective polarizing plate 13a is not disposed in the half mirror plate but stacked on the liquid crystal display device 5a.

Figure 49:
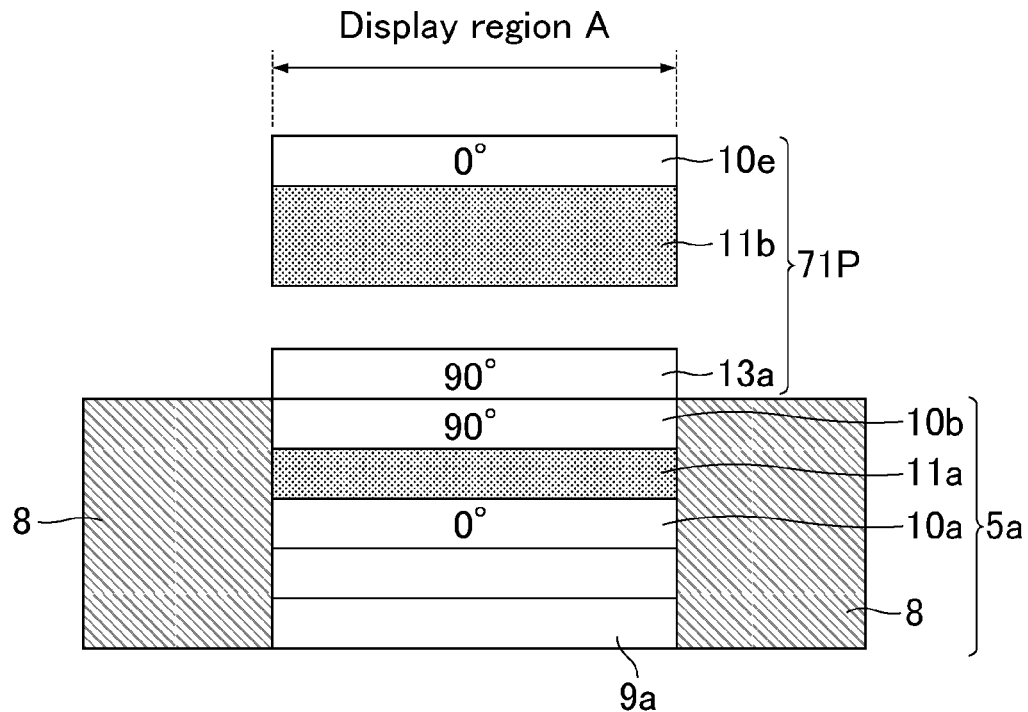
FIG. 49 is a schematic cross-sectional view showing the structure of a mirror display of Example 46.

FIG. 49 is a schematic cross-sectional view showing the structure of a mirror display of Example 46. As shown in FIG. 49, a half mirror plate 71P of Example 46 includes the switching liquid crystal panel 11b and the absorptive polarizing plate 10e whose transmission axis is at an azimuth angle of 0° in the order set forth from the back side to the viewer side. The reflective polarizing plate 13a is stacked on the absorptive polarizing plate 10b of the liquid crystal display device. The respective components were bonded with acrylic pressure-sensitive adhesive (not shown). Although FIG. 49 illustrates the bezel 8 serving as the frame component, such a frame component may be or may not be disposed in the present example.

The driving principles in the display mode and in the mirror mode of the mirror display of the present example are substantially the same as those in Example 45. The present example can achieve good performance in both the display mode and the mirror mode by the combination use of the reflective polarizing plate 13a, the switching liquid crystal panel 11b, and the absorptive polarizing plate 10e. In particular, the light incident on the mirror display from the viewer side is prevented from being reflected on the half mirror plate 71P and being converted into unnecessary reflected light. Thus, the present example can advantageously achieve a high contrast ratio in the display mode.

EXAMPLE 47

Example 47 relates to a mirror display including a half mirror plate, and an absorptive polarizing plate, a switching liquid crystal panel, and a reflective polarizing plate each disposed in the half mirror plate. The difference from Example 18 is that the half mirror plate is disposed only in the display region A and not disposed in the frame region B, and neither the anti-reflection film 14*a* nor the black tape 15 is disposed.

Figure 50:
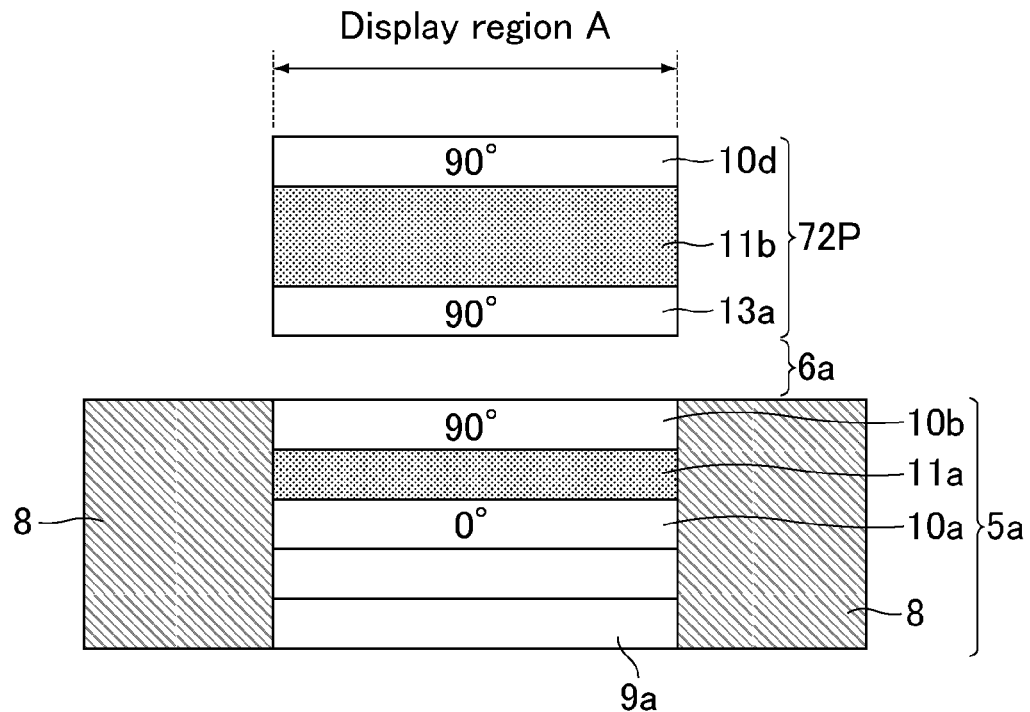
FIG. 50 is a schematic cross-sectional view showing the structure of a mirror display of Example 47.

FIG. 50 is a schematic cross-sectional view showing the structure of a mirror display of Example 47. As shown in FIG. 50, the half mirror plate 72P of Example 47 includes the reflective polarizing plate 13*a* whose transmission axis is at an azimuth angle of 90°, the switching liquid crystal panel 11*b*, and the absorptive polarizing plate 10*d* whose transmission axis is at an azimuth angle of 90° in the order set forth from the back side to the viewer side. The switching liquid crystal panel 11*b* is in the no-voltage-applied state in the display mode and in the voltage-applied state in the mirror mode. The respective components were bonded with acrylic pressure-sensitive adhesive (not shown). Although FIG. 50 illustrates the bezel 8 serving as the frame component, such a frame component may be or may not be disposed in the present example.

The driving principles in the display mode and in the mirror mode of the mirror display of the present example are the same as those in Example 18 except that the reflectance in the frame region B is not adjusted by the half mirror plate and that the reflectance is not adjusted by the anti-reflection film 14*a* in the display region A. The present example can achieve good performance in both the display mode and the mirror mode by the combination use of the reflective polarizing plate 13*a*, the switching liquid crystal panel 11*b*, and the absorptive polarizing plate 10*d*. In particular, the light incident on the mirror display from the viewer side is prevented from being reflected on the half mirror plate 72P and being converted into unnecessary reflected light. Thus, the present example can advantageously achieve a high contrast ratio in the display mode.

EXAMPLE 48

Example 48 relates to a mirror display including a half mirror plate, and an absorptive polarizing plate, a switching liquid crystal panel, and a reflective polarizing plate each disposed in the half mirror plate. The difference from Example 46 is that the reflective polarizing plate 13*a* is not disposed in the half mirror plate but stacked on the liquid crystal display device 5*a*.

Figure 51:
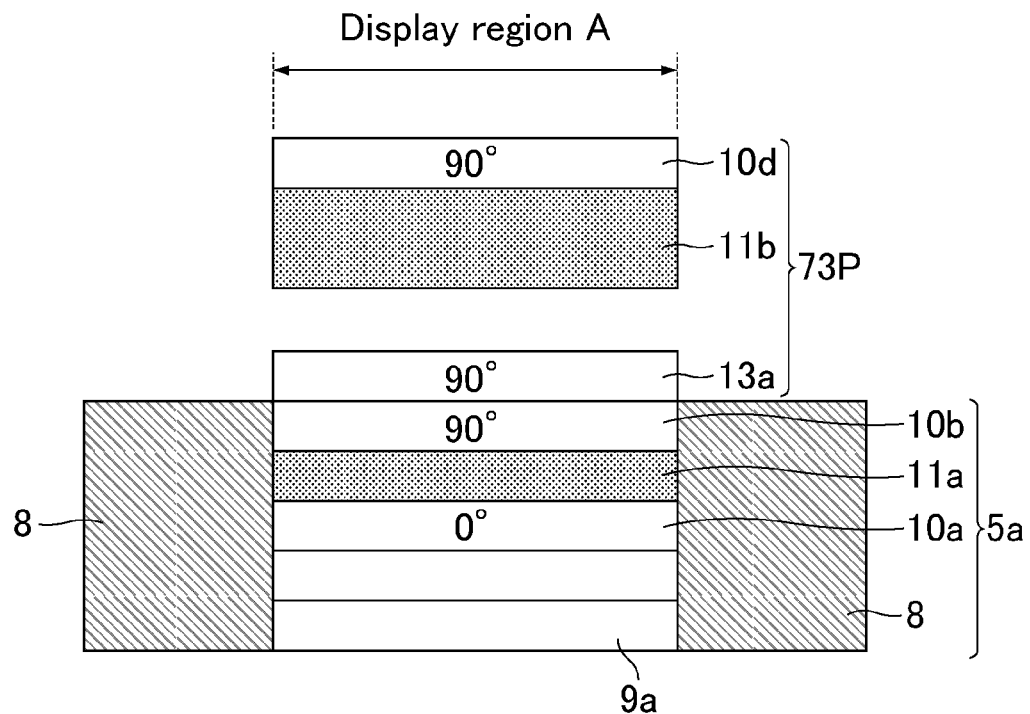
FIG. 51 is a schematic cross-sectional view showing the structure of a mirror display of Example 48.

FIG. 51 is a schematic cross-sectional view showing the structure of a mirror display of Example 48. As shown in FIG. 51, a half mirror plate 73P of Example 48 includes the switching liquid crystal panel 11*b* and the absorptive polarizing plate 10*d* whose transmission axis is at an azimuth angle of 90° in the order set forth from the back side to the viewer side. The reflective polarizing plate 13*a* is stacked on the absorptive polarizing plate 10*b* of the liquid crystal display device. The respective components were bonded with acrylic pressure-sensitive adhesive (not shown). Although FIG. 51 illustrates the bezel 8 serving as the frame component, such a frame component may be or may not be disposed in the present example.

The driving principles in the display mode and in the mirror mode of the mirror display 4*l* of the present example are substantially the same as those in Example 47. The present example can achieve good performance in both the display mode and the mirror mode by the combination use of the reflective polarizing plate 13*a*, the switching liquid crystal panel 11*b*, and the absorptive polarizing plate 10*e*. In particular, the light incident on the mirror display from the viewer side is prevented from being reflected on the half mirror plate 73P and being converted into unnecessary reflected light. Thus, the present example can advantageously achieve a high contrast ratio in the display mode.

Summary of Examples 45 to 48

As specifically shown in Examples 45 to 48, the following mirror display (B) can achieve good performance in both the display mode and the mirror mode. In particular, the mirror display can show images with sufficiently reduced reflection. Specifically, the mirror display (B) includes a half mirror plate and a display device disposed behind the half mirror plate. The half mirror plate includes a reflective polarizing plate, a switching liquid crystal panel, and an absorptive polarizing plate.

Preferably, the transmission axis of the absorptive polarizing plate and the transmission axis of the reflective polarizing plate are substantially parallel or perpendicular with each other.

The half mirror plate may separately be disposed apart from the display device or may be disposed in contact with the display device. In the case of separately disposing the half mirror plate apart from the display device, the half mirror plate may further include a supporting component.

The display device may be a liquid crystal panel including a first polarizing plate, a liquid crystal layer, and a second polarizing plate in the order set forth from the side of the half mirror plate to the other side. In this case, one of the absorptive and reflective polarizing plates preferably has a transmission axis which is substantially parallel with the transmission axis of the first polarizing plate. The display device can be of any type, and it may be an organic electroluminescence display device (GELD) or may be a plasma display, for example. Alternatively, the display device may be a 3D display which can give stereoscopic (3D) images.

EXAMPLE 49

Example 49 relates to a mirror display including a half mirror plate, and two reflective polarizing plates and a switching liquid crystal panel each disposed in the half mirror plate. The difference from Example 19 is that the half mirror plate is disposed only in the display region A and not disposed in the frame region B, and neither the anti-reflection film 14*a* nor the black tape 15 is disposed.

Figure 52:
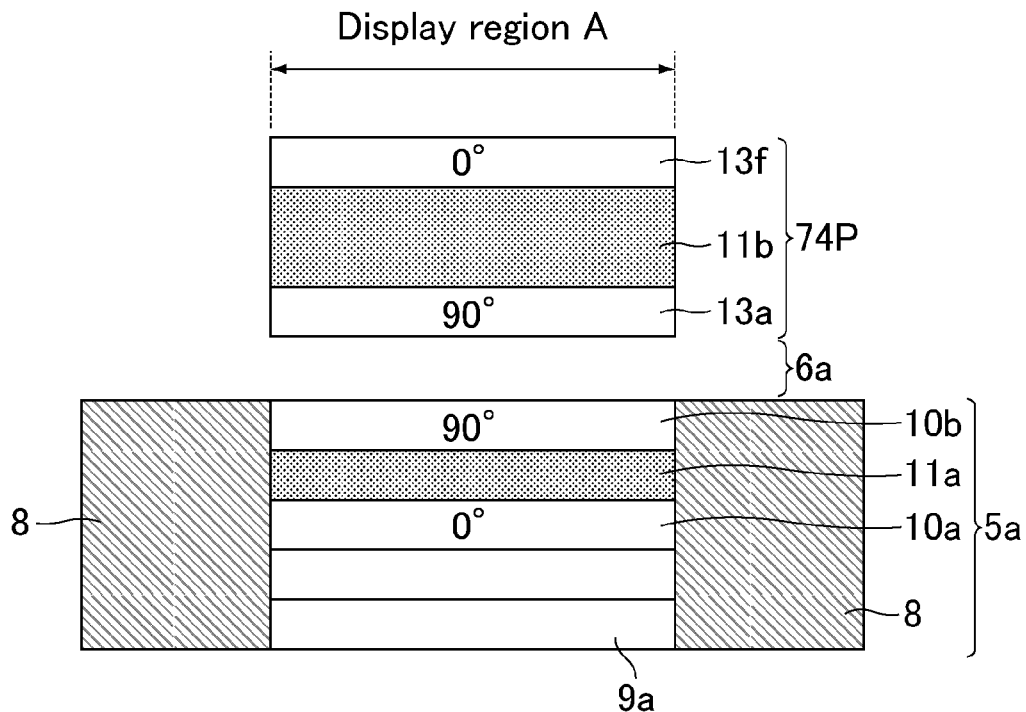
FIG. 52 is a schematic cross-sectional view showing the structure of a mirror display of Example 49.

FIG. 52 is a schematic cross-sectional view showing the structure of a mirror display of Example 49. As shown in FIG. 52, a half mirror plate 74P of Example 49 includes the reflective polarizing plate 13*a* whose transmission axis is at an azimuth angle of 90°, the switching liquid crystal panel 11*b*, and the reflective polarizing plate 13*f* whose transmission axis is at an azimuth angle of 0° in the order set forth from the back side to the viewer side. The switching liquid crystal panel 11*b* is in the voltage-applied state in the display mode and in the no-voltage-applied state in the mirror mode. The respective components were bonded with acrylic pressure-sensitive adhesive (not shown). Although FIG. 52 illustrates the bezel 8 serving as the frame component, such a frame component may be or may not be disposed in the present example.

The driving principles in the display mode and in the mirror mode of the mirror display of the present example are the same as those in Example 19 except that the reflectance in the frame region B is not adjusted by the half mirror plate and that the reflectance is not adjusted by the anti-reflection film 14a in the display region A. The present example can achieve good performance in both the display mode and the mirror mode by the combination use of the reflective polarizing plate 13a, the switching liquid crystal panel 11b, and the reflective polarizing plate 13f. In particular, the mirror display can advantageously reflect most of the light incident on the mirror display 74P from the viewer side and serve as a substantially perfect mirror in the mirror mode.

EXAMPLE 50

Example 50 relates to a mirror display including a half mirror plate, and two reflective polarizing plates and a switching liquid crystal panel each disposed in the half mirror plate. The difference from Example 49 is that the reflective polarizing plate 13a is not disposed in the half mirror plate but stacked on the liquid crystal display device 5a.

Figure 53:
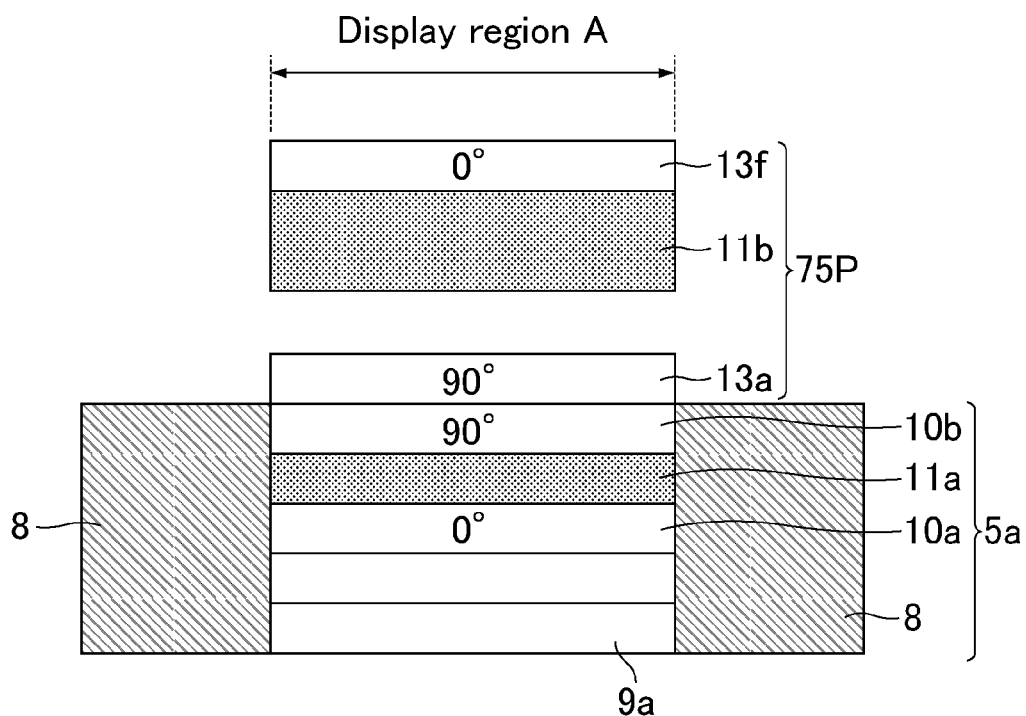
FIG. 53 is a schematic cross-sectional view showing the structure of a mirror display of Example 50.

FIG. 53 is a schematic cross-sectional view showing the structure of a mirror display of Example 50. As shown in FIG. 53, a half mirror plate 75P of Example 50 includes the switching liquid crystal panel 11b and the reflective polarizing plate 13f whose transmission axis is at an azimuth angle of 0° in the order set forth from the back side to the viewer side. The reflective polarizing plate 13a is stacked on the absorptive polarizing plate 10b of the liquid crystal display device. The respective components were bonded with acrylic pressure-sensitive adhesive (not shown). Although FIG. 53 illustrates the bezel 8 serving as the frame component, such a frame component may be or may not be disposed in the present example.

The driving principles in the display mode and in the mirror mode of the mirror display of the present example are substantially the same as those in Example 49. The present example can achieve good performance in both the display mode and the mirror mode by the combination use of the reflective polarizing plate 13a, the switching liquid crystal panel 11b, and the reflective polarizing plate 13f. In particular, the mirror display can advantageously reflect most of the light incident on the mirror display 75P from the viewer side and serve as a substantially perfect mirror in the mirror mode.

EXAMPLE 51

Example 51 relates to a mirror display including a half mirror plate, and two reflective polarizing plates and a switching liquid crystal panel each disposed in the half mirror plate. The difference from Example 20 is that the half mirror plate is disposed only in the display region A and not disposed in the frame region B, and neither the anti-reflection film 14a nor the black tape 15 is disposed.

Figure 54:
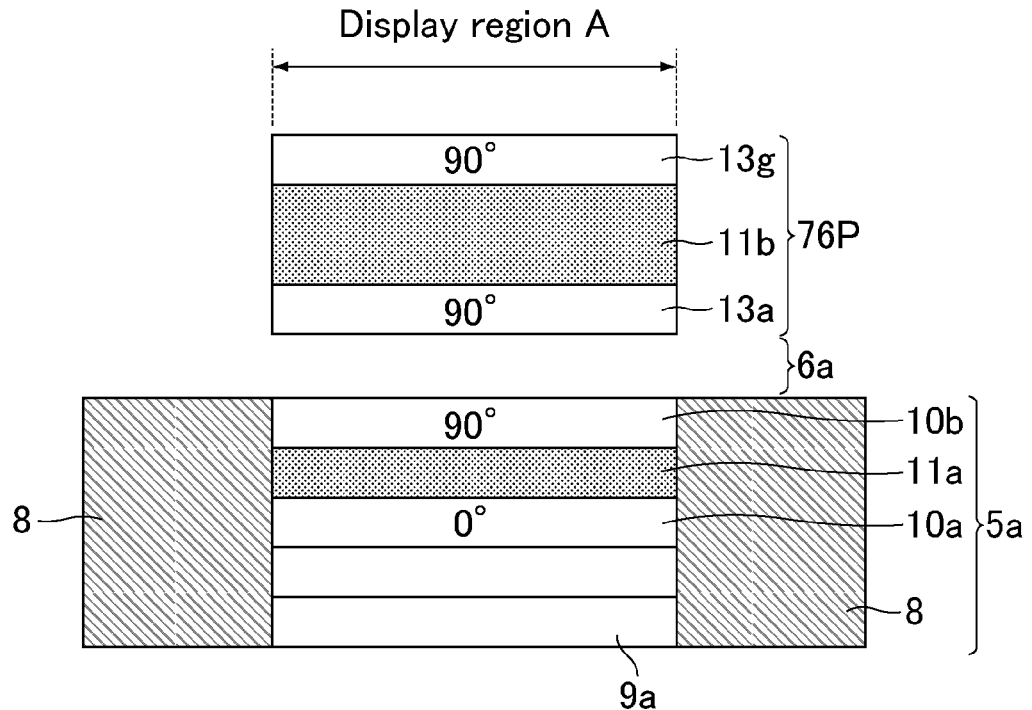
FIG. 54 is a schematic cross-sectional view showing the structure of a mirror display of Example 51.

FIG. 54 is a schematic cross-sectional view showing the structure of a mirror display of Example 51. As shown in FIG. 54, a half mirror plate 76P of Example 51 includes the reflective polarizing plate 13a whose transmission axis is at an azimuth angle of 90°, the switching liquid crystal panel 11b, and the reflective polarizing plate 13g whose transmission axis is at an azimuth angle of 90° in the order set forth from the back side to the viewer side. The switching liquid crystal panel 11b is in the no-voltage-applied state in the display mode and in the voltage-applied state in the mirror mode. The respective components were bonded with acrylic pressure-sensitive adhesive (not shown). Although FIG. 54 illustrates the bezel 8 serving as the frame component, such a frame component may be or may not be disposed in the present example.

The driving principles in the display mode and in the mirror mode of the mirror display of the present example are the same as those in Example 20 except that the reflectance in the frame region B is not adjusted by the half mirror plate and that the reflectance is not adjusted by the anti-reflection film 14a in the display region A. The present example can achieve good performance in both the display mode and the mirror mode by the combination use of the reflective polarizing plate 13a, the switching liquid crystal panel 11b, and the reflective polarizing plate 13g. In particular, the mirror display can advantageously reflect most of the light incident on the mirror display from the viewer side and serve as a substantially perfect mirror in the mirror mode.

EXAMPLE 52

Example 52 relates to a mirror display including a half mirror plate, and two reflective polarizing plates and a switching liquid crystal panel each disposed in the half mirror plate. The difference from Example 51 is that the reflective polarizing plate 13a is not disposed in the half mirror plate but stacked on the liquid crystal display device 5a.

Figure 55:
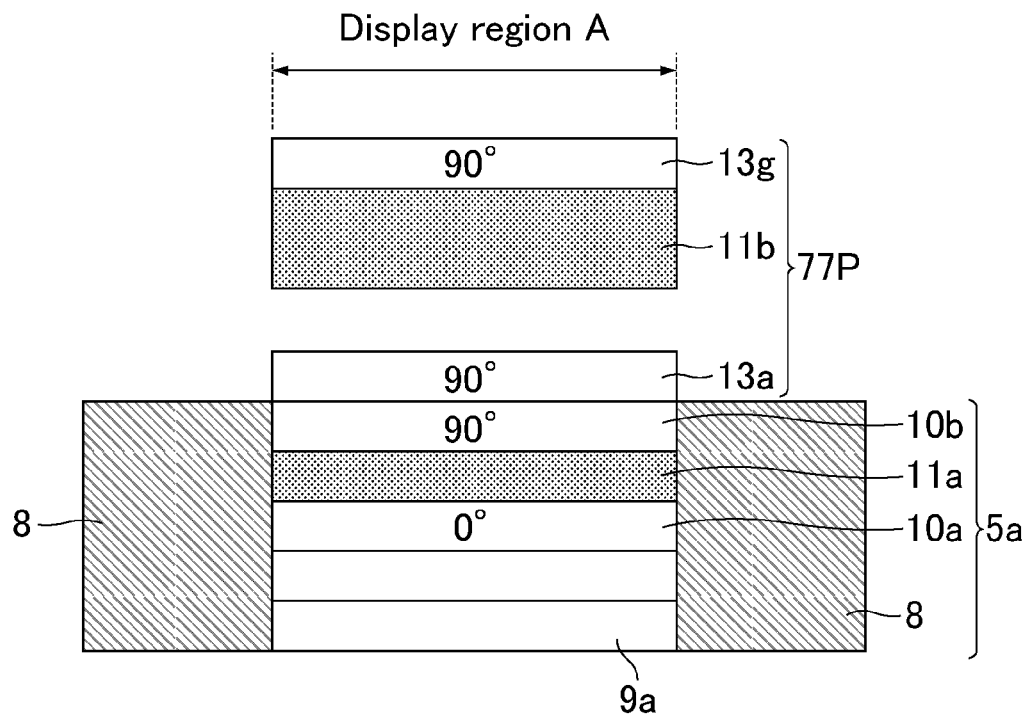
FIG. 55 is a schematic cross-sectional view showing the structure of a mirror display of Example 52.

FIG. 55 is a schematic cross-sectional view showing the structure of a mirror display of Example 52. As shown in FIG. 55, a half mirror plate 77P of Example 52 includes the switching liquid crystal panel 11b and the reflective polarizing plate 13g whose transmission axis is at an azimuth angle of 90° in the order set forth from the back side to the viewer side. The reflective polarizing plate 13a is stacked on the absorptive polarizing plate 10b of the liquid crystal display device. The respective components were bonded with acrylic pressure-sensitive adhesive (not shown). Although FIG. 55 illustrates the bezel 8 serving as the frame component, such a frame component may be or may not be disposed in the present example.

The driving principles in the display mode and in the mirror mode of the mirror display of the present example are substantially the same as those in Example 51. The present example can achieve good performance in both the display mode and the mirror mode by the combination use of the reflective polarizing plate 13a, the switching liquid crystal panel 11b, and the reflective polarizing plate 13g. In particular, the mirror display can advantageously reflect most of the light incident on the mirror display 77P from the viewer side and serve as a substantially perfect mirror in the mirror mode.

Summary of Examples 49 to 52

As specifically shown in Examples 49 to 52, the following mirror display (C) can achieve good performance in both the display mode and the mirror mode. In particular, the mirror display can achieve high reflection performance in the mirror mode. Specifically, the mirror display (C) includes a half mirror plate and a display device disposed behind the half mirror plate. The half mirror plate includes a switching liquid crystal panel and first and second reflective polarizing plates.

Preferably, the transmission axis of the first reflective polarizing plate and the transmission axis of the second reflective polarizing plate are substantially parallel or perpendicular with each other.

The half mirror plate may separately be disposed apart from the display device or may be disposed in contact with the display device. In the case of separately disposing the half mirror plate apart from the display device, the half mirror plate may further include a supporting component.

The display device may be a liquid crystal panel including a first polarizing plate, a liquid crystal layer, and a second polarizing plate in the order set forth from the side of the half mirror plate to the other side. In this case, one of the first and second reflective polarizing plates preferably has a transmission axis which is substantially parallel with the transmission axis of the first polarizing plate. The display device can be of any type, and it may be an organic electroluminescence display device (GELD) or may be a plasma display, for example. Alternatively, the display device may be a 3D display which can give stereoscopic (3D) images.

EXAMPLE 53

Example 53 relates to an electronic device including a mirror display which includes a local-dimming backlight as a backlight of a liquid crystal display device and a display light control device. The difference from Example 28 is that the mirror display 4a' of Example 1 is replaced by a mirror display 40A. The mirror display 40A is different from the mirror display 4a' in that the half mirror plate is disposed only in the display region A and not disposed in the frame region B, and neither the anti-reflection film 14a nor the black tape 15 is disposed.

Figure 56:
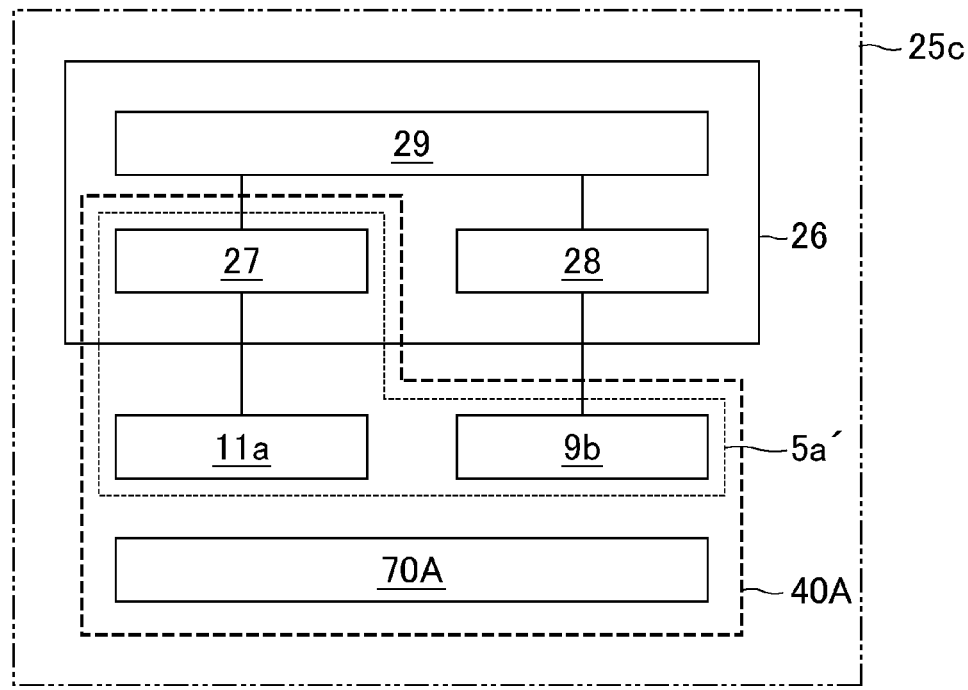
FIG. 56 is a block diagram for explaining the main structure of an electronic device of Example 53.

FIG. 56 is a block diagram for explaining the main structure of an electronic device of Example 53. As shown in FIG. 56, the mirror display 40A includes the liquid crystal display device 5a' and a half mirror plate 70A. The liquid crystal display device 5a' includes the liquid crystal panel 11a and the local-dimming backlight 9b therein. The display light control device 26 includes the panel control unit 27, the backlight control unit 28, and the signal control unit 29.

Figure 57:
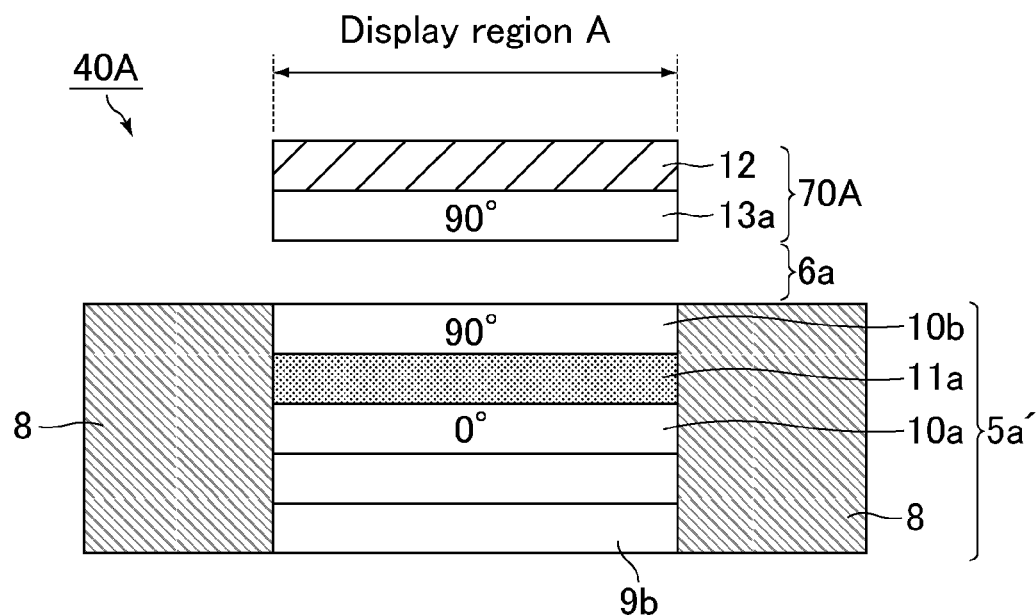
FIG. 57 is a schematic cross-sectional view showing the structure of a mirror display of Example 53.

FIG. 57 is a schematic cross-sectional view showing the structure of a mirror display of Example 53. As shown in FIG. 57, the half mirror plate 70A of Example 53 includes the reflective polarizing plate 13a whose transmission axis is at an azimuth angle of 90° and the glass plate 12 in the order set forth from the back side to the viewer side. The respective components were bonded with acrylic pressure-sensitive adhesive (not shown). Although FIG. 57 illustrates the bezel 8 serving as the frame component, such a frame component may be or may not be disposed in the present example.

The driving principles in the display mode and in the mirror mode of the mirror display 40A of the present example are the same as those in Example 1 except that the reflectance in the frame region B is not adjusted by the half mirror plate and that the reflectance is not adjusted by the anti-reflection film 14a in the display region A.

The present example uses the local-dimming backlight 9b. Specifically, LED light sources were arranged in blocks of 16 rows×9 columns, and the luminances of the backlight can be controlled per block in response to the control signals from the LED controller. Since the local-dimming backlight 9b can control the luminances of the backlight per block (in other words, locally), it can provide not only a function of switching the mirror mode and the display mode on the whole screen in terms of time but also a function of driving one domain in the mirror mode and another domain in the display mode at the same time on the same plane. For example, the center of the display region may be a mirror region. In the domain driven in the mirror mode, the backlight is locally turned off or the luminance thereof is reduced.

The electronic device 25c of the present example may further include an input device such as a touch panel. In this case, for example, the device may have a function of changing the sizes of the display region and the mirror region in response to pinch-in and pinch-out gestures on the touch panel. When a user performs a pinch-in gesture on a display (touch panel), the size of the display region is reduced and the size of the peripheral region, i.e., the mirror region, is expanded in response to the gesture. In contrast, when a user performs a pinch-out gesture on a display (touch panel), the size of the display region is expanded and the size of the peripheral region, i.e., the mirror region, is reduced in response to the gesture. Such operating feeling can improve the convenience of electronic devices and the commercial value thereof.

EXAMPLE 54

Example 54 relates to an electronic device including a mirror display which includes a local-dimming backlight as a backlight of a liquid crystal display device and a display light control device. The difference from Example 53 is that the mirror display 40A is replaced by a mirror display 41A. In the mirror display 41A, the reflective polarizing plate 13a alone stacked on the liquid crystal display device 5a is used as the half mirror plate.

Figure 58:
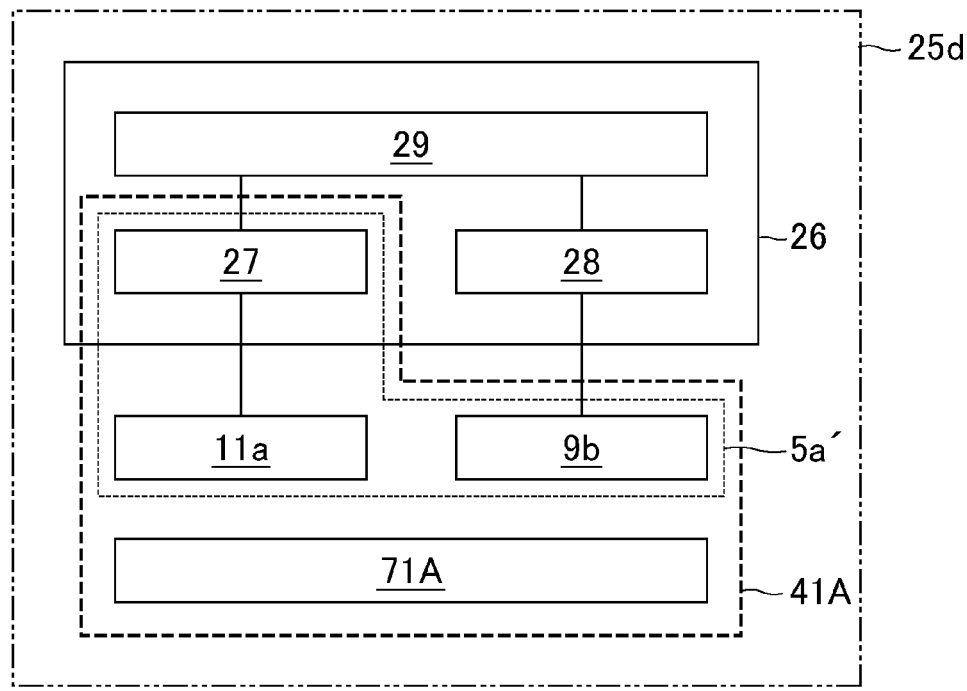
FIG. 58 is a block diagram for explaining the main structure of an electronic device of Example 54.

FIG. 58 is a block diagram for explaining the main structure of the electronic device of Example 54. As shown in FIG. 58, the mirror display 41A includes the liquid crystal display device 5a' and a half mirror plate 71A. The liquid crystal display device 5a' includes the liquid crystal panel 11a and the local-dimming backlight 9b therein. The display light control device 26 includes the panel control unit 27, the backlight control unit 28, and the signal control unit 29.

Figure 59:
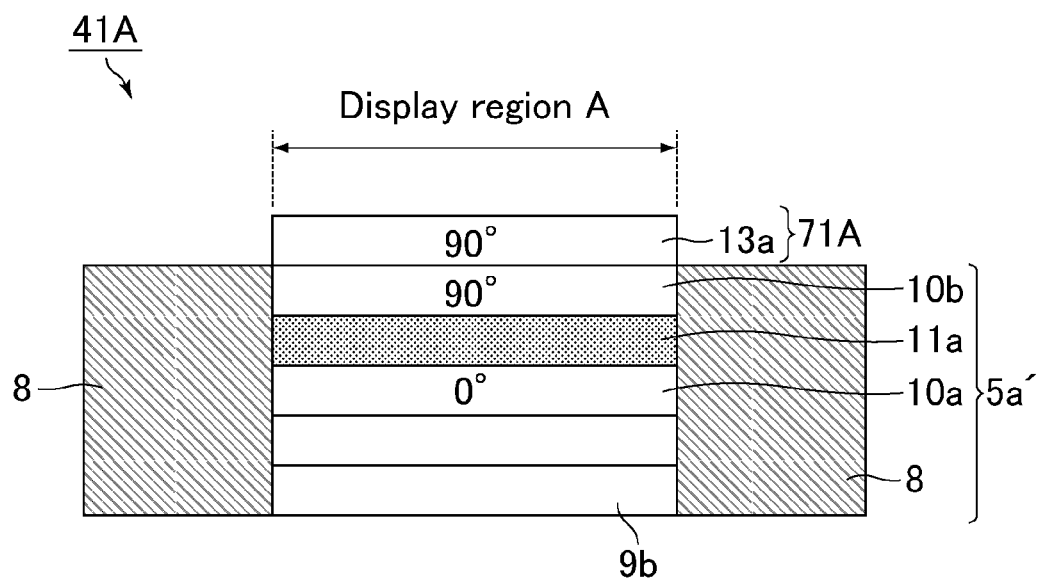
FIG. 59 is a schematic cross-sectional view showing the structure of a mirror display of Example 54.

FIG. 59 is a schematic cross-sectional view showing the structure of a mirror display of Example 54. As shown in FIG. 59, the half mirror plate 71A of Example 54 includes no glass plate 12, and has a structure in which the reflective polarizing plate 13a whose transmission axis is at an azimuth angle of 90° is stacked on the liquid crystal display device 5a'. In the mirror display in which the display region and the mirror region have the same size and are disposed at the same position, the half mirror plate may have no supporting component such as a glass plate and the half mirror plate may be integrated with the display device. The back side of the reflective polarizing plate 13a is in contact with and attached to the absorptive polarizing plate 10b of the liquid crystal display device with acrylic pressure-sensitive adhesive (not shown). Although FIG. 59 illustrates the bezel 8 serving as the frame component, such a frame component may be or may not be disposed in the present example.

The driving principles in the display mode and in the mirror mode of the mirror display 41A of the present example are substantially the same as those in Example 1 except that the reflectance in the frame region B is not adjusted by the half mirror plate and that the reflectance is not adjusted by the anti-reflection film 14a in the display region A.

The present example also uses the same local-dimming backlight 9b as in Example 53. Thus, it can provide not only a function of switching the mirror mode and the display mode on the whole screen in terms of time but also a function of driving one domain in the mirror mode and another domain in the display mode at the same time on the same plane.

An electronic device 25d of the present example may further include an input device such as a touch panel. In this case, for example, the device may have a function of changing the sizes of the display region and the mirror region in response to pinch-in and pinch-out gestures on the touch panel.

Summary of Examples 53 and 54

As specifically shown in Examples 53 and 54, the following electronic device (A) can prevent the deterioration in mirror performance of the mirror region due to light leakage from the display device and can suitably be used in, for example, providing a function of driving one domain in the mirror mode and another domain in the display mode at the same time on the same plane. Specifically, the electronic device (A) includes a half mirror plate, a display device disposed behind the half mirror plate, and a control device that controls the display region by dividing the display region into multiple domains. The control device can change the range and position of displaying an image by selecting a domain to display an image among the multiple domains.

The half mirror plate may be of any type, and it may be a reflective polarizing plate, for example.

The half mirror plate may separately be disposed apart from the display device, or may be disposed in contact with the display device. In the case of separately disposing the half mirror plate apart from the display device, the half mirror plate may further include a supporting component.

The display device can be of any type, and it may be a liquid crystal display device, an organic electroluminescence display device (GELD), or a plasma display, for example. Alternatively, the display device may be a 3D display which can give stereoscopic (3D) images.

Preferably, the display device includes a local-dimming backlight and the control device is configured to control the local-dimming backlight. Thereby, the electronic device can locally turn off the backlight or reduce the luminance of the backlight in a domain driven in the mirror mode.

The range of displaying an image may be changed by pinch-in and pinch-out gestures. This achieves a convenient electronic device.

ADDITIONAL REMARKS

The following will describe examples of preferable embodiments of the mirror display according to the present invention. The respective examples may appropriately be combined with each other within the spirit of the present invention.

The half mirror layer may include at least one reflective polarizing plate disposed in the display region and the frame region. The reflective polarizing plate can provide a mirror mode while preventing a reduction in screen luminance in the display mode.

The half mirror layer may include a vapor-deposited metal film disposed in the display region and the frame region. The vapor-deposited metal film can also provide a mirror mode while achieving a display mode. The vapor-deposited metal film may be produced from chromium, aluminum, silver, or the like. The half mirror layer may include a dielectric multilayer film disposed in the display region and the frame region. The dielectric multilayer film can also provide a mirror mode while achieving a display mode. The dielectric multilayer film is an optical thin film that is made of a dielectric material and includes a stack of multiple thin films having different refractive indexes so that the reflectance and the transmittance thereof are adjusted owing to the principle of interference of light.

The half mirror plate including the vapor-deposited metal film or the dielectric multilayer film as the half mirror layer allows only part of the incident light to pass therethrough, and reflects and absorbs the remaining light components. Thus, in terms of the screen luminance when displaying an image, this half mirror plate is inferior to a half mirror plate including the reflective polarizing plate as the half mirror layer. The reflective polarizing plate selectively allows polarized light components vibrating in a first direction to pass therethrough and selectively reflects second polarized light components vibrating in the direction perpendicular thereto. Thus, the reflective polarizing plate disposed on the viewer side of a display device emitting polarized light vibrating in the first direction can serve as a polarization-selective half mirror plate while it hardly reduces the screen luminance.

The reflectance adjuster may include a light-absorbing component disposed in the frame region. The reflectance of the light-absorbing component is usually lower than the reflectance of the frame component that supports the peripheral portion of the display panel. Thus, it can reduce the reflectance in the frame region.

Examples of the light-absorbing component include black components and gray components. The color of the light-absorbing component may be selected in accordance with the difference in reflectance between the display region and the frame region, the placement of the light-absorbing component, and other factors.

The light-absorbing component may be a tape. In this case, the light-absorbing component is easy to attach.

The light-absorbing component may be paper. In this case, the light-absorbing component can be disposed apart from the mirror display and an air layer may be formed between the light-absorbing component and the mirror display. As the number of interfaces increases by disposing the air layer, the reflectance in the frame region increases. This is suitable for adjusting the reflectance in the frame region in the case where the display region has a relatively high reflectance.

The light-absorbing component may be a printed layer. The printing technique may be ceramic printing, for example. In this case, use of a ceramic-printed layer having high design quality can improve the design quality of the mirror display while adjusting the reflectance in the frame region.

The reflectance adjuster may be a circular polarizing plate disposed in the display region and the frame region. In this case, the internal reflection of the mirror display can sufficiently be reduced in both the display region and the frame region. Thus, the difference in reflectance between the display region and the frame region can easily be reduced.

The reflectance adjuster may be a combination of a liquid crystal panel and a polarizing plate. In other words, in addition to the display panel (which may be a liquid crystal panel) which is part of a display device as a constituent part of the mirror display and which is utilized for displaying an image in the display mode, another liquid crystal panel may be used as part of the reflectance adjuster. Such a combination of the liquid crystal panel and the polarizing plate enables to switch the state in which light is allowed to pass through from the surface of the mirror display to the display device and the state in which light is prevented from passing through from the surface of the mirror display to the display device. Thus, when light is prevented from passing through from the surface of the mirror display to the display device so as to achieve the mirror mode, the difference in reflectance between the display region and the frame region can sufficiently be reduced.

The combination of the liquid crystal panel and the polarizing plate serving as the reflectance adjuster is suitable for the case of using the reflective polarizing plate as the half mirror layer. In this case, the polarizing plate of the reflectance adjuster may be an absorptive polarizing plate or may be a reflective polarizing plate.

In embodiments in which the absorptive polarizing plate is used as part of the reflectance adjuster, for example, the half mirror layer includes at least one reflective polarizing plate disposed in the display region and the frame region; the reflectance adjuster includes the absorptive polarizing plate and the liquid crystal panel disposed in the display region and the frame region; the mirror display includes the absorptive polarizing plate, the liquid crystal panel, and the at least one reflective polarizing plate in the order set forth from the front side to the back side; and the transmission axis of the absorptive polarizing plate and the transmission axis of the at least one reflective polarizing plate are substantially parallel or perpendicular with each other. In this case, half of the light components incident on the mirror display from the outside is absorbed by the absorptive polarizing plate, and the other half thereof passes through the absorptive polarizing plate. In the mirror mode, light transmitted through the absorptive polarizing plate is reflected on the at least one reflective polarizing plate, contributing to the function as a mirror. In the display mode, light transmitted through the absorptive polarizing plate passes through the at least one reflective polarizing plate and most of the light is absorbed inside the display device. Thus, the mirror display can show an image while sufficiently preventing reflections.

In embodiments in which the reflective polarizing plate is used as part of the reflectance adjuster, for example, the half mirror layer includes at least one reflective polarizing plate disposed in the display region and the frame region; the reflectance adjuster includes a second reflective polarizing plate and the liquid crystal panel disposed in the display region and the frame region; the mirror display includes the second reflective polarizing plate, the liquid crystal panel, and the at least one reflective polarizing plate in the order set forth from the front side to the back side; and the transmission axis of the second reflective polarizing plate and the transmission axis of the at least one reflective polarizing plate are substantially parallel or perpendicular with each other. In this case, half of the light incident on the mirror display from the outside is reflected on the second reflective polarizing plate, and the other half thereof passes through the second reflective polarizing plate. In the mirror mode, the light is reflected on the at least one reflective polarizing plate. Thus, the mirror display can achieve high reflection performance in the mirror mode.

The reflectance adjuster may include a surface which undergoes the same surface treatment as the display panel at the side facing the half mirror layer. This can match the texture of the display region with the texture of the frame region when the mirror display is observed by a viewer, improving the design quality. If the outermost surface of the display panel is constituted by a polarizing plate, for example, the reflectance adjuster may undergo the same surface treatment as the polarizing plate at the side facing the half mirror layer. The surface treatment may be performed by a method of directly treating the reflectance adjuster or a method of attaching a surface-treated component to the reflectance adjuster. Specifically, if the reflectance adjuster is a black tape, the surface of the black tape at the side facing the half mirror layer may directly undergo the same surface treatment as the polarizing plate, or a polarizing plate which undergoes the same surface treatment as the outermost surface of the display panel may be attached to the surface of the black tape at the side facing the half mirror layer.

The half mirror plate may include an anti-reflection film on the surface facing the display panel in the display region. This can prevent reflection on the interface between the half mirror plate and an air layer which exists between the half mirror plate and the display panel, reducing the reflectance in the display region.

The anti-reflection film may have a moth-eye structure. The moth-eye structure can greatly suppress the reflection on the interface between the half mirror plate and the air layer. The moth-eye structure herein means a moth-eye-like structure. For example, it means a rough structure including multiple protrusions smaller than 780 nm, which is the upper limit of the visible light wavelength range, or multiple hollows deeper than 780 nm arranged at intervals shorter than 780 nm.

The half mirror plate may include the anti-reflection film disposed in the display region and the light-absorbing component disposed in the frame region. This can reduce the reflectance in the display region to improve the display quality in the display mode and simultaneously reduce the reflectance in the frame region in accordance with the reduction in reflectance in the display region, thereby preventing the boundary line between the display device and the frame component from being observed in the mirror mode.

The half mirror plate may include the anti-reflection film disposed in the display region and the frame region and the light-absorbing component disposed overlapping the anti-reflection film in the frame region. This can also reduce the reflectance in the display region to improve the display quality in the display mode and simultaneously reduce the reflectance in the frame region in accordance with the reduction in reflectance in the display region, thereby preventing the boundary line between the display device and the frame component from being observed in the mirror mode.

The half mirror plate may include a supporting component, the half mirror layer, and the reflectance adjuster in the order set forth from the front side to the back side, or may include the half mirror layer, a supporting component, and the reflectance adjuster in the order set forth from the front side to the back side. The half mirror plate may include no supporting component and be integrated with the display panel.

The display panel may include an anti-reflection film on the surface facing the half mirror plate in the display region. This can suppress the reflection on the interface between the half mirror plate and an air layer which exists between the display panel and the half mirror, reducing the reflectance in the display region.

An air layer may be formed between the light-absorbing component and the half mirror layer. This increases the reflectance in the frame region due to, for example, the reflection on the interface between the light-absorbing component and the air layer. This is suitable for the cases requiring high reflectances in the display region and in the frame region in the mirror mode.

The mirror display may include a transparent adhesive layer which bonds the display panel and the half mirror plate. If an air layer is disposed between the display panel and the half mirror plate, this forms the interface between the air layer and the display panel and the interface between the air layer and the half mirror plate. Reflection of light occurs on these interfaces, so that the reflectance becomes high. If the transparent adhesive layer is disposed between the display panel and the half mirror plate, in contrast, light is less reflected on the interface between the transparent adhesive layer and the display panel and the interface between the transparent adhesive layer and the half mirror plate, so that the reflectance can be low.

The display panel may be a liquid crystal panel. In other words, the display device may be a liquid crystal display device. The display device can be of any type, and it may be an organic electroluminescence display device (GELD) or may be a plasma display, for example. Alternatively, the display device may be a 3D display which can give stereoscopic (3D) images. The 3D display can provide natural depth perception in the display region as well as in the mirror region, improving the design quality of the mirror display. Thus, the mirror display can be utilized in various uses. The mode of displaying stereoscopic images of the 3D display may be of any mode, and it is more preferably autostereoscopy requiring no special glasses. Examples of the autostereoscopy for 3D displays include a lenticular lens technique and a parallax barrier technique.

The liquid crystal panel includes a first polarizing plate, a liquid crystal layer, and a second polarizing plate in the order set forth from the side of the half mirror plate to the other side. The half mirror layer may include at least one reflective polarizing plate disposed in the display region and the frame region. If the at least one reflective polarizing plate includes multiple polarizing plates, either one of the polarizing plates may have a transmission axis that is substantially parallel with the transmission axis of the first polarizing plate. This can provide high display quality while utilizing the reflective polarizing plate as the half mirror layer.

The at least one reflective polarizing plate may include a first reflective polarizing plate whose transmission axis is substantially parallel with the transmission axis of the first polarizing plate and a second reflective polarizing plate whose transmission axis forms an angle of 0° or greater and 45° or smaller with the transmission axis of the first polarizing plate. The reflectance of one reflective polarizing plate is theoretically limited to about 50%. Still, use of multiple reflective polarizing plates can increase the reflectance in the mirror mode. As the angle formed by the transmission axis of the second reflective polarizing plate with the transmission axis of the first polarizing plate increases, the reflectance tends to increase and the transmittance tends to decrease. When the angle formed by the transmission axis of the second reflective polarizing plate with the transmission axis of the first polarizing plate increases to reach 45°, the reflectance in the mirror mode becomes sufficiently high, achieving the reflection performance equal to that of a normal mirror, which is not a mirror display, in terms of the feeling of a viewer. Thus, in order to maintain the transmittance, the upper limit of the angle formed by the transmission axis of the second reflective polarizing plate with the transmission axis of the first polarizing plate is preferably 45°.

The half mirror layer may be extended to a region outside the frame region facing the frame component. For a mirror display which shows an image in part of the plane of a large-size mirror, the mirror surface of the mirror display may be extended to a region outside the frame component of the display device. In such a structure, the half mirror layer is preferably extended to a region outside the frame region in order to keep the reflectance in the mirror plane uniform. The reflectance adjuster is preferably one configured to make equal the reflectance in the display region, the reflectance in the frame region, and the reflectance in the region outside the frame region.

One preferable embodiment of the mirror display is that the reflectance in the display region is lower than the reflectance in the frame region. Thereby, light leakage in the display region when the display device is in the power-on state functions to make it difficult to observe the boundary line between the display region and the frame region. In other words, such a structure can make it difficult to observe the boundary line between the display region and the frame region in both the power-off state and the power-on state. The reflectance in the display region can be made lower than the reflectance in the frame region by, for example, adjusting the reflectance of the display panel so as to be lower than the reflectance of the reflectance adjuster such as the light-absorbing component. The optimal range of the difference in reflectance between the display region and the frame region in the above embodiment depends on the conditions such as the luminance and contrast of the liquid crystal display device, and the illuminance in the environment where a mirror display is used. In usual conditions, the reflectance in the display region is preferably 0.5% or more and 3% or less lower than the reflectance in the frame region.

The half mirror plate may include a $\lambda/4$ plate so that it functions as a circular polarizing plate. Thereby, the anti-reflection effect of the circular polarizing plate prevents the boundary line between the frame region and the display region from being observed.

The half mirror plate may include a gradation filter whose transmittance continually changes in an interfacial region between the display region and the frame region. The gradation filter disposed over the interface between the display region and the frame region can prevent the boundary line between the display region and the frame region from being observed. The gradation filter may be disposed at least in the interfacial region between the display region and the frame region, and may be disposed in the whole display region. In order to prevent light scattering on the edge of the gradation filter, the gradation filter is preferably disposed in the whole display region. The gradation filter may be attached to the half mirror layer, or may be disposed apart from the half mirror layer. In order to reduce the number of interfaces which cause reflection, the gradation filter is preferably attached to the half mirror layer.

As mentioned hereinabove, the description gives examples of preferable embodiments of the mirror display according to the present invention. Those relating to the characteristics of the half mirror plate among these examples are also examples of preferable embodiments of the half mirror plate according to the present invention.

The following will describe examples of preferable embodiments of the electronic device according to the present invention.

The electronic device may have not only a function of switching the mirror mode and the display mode on the whole screen in terms of time but also a function of driving a certain domain in the mirror mode and another domain in the display mode at the same time on the same plane. For example, in the display device, the center portion of the display region may show a black screen and the peripheral portion thereof shows an image, so that the mirror region may be formed only at the center portion of the display region. In other words, the electronic device may further include a control device that controls the display region by dividing the display region into multiple domains. The control device may be configured to change the range and position of displaying an image by selecting a domain to display an image among the multiple domains. Since the range and position of displaying an image can be changed, various uses combining the mirror function and the image-displaying function of the display device can be provided.

In a domain driven in the mirror mode, the backlight of the electronic device may locally be turned off, or the luminance of the backlight may be reduced. This can suppress light leakage from the liquid crystal display device. In these cases, a local-dimming backlight may be used.

The range of displaying an image may be changed by pinch-in and pinch-out gestures. This can achieve a convenient electronic device.

REFERENCE SIGNS LIST

1: mirror display in display mode
2: mirror display in mirror mode
4a, 4a', 4b, 4c, 4d, 4e, 4f, 4g, 4h, 4i, 4j, 4k, 4l, 4m, 4n, 4o, 4p, 4q, 4r, 4s, 4t: mirror display
5a, 5a', 5b, 5c, 5d, 5e, 5f, 5g: liquid crystal display device
6a, 6b: air layer
7a, 7c, 7d, 7e, 7f, 7g, 7h, 7i, 7j, 7k, 7l, 7m, 7n, 7o, 7pa, 7pb, 7pc, 7pd, 7q, 7r, 7s, 7t, 7u: half mirror plate
8: bezel
9a: backlight
9b: local-dimming backlight
10a, 10b, 10c, 10d, 10e, 10f: absorptive polarizing plate
11a: liquid crystal panel
11b: switching liquid crystal panel
12: glass plate
13a, 13b, 13c, 13d, 13e, 13f, 13g: reflective polarizing plate
14a, 14b, 14c, 14d, 14e, 14f: anti-reflection film
15: black tape
16: black paper
17: black acrylic plate
18: AG film
19: gray tape
20: black ceramic-printed layer
21: transparent adhesive layer
22a, 22b: λ/4 plate
23a, 23b, 23c, 23d: circular polarizing plate
25a, 25b, 25c, 25d: electronic device
26: display light control device
27: panel control unit
28: backlight control unit
29: signal control unit
30: gradation filter
40A, 41A: mirror display
70A, 70K, 70L, 70M, 70N, 70P, 71A, 71K, 71L, 71M, 71N, 71P,
72P, 73P, 74P, 75P, 76P, 77P: half mirror plate
101: display device in power-on state
102: display device in power-off state

The invention claimed is:

1. A mirror display comprising:
a half mirror plate including a half mirror layer including at least one reflective polarizing plate, and
a display device disposed behind the half mirror plate, wherein
the mirror display switches between a mirror mode in which the mirror display serves as a mirror without displaying any image of the display device and a display mode in which the mirror display device displays an image of the display device,
the display device includes a display panel and a frame component that supports a peripheral portion of the display panel,
the mirror display includes, only in the half mirror plate, a reflectance adjuster that makes equal the reflectance in a display region where the half mirror layer and the display panel face each other and the reflectance in a frame region where the half mirror layer and the frame component face each other,
the reflectance adjuster includes (i) an additional reflective polarizing plate or an absorptive polarizing plate, (ii) a switching liquid crystal panel, and (iii) a component disposed at least in the frame region closer to the display device than the half mirror layer,
the half mirror plate includes, in both the display region and the frame region, the additional reflective polarizing plate or the absorptive polarizing plate, the switching liquid crystal panel, and the at least one reflective polarizing plate in order from a front side to a back side,
a transmission axis of the additional reflective polarizing plate or the absorptive polarizing plate and a transmission axis of the at least one reflective polarizing plate are substantially parallel or substantially perpendicular with each other, and
the switching liquid crystal panel is in a no-voltage-applied state in one of the mirror mode and the display mode, and is in a voltage-applied state in the other of the mirror mode and the display mode.

2. The mirror display according to claim 1,
wherein the reflectance adjuster includes a light-absorbing component disposed in the frame region.

3. The mirror display according to claim 2,
wherein the light-absorbing component is a black component.

4. The mirror display according to claim 2,
wherein an air layer is provided between the light-absorbing component and the half mirror layer.

5. An electronic device comprising
the mirror display according to claim 1; and
a control device that controls the display region by dividing the display region into multiple domains, wherein
the control device changes the range and position of displaying an image by selecting a domain to display an image among the multiple domains.

6. The electronic device according to claim 5,
wherein the range of displaying an image is changeable by pinch-in and pinch-out gestures.

7. The mirror display according to claim 1,
wherein the reflectance adjuster is a circular polarizing plate disposed in the display region and the frame region.

8. The mirror display according to claim 1,
wherein the reflectance adjuster includes a surface which undergoes a same surface treatment as the display panel at a side facing the half mirror layer.

9. The mirror display according to claim 1,
wherein the half mirror plate includes an anti-reflection film on a surface facing the display panel in the display region.

10. The mirror display according to claim 9,
wherein the anti-reflection film has a moth-eye structure.

11. The mirror display according to claim 1,
wherein the half mirror plate includes a supporting component, the half mirror layer, and the reflectance adjuster in order from the front side to the back side.

12. The mirror display according to claim 1,
wherein the half mirror plate includes the half mirror layer, a supporting component, and the reflectance adjuster in order from the front side to the back side.

13. The mirror display according to claim 1,
wherein the display panel includes an anti-reflection film on a surface facing the half mirror plate in the display region.

14. The mirror display according to claim 1,
wherein the mirror display includes a transparent adhesive layer which bonds the display panel and the half mirror plate.

15. The mirror display according to claim 1,
wherein the display panel is a liquid crystal panel.

16. The mirror display according to claim 15, wherein
the liquid crystal panel includes a first polarizing plate, a liquid crystal layer, and a second polarizing plate in order from a side of the half mirror plate to another side, and when the at least one reflective polarizing plate includes multiple polarizing plates, one of the multiple polarizing plates has a transmission axis that is parallel or substantially parallel with a transmission axis of the first polarizing plate.

17. The mirror display according to claim 16,
wherein the at least one reflective polarizing plate includes a first reflective polarizing plate with a transmission axis that is parallel or substantially parallel with the transmission axis of the first polarizing plate and a second reflective polarizing plate with a transmission axis that defines an angle of 0° or greater and 45° or smaller with the transmission axis of the first polarizing plate.

18. The mirror display according to claim 1,
wherein the half mirror layer extends to a region outside the frame region facing the frame component.

19. The mirror display according to claim 1,
wherein the half mirror plate includes a $\lambda/4$ plate and functions as a circular polarizing plate.

20. The mirror display according to claim 1,
wherein the half mirror plate includes a gradation filter with a transmittance that continually changes in an interfacial region between the display region and the frame region.

* * * * *